United States Patent
Ishida et al.

(10) Patent No.: US 11,403,672 B2
(45) Date of Patent: Aug. 2, 2022

(54) INFORMATION COLLECTION SYSTEM, ELECTRONIC SHELF LABEL, ELECTRONIC POP ADVERTISING, AND CHARACTER INFORMATION DISPLAY DEVICE

(71) Applicant: SONY CORPORATION, Tokyo (JP)

(72) Inventors: Kyoko Ishida, Tokyo (JP); Naoki Kuzuya, Tokyo (JP); Takeshi Masuura, Kanagawa (JP); Hiroshi Sumihiro, Kanagawa (JP); Mitsuharu Ohki, Tokyo (JP); Hiroaki Ono, Kanagawa (JP); Hideshi Yamada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 623 days.

(21) Appl. No.: 16/328,596

(22) PCT Filed: Sep. 14, 2017

(86) PCT No.: PCT/JP2017/033201
§ 371 (c)(1),
(2) Date: Feb. 26, 2019

(87) PCT Pub. No.: WO2018/061790
PCT Pub. Date: Apr. 5, 2018

(65) Prior Publication Data
US 2021/0304256 A1 Sep. 30, 2021

(30) Foreign Application Priority Data

Sep. 27, 2016 (JP) .............................. JP2016-188255

(51) Int. Cl.
*G06Q 30/02* (2012.01)
*G06T 7/00* (2017.01)

(52) U.S. Cl.
CPC ........... *G06Q 30/0268* (2013.01); *G06T 7/00* (2013.01); *G06T 2200/24* (2013.01)

(58) Field of Classification Search
CPC ..................................................... G06Q 30/02
See application file for complete search history.

(56) References Cited

U.S. PATENT DOCUMENTS 5,774,591 A * 6/1998 Black ................... G06V 40/165
382/118
7,043,056 B2 * 5/2006 Edwards ............... G06V 40/20
382/118

(Continued)

FOREIGN PATENT DOCUMENTS

| JP | 2008-197266 A | 8/2008 |
| JP | 2009-042956 A | 2/2009 |

(Continued)

OTHER PUBLICATIONS

Tracking a Shopper's interactions with Inventory via a Wearable Device, Ip.com Prior Art Database Disclosure Feb. 29, 2016 (Year: 2016).*

(Continued)

*Primary Examiner* — Marilyn G Macasiano
(74) *Attorney, Agent, or Firm* — Chip Law Group

(57) ABSTRACT

The present technology relates to an information collection system, an electronic shelf label, an electronic POP advertising, and a character information display device that allow information with higher accuracy to be collected. An information collection device that collects information associated with a customer or a product is included for each product type. Alternatively, an information processing device that supplies information associated with a product and an information display terminal that displays information associated with a product supplied from the information processing device are included. The present disclosure can be applied, (Continued)

for example, to an electronic shelf label, an image pickup device, a communication device, an information processing device, electronic equipment, a computer, a storage medium, a system, and the like.

20 Claims, 58 Drawing Sheets

(56) References Cited

U.S. PATENT DOCUMENTS

| | | | | |
|---|---|---|---|---|
| 8,219,438 B1* | 7/2012 | Moon | ............... | G06Q 30/0204 705/7.29 |
| 8,725,567 B2* | 5/2014 | Huang | ............... | G06Q 30/0269 705/14.49 |
| 10,091,414 B2* | 10/2018 | Chan | ............... | H04N 1/00183 |
| 2006/0056667 A1* | 3/2006 | Waters | ............... | G06T 7/70 382/118 |
| 2006/0206371 A1* | 9/2006 | Hill | ............... | G06Q 30/0203 705/7.32 |
| 2020/0066405 A1* | 2/2020 | Peyman | ............... | A61B 5/441 |

FOREIGN PATENT DOCUMENTS

| | | | | |
|---|---|---|---|---|
| JP | 2012-022538 A | 2/2012 | | |
| JP | 2012-084173 A | 4/2012 | | |
| JP | 2012-093963 A | 5/2012 | | |
| JP | 2012-161478 A | 8/2012 | | |
| JP | 2012-242912 A | 12/2012 | | |
| JP | 2013-144001 A | 7/2013 | | |
| WO | WO 2004/072897 A2 * | 8/2004 | ............. | G03D 15/00 |
| WO | WO 2014/088906 A1 * | 6/2014 | ............. | G06Q 20/00 |

OTHER PUBLICATIONS

Yi-Hong Lin; Hsiau Wen Lin, Face Detection Based on the use of Eyes Tracking (English), 2016 International Computer Symposium (ICS) (pp. 402-405), Dec. 1, 2016 (Year: 2016).*

International Search Report and Written Opinion of PCT Application No. PCT/JP2017/033201, dated Dec. 5, 2017, 09 pages of ISRWO.

International Preliminary Report on Patentability of PCT Application No. PCT/JP2017/033201, dated Dec. 25, 2018, 05 pages of English Translation and 04 pages of IPRP.

* cited by examiner

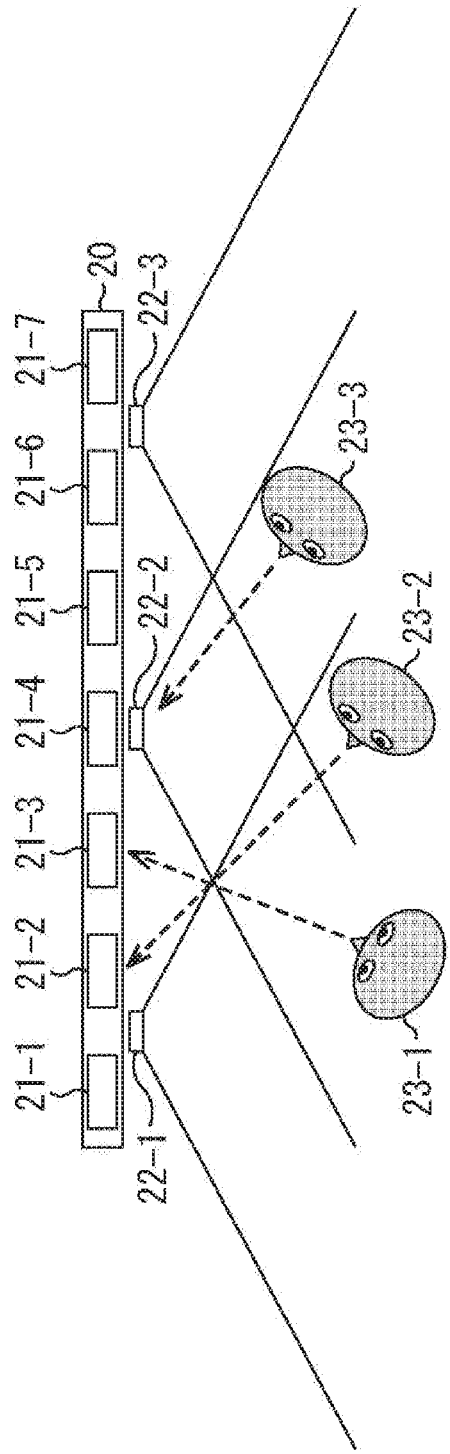
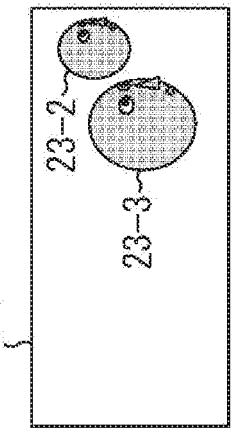
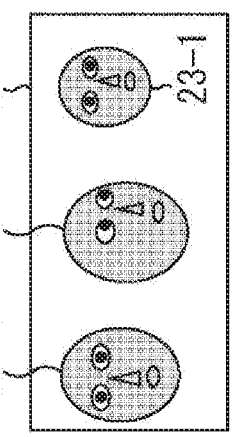
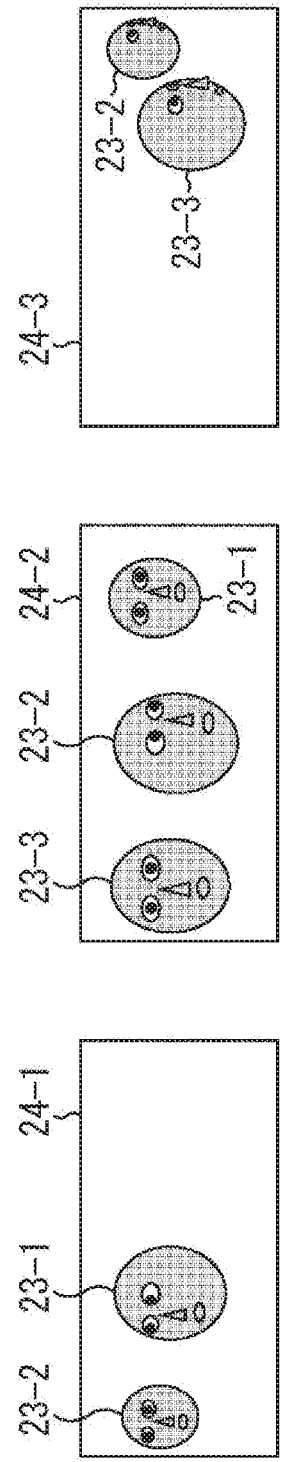
FIG. 4A
FIG. 4B
FIG. 4C
FIG. 4D

FIG. 10

| PRODUCT | TIME AT WHICH CUSTOMER LOOKS AT PRODUCT | TIME PERIOD IN WHICH CUSTOMER LOOKS AT PRODUCT | DISTANCE | ATTRIBUTES | | WHETHER OR NOT | |
|---|---|---|---|---|---|---|---|
| | | | | GENDER | AGE | CUSTOMER PICKS UP PRODUCT | CUSTOMER RETURNS PRODUCT |
| PRODUCT A | 15:33:45 | 15s | 40cm | WOMAN | 40 | PICKS UP | DOES NOT RETURN |
| PRODUCT B | 15:35:33 | 9s | 90cm | WOMAN | 50 | DOES NOT PICK UP | DOES NOT RETURN |
| PRODUCT A | 15:48:15 | 30s | 30cm | WOMAN | 30 | PICKS UP | RETURNS |
| PRODUCT C | 15:50:28 | 5s | 30cm | MAN | 10 | PICKS UP | DOES NOT RETURN |
| PRODUCT C | 16:01:12 | 10s | 80cm | WOMAN | 20 | DOES NOT PICK UP | DOES NOT RETURN |
| PRODUCT A | 16:07:01 | 8s | 40cm | MAN | 10 | PICKS UP | RETURNS |
| PRODUCT D | 16:13:40 | 26s | 90cm | WOMAN | 30 | DOES NOT PICK UP | DOES NOT RETURN |
| ... | ... | ... | ... | ... | ... | ... | ... |

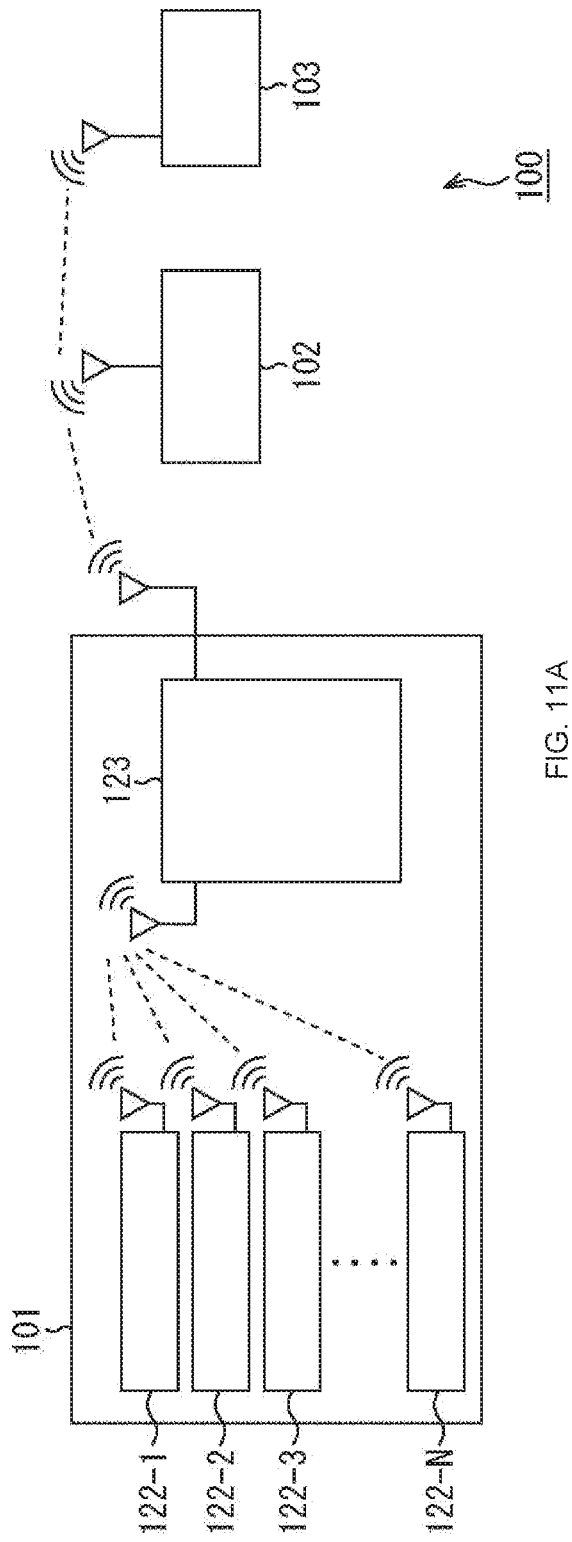

| DEVICE THAT PERFORMS IMAGE ANALYSIS (DEVICE INCLUDING IMAGE ANALYSIS UNIT) | CONTENT OF DATA TRANSMITTED BETWEEN DEVICES | | |
|---|---|---|---|
| | BETWEEN INFORMATION COLLECTION DEVICE AND LOCAL SERVER | BETWEEN LOCAL SERVER AND RELAY DEVICE | BETWEEN RELAY DEVICE AND INFORMATION MANAGEMENT SERVER |
| FIRST MODE | LOCAL SERVER | PICKED-UP IMAGE DATA | DATA OF ANALYSIS RESULT AFTER IMAGE ANALYSIS | DATA OF ANALYSIS RESULT AFTER IMAGE ANALYSIS |
| SECOND MODE | RELAY DEVICE | PICKED-UP IMAGE DATA | PICKED-UP IMAGE DATA | DATA OF ANALYSIS RESULT AFTER IMAGE ANALYSIS |
| THIRD MODE | INFORMATION MANAGEMENT SERVER | PICKED-UP IMAGE DATA | PICKED-UP IMAGE DATA | PICKED-UP IMAGE DATA |

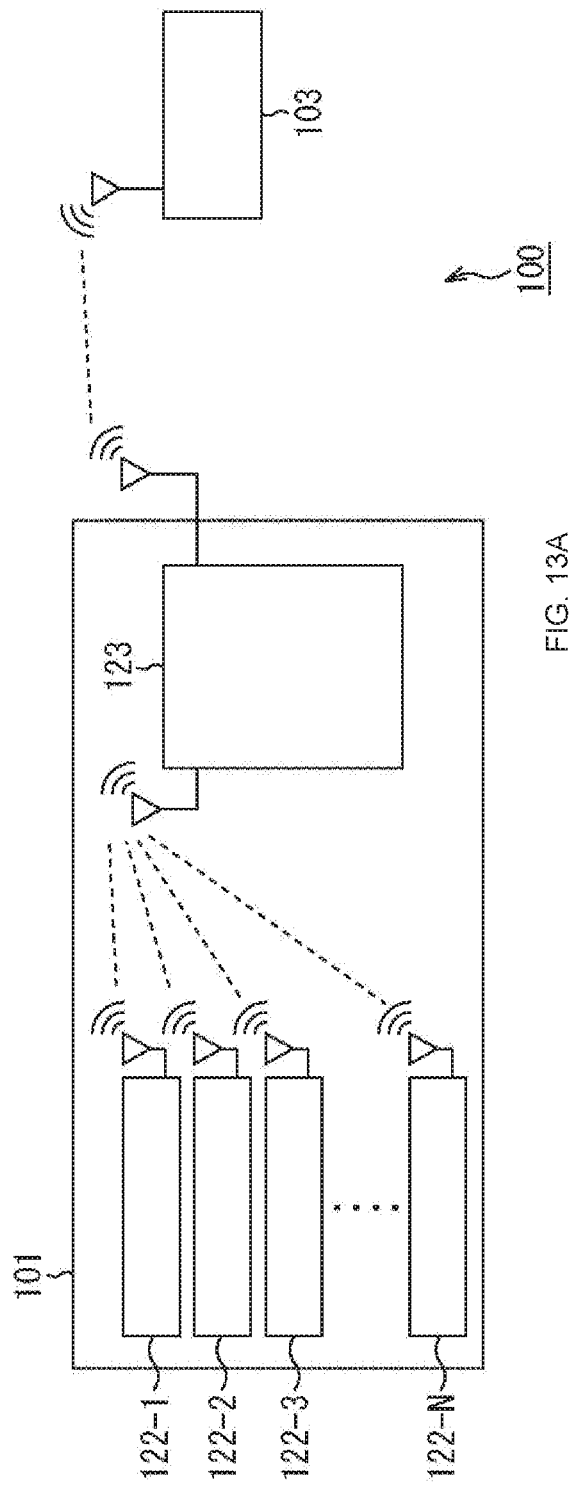

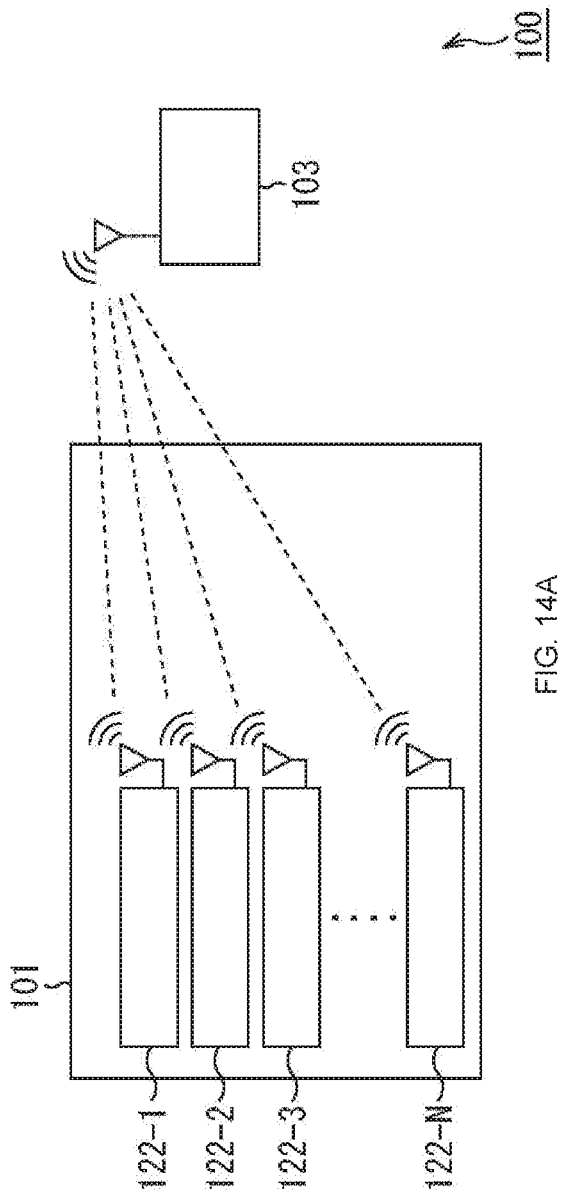

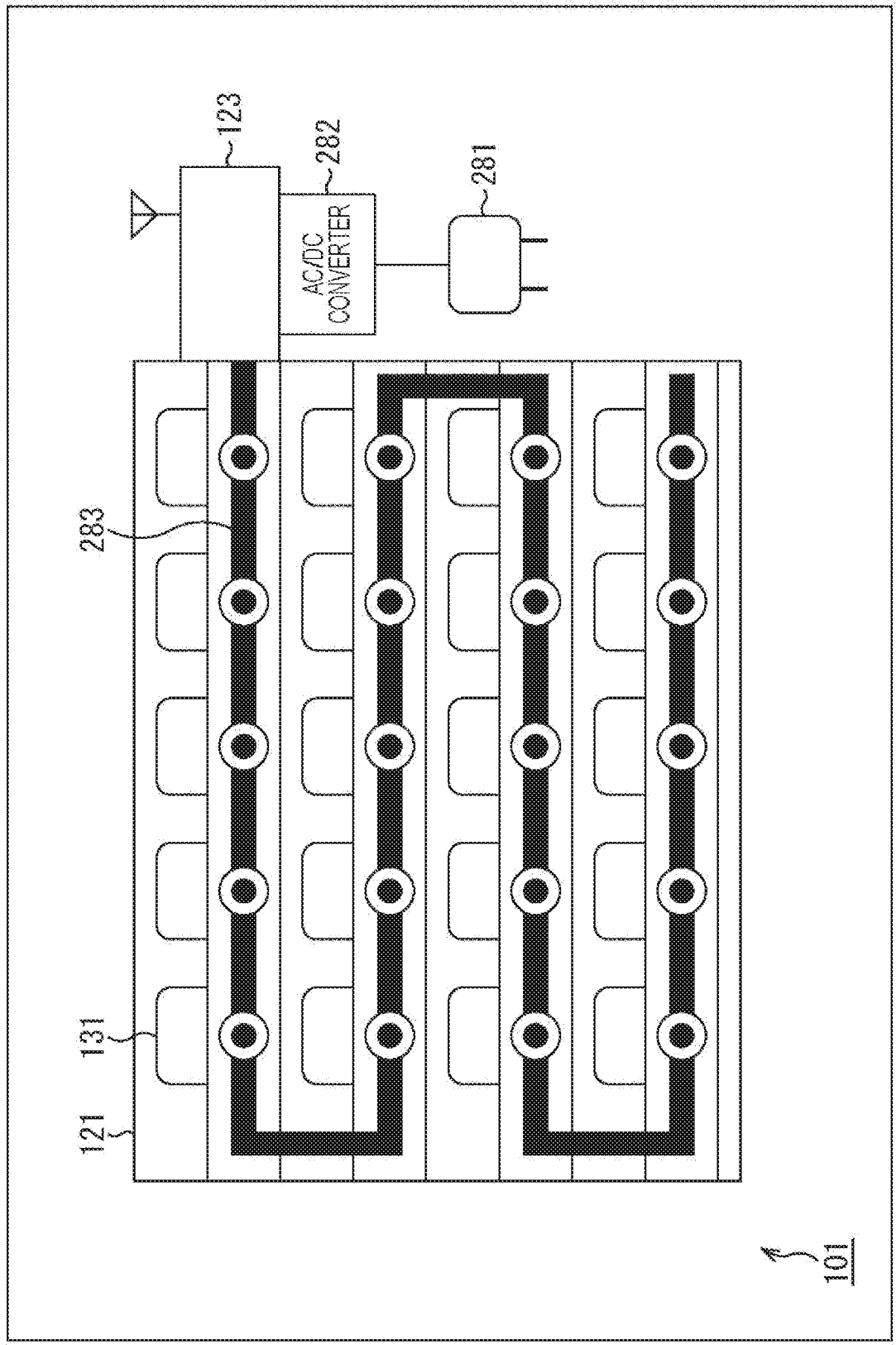

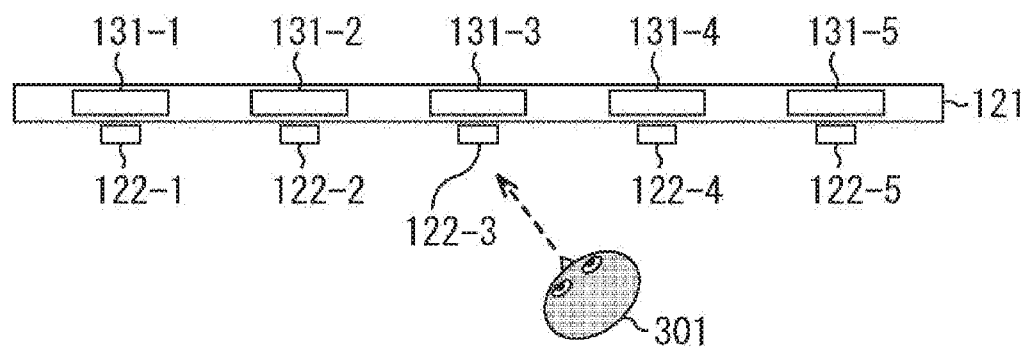
FIG. 19A
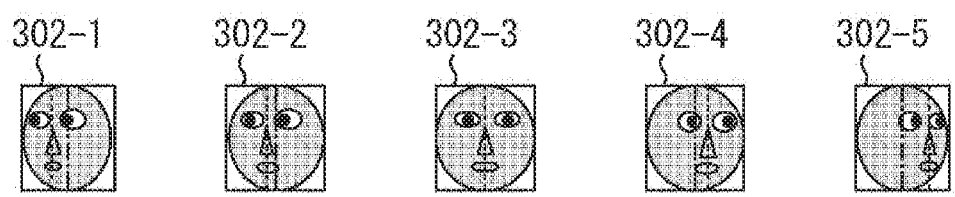
FIG. 19B
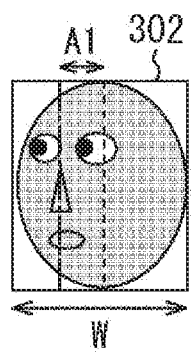 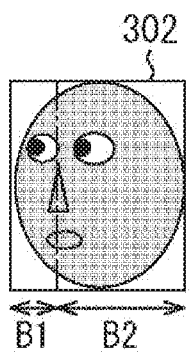 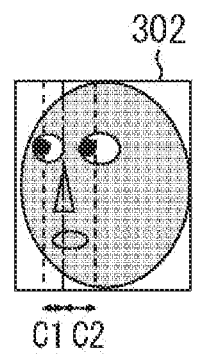
FIG. 19C　　　　　FIG. 19D　　　　　FIG. 19E

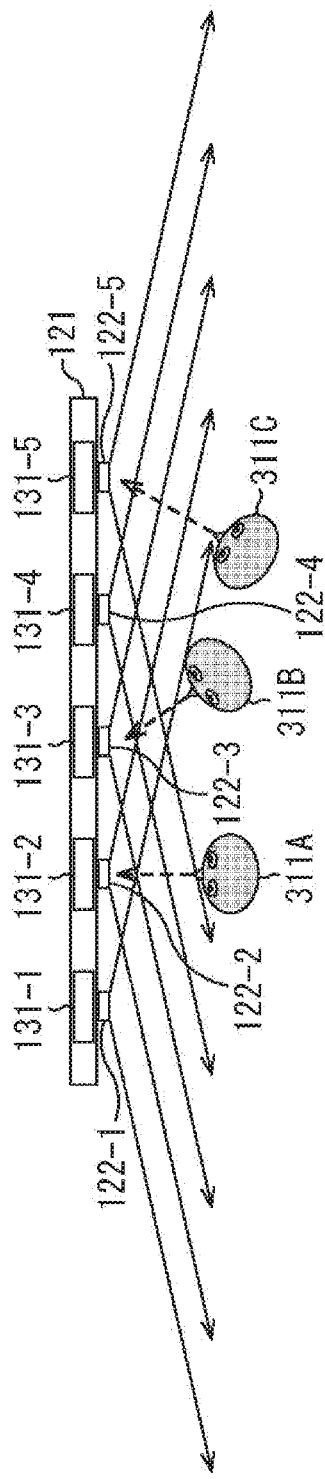
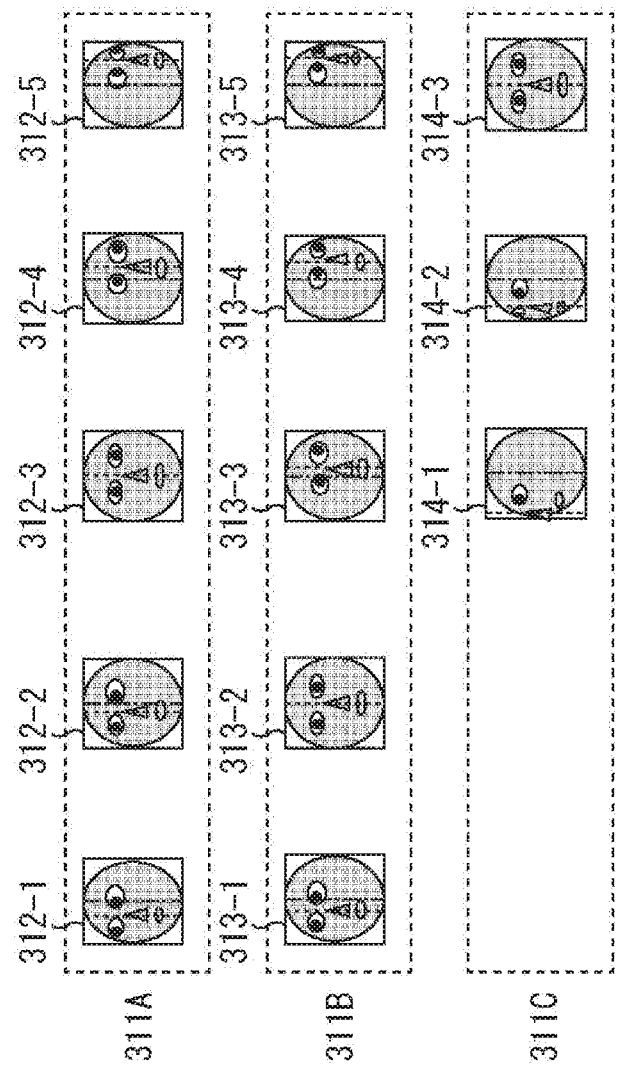

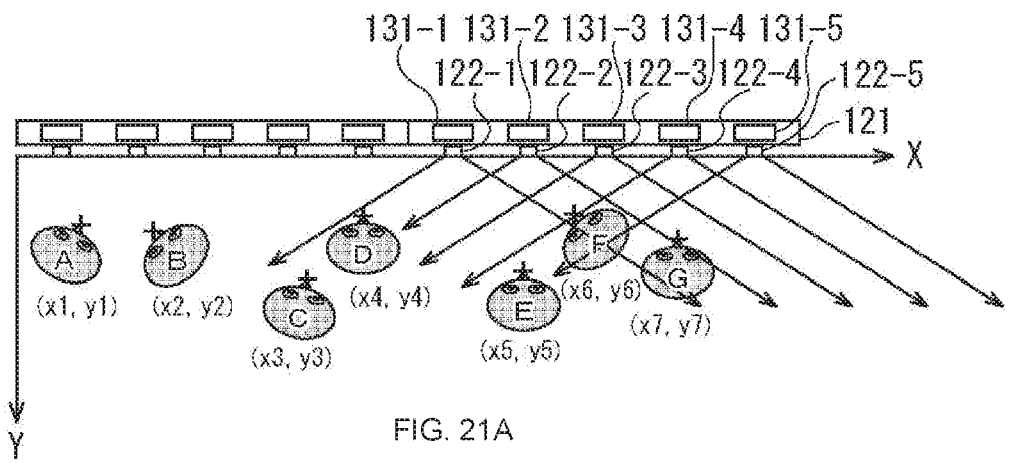
FIG. 21A
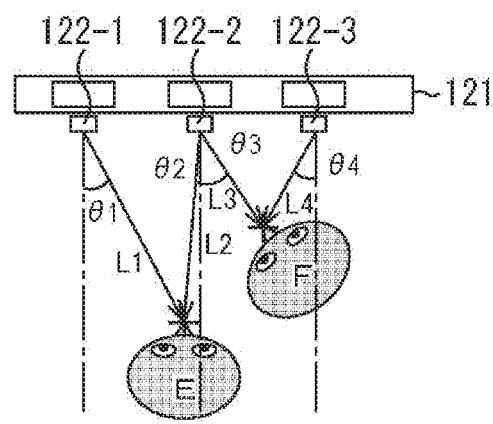
FIG. 21B
| | 122-1 | 122-2 | 122-3 | 122-4 | 122-5 |
|---|---|---|---|---|---|
| FACE E (x5, y5) | 😐 | 😐 | 😐 | 😐 | |
| FACE F (x6, y6) | | 😐 | 😐 | 😐 | |
| FACE G (x7, y7) | | 😐 | 😐 | 😐 | 😐 |
FIG. 21C

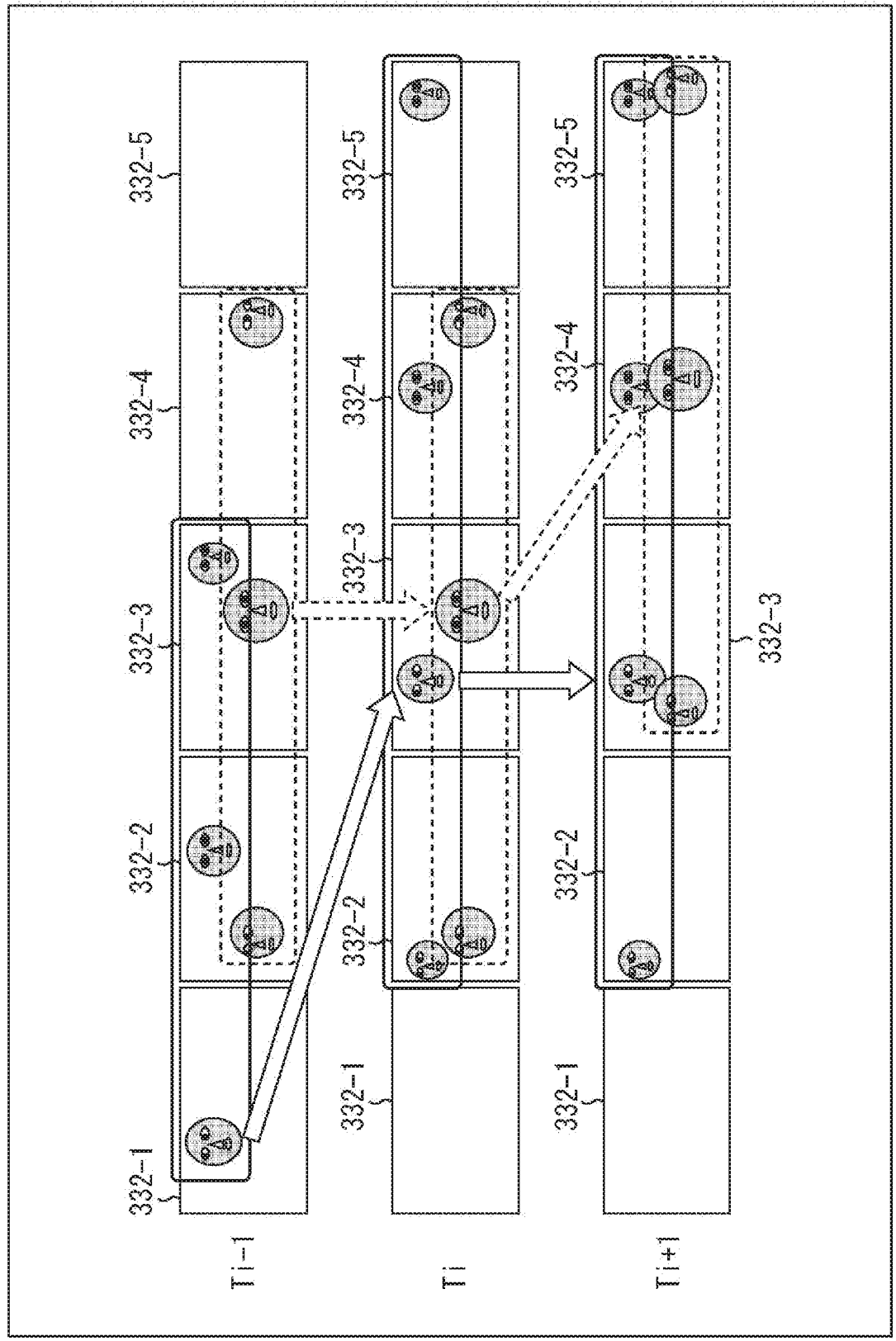

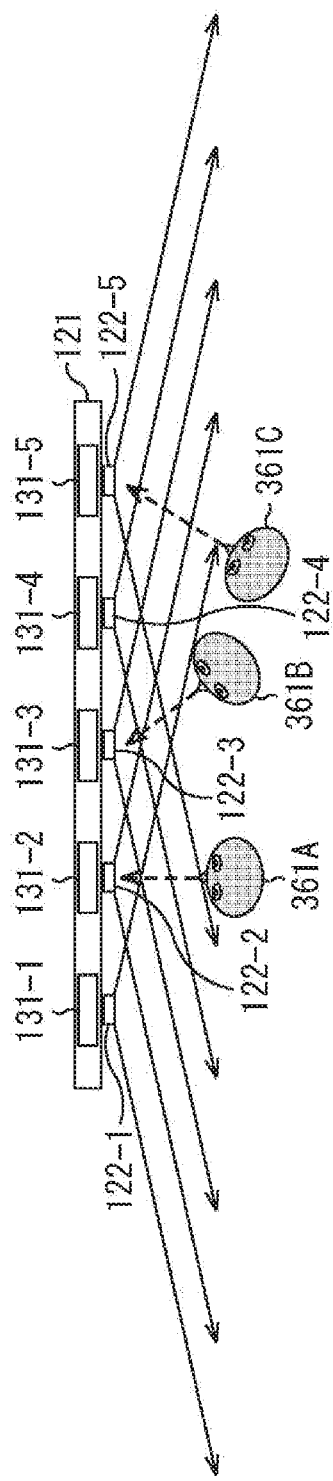
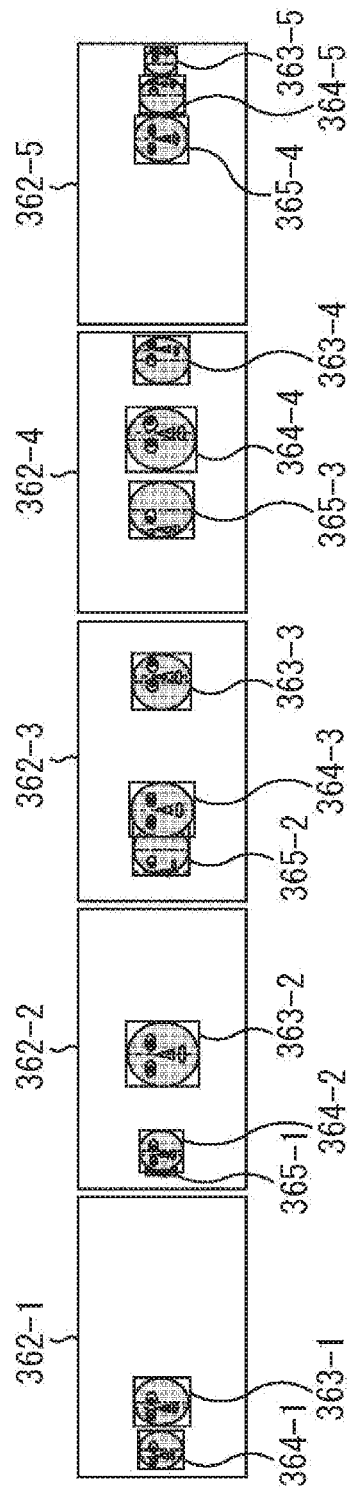
FIG. 24A
FIG. 24B

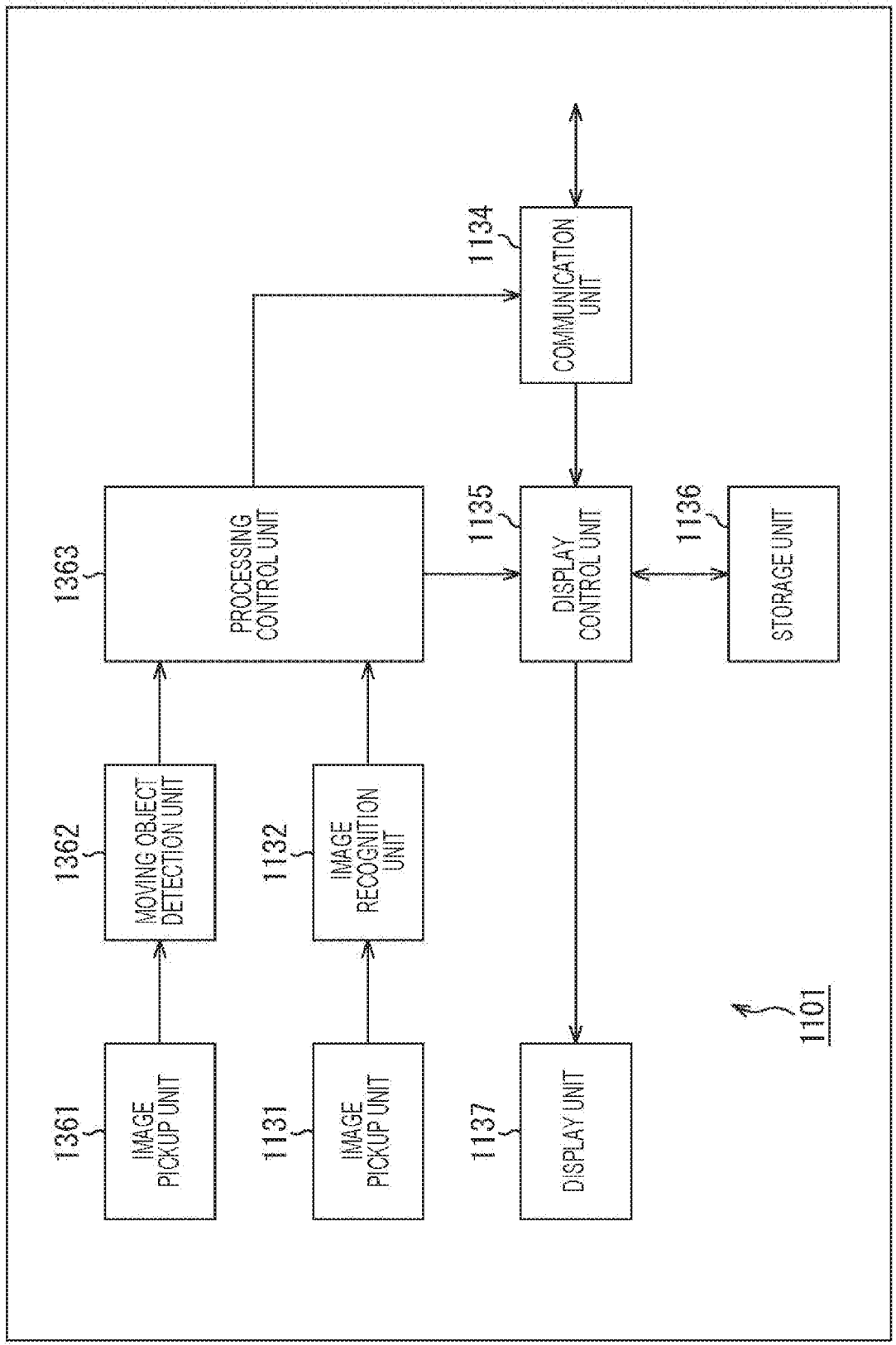

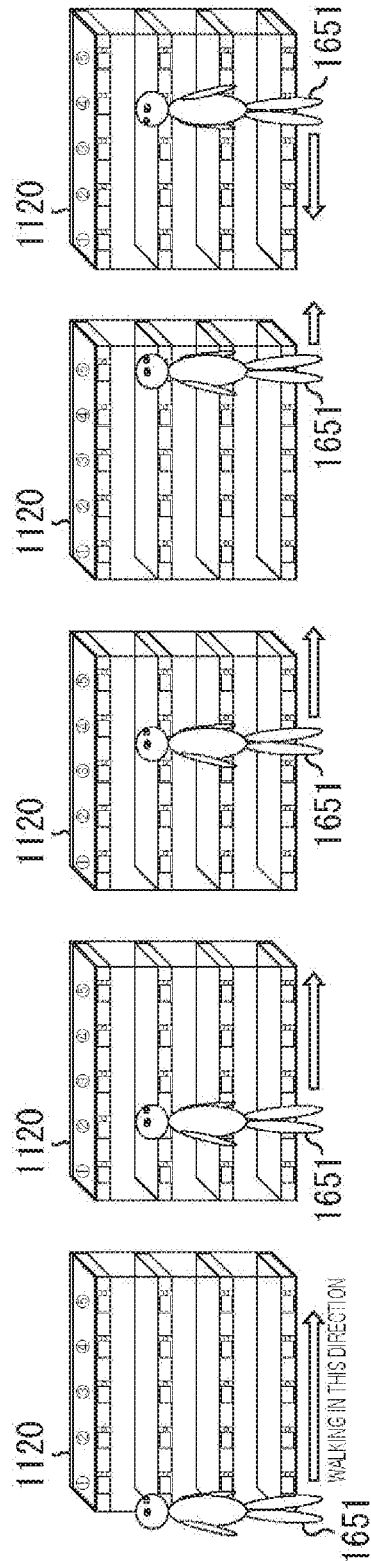
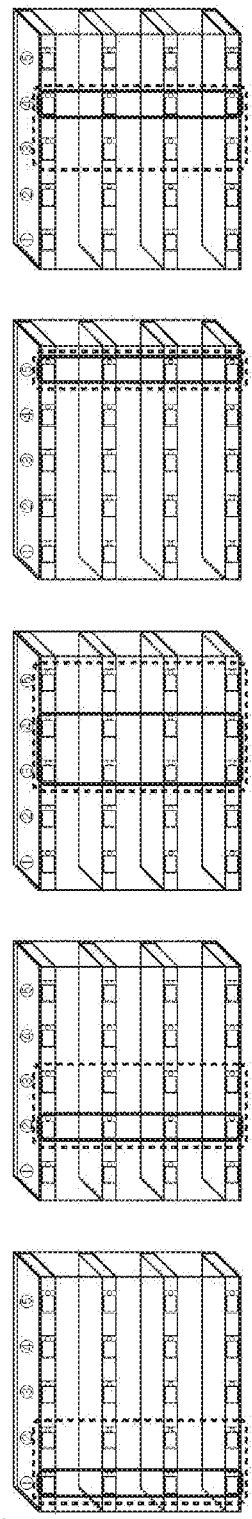
FIG. 59A
FIG. 59B
FIG. 59C
FIG. 59D
FIG. 59E

INFORMATION COLLECTION SYSTEM, ELECTRONIC SHELF LABEL, ELECTRONIC POP ADVERTISING, AND CHARACTER INFORMATION DISPLAY DEVICE

CROSS REFERENCE TO RELATED APPLICATIONS

This application is a U.S. National Phase of International Patent Application No. PCT/JP2017/033201 filed on Sep. 14, 2017, which claims priority benefit of Japanese Patent Application No. JP 2016-188255 filed in the Japan Patent Office on Sep. 27, 2016. Each of the above-referenced applications is hereby incorporated herein by reference in its entirety.

TECHNICAL FIELD

The present technology relates to an information collection system, an electronic shelf label, an electronic POP advertising, and character information display device, and, in particular, to an information collection system, an electronic shelf label, an electronic POP advertising, and a character information display device that are allowed to collect information with higher accuracy.

BACKGROUND ART

Conventionally, there has been considered collecting information associated with a product and a customer who purchases the product in a store and the like that sells the product.

For example, there has been considered installing a camera in a vending machine to collect information associated with a customer purchasing a product (for example, refer to Patent Document 1). Furthermore, there has been considered providing a camera on a display shelf of a product to collect information associated with a customer around the display shelf (for example, refer to Patent Document 2).

CITATION LIST

Patent Document

Patent Document 1: Japanese Patent Application Laid-Open No. 2009-042956
Patent Document 2: Japanese Patent Application Laid-Open No. 2013-144001

SUMMARY OF THE INVENTION

Problems to be Solved by the Invention

However, in the methods described in the above patent documents, the number of installed cameras is smaller than the number of product types being sold. Therefore, it has been difficult to estimate, with high accuracy, which product is looked at by a customer.

The present technology has been proposed in consideration of the above situations, and an object of the present technology is to collect information with higher accuracy.

Solutions to Problems

An information collection system according to an aspect of the present technology is an information collection system that includes an information collection device configured to collect information associated with a customer or a product for each product type.

The number of the information collection devices installed in locations in which a product is placed can be larger than or the same as the number of product types for which the information is collected.

The number of the information collection devices installed in locations in which a product is placed is larger than or the same as the number of product types in the information for each product transferred from the information collection device to a data accumulation device that accumulates the information.

The number of the information collection devices installed in locations in which a product is placed can be larger than or the same as the number of product types for which the information is output.

The information collection device can be a network camera that includes an image pickup function and a communication function.

The information collection device can be an electronic shelf label that includes an image pickup function and a communication function.

The information collection device can be an electronic point of purchase (POP) advertising that has an image pickup function and a communication function.

The information collection device can be a character information display device that includes an image pickup function and a communication function.

The information collection device can acquire and display information supplied from other devices.

The other devices can supply the information associated with a product supplied from the information collection device corresponding to identification information of the product to the information collection device, and the information collection device can display the supplied information associated with the product.

An information electronic shelf label according to another aspect of the present technology is an electronic shelf label that includes an information collection unit that collects information associated with a customer or a product.

The information collection unit can be an image sensor.

An electronic point of purchase (POP) advertising according to another aspect of the present technology is an electronic POP advertising that includes an information collection unit that collects information associated with a customer or a product.

The information collection unit can be an image sensor. (Image Sensor)

A character information display device according to another aspect of the present technology is a character information display device that includes an information collection unit that collects information associated with a customer or a product.

The information collection unit can be an image sensor.

According to an aspect of the present technology, an information collection device installed for each product type collects information associated with a customer or a product.

According to another aspect of the present technology, information associated with a customer or a product is collected.

Effects of the Invention

According to the present technology, information can be processed. Furthermore, according to the present technology, information with higher accuracy can be collected.

BRIEF DESCRIPTION OF DRAWINGS

FIGS. 4A, 4B, 4C, and 4D are diagrams explaining an example of conventional gaze estimation.

FIGS. 7A, 7B, 7C, and 7D are diagrams showing an example of an information collection device.

FIGS. 9A, 9B, 9C, and 9D are block diagrams showing a main configuration example of the information collection device.

FIG. 10 is a diagram explaining an example of information to be collected.

FIGS. 11A and 11B are diagrams explaining a configuration example of the information collection system and an example of a state of information collection.

FIGS. 13A and 13B are diagrams explaining a configuration example of the information collection system and an example of a state of information collection.

FIGS. 14A and 14B are diagrams explaining a configuration example of the information collection system and an example of a state of information collection.

FIG. 18 is a diagram showing an example of the power supply structure.

FIGS. 19A, 19B, 19C, 19D, and 19E are diagrams explaining an example of a state of identifying a product type looked at by a customer.

FIGS. 20A and 20B are diagrams explaining an example of a state of identifying a product type looked at by a customer.

FIGS. 21A, 21B, and 21C are diagrams explaining an example of a state of identifying the same person.

FIG. 23 is a diagram explaining an example of a state of identifying the same person.

FIGS. 24A and 24B are diagrams explaining an example of a state of identifying a product type looked at by a customer.

FIG. 49 is a block diagram showing a main configuration example of the electronic shelf label.

FIGS. 59A, 59B, 59C, 59D, and 59E are diagrams explaining an example of power supply control.

MODE FOR CARRYING OUT THE INVENTION

Hereinafter, a mode for performing the present disclosure (hereinafter referred to as an embodiment) will be described. Note that description will be made in the order described below.

1. First embodiment (information collection system, information display system)
2. Second embodiment (electronic shelf label system)
3. Third embodiment (selection by electronic shelf label)
4. Fourth embodiment (first application example: face size identification)
5. Fifth embodiment (second application example: moving object detection)
6. Sixth embodiment (third application example: display control)
7. Seventh embodiment (fourth application example: movable image pickup unit)
8. Eighth embodiment (fifth application example: power supply control unit)
9. Ninth embodiment (sixth application example: control of face direction detection processing)
10. Tenth embodiment (others)

1. First Embodiment

<Collection of Information of a Customer and a Product>

Figure 1:
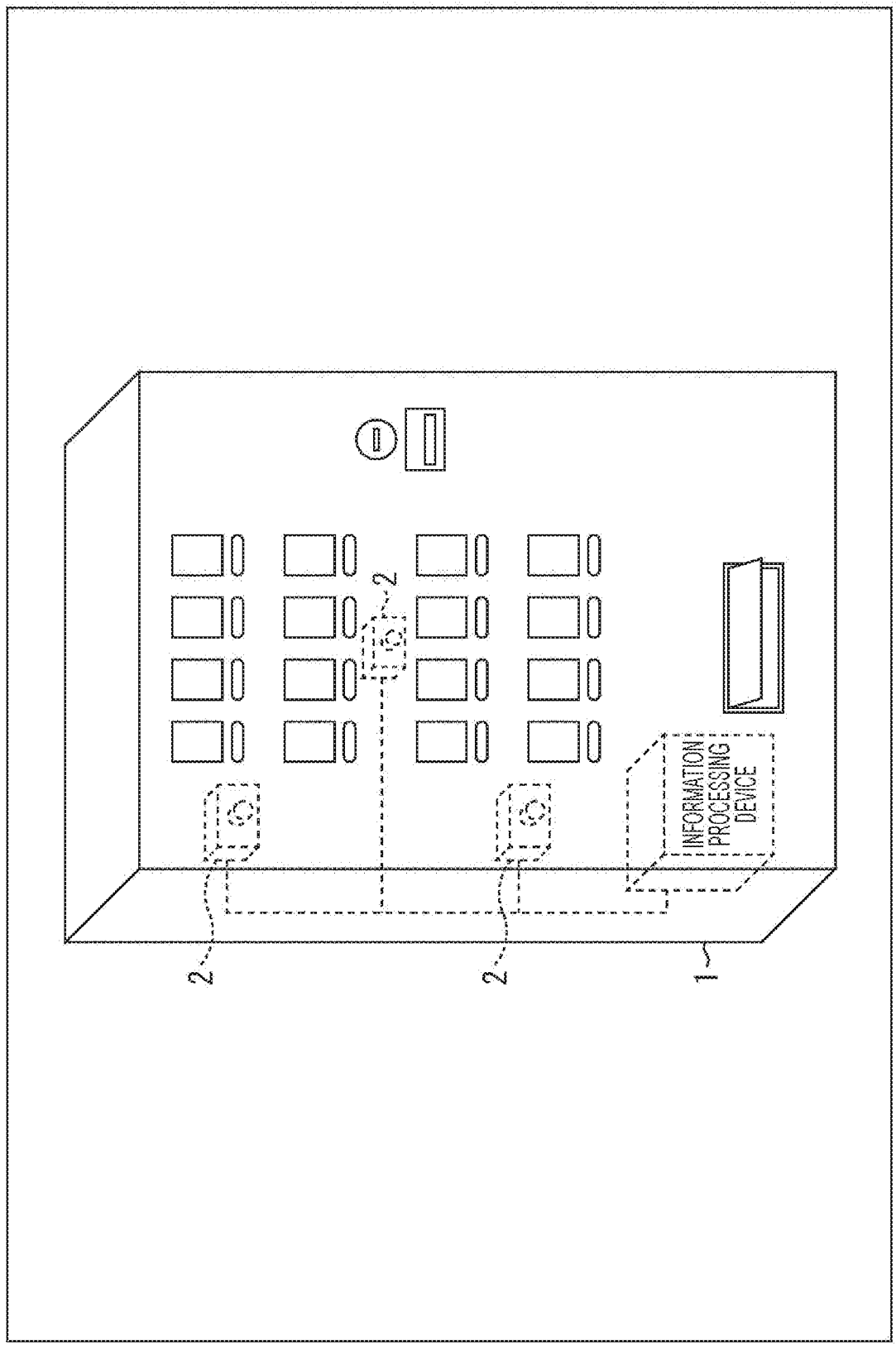
FIG. 1 is a diagram explaining an example of a conventional vending machine.

Conventionally, there has been considered collecting information associated with a product and a customer who purchases the product in a store and the like that sells the product. For example, Patent Document 1 discloses a vending machine 1, in which a camera 2 is installed, that picks up an image of a customer who purchases a product by using the camera 2, and collects the picked-up image as information associated with the customer (FIG. 1).

Figure 2:
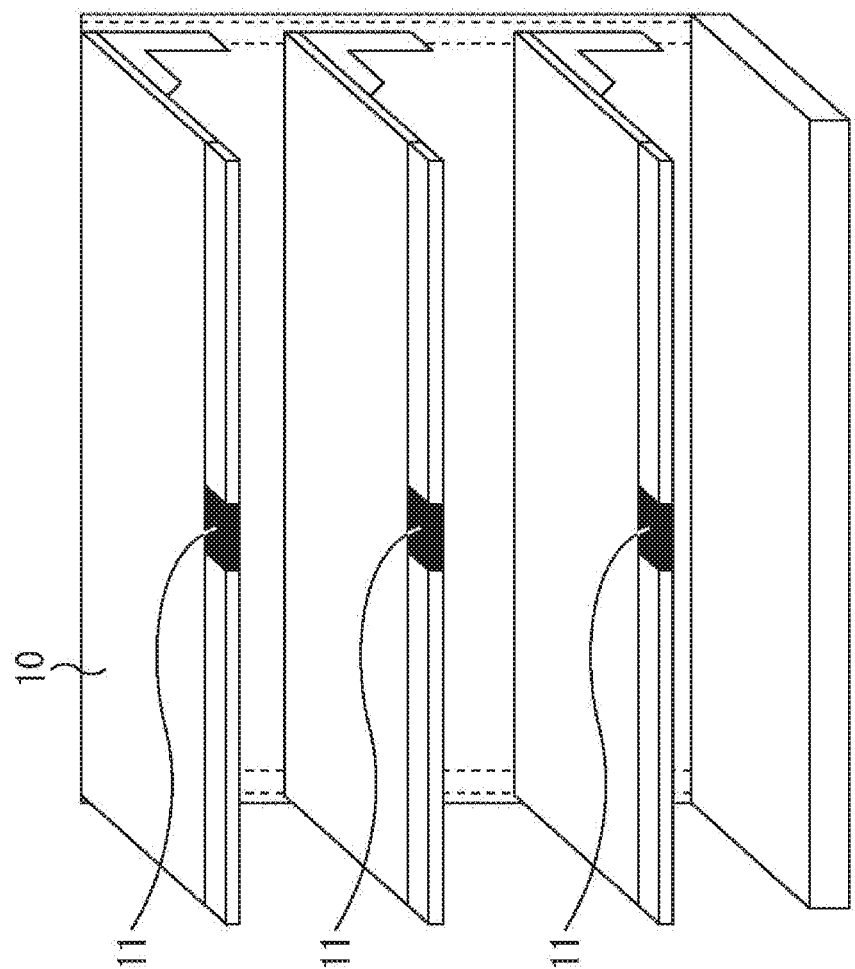
FIG. 2 is a diagram explaining an example of a conventional display shelf.

Furthermore, Patent Document 2 discloses a vending machine 1, in which a camera 11 is provided on each shelf of a display shelf 10 on which a product is displayed, that picks up an image of a customer around the display shelf 10 by using the camera 11, and collects the picked-up image as information associated with the customer (FIG. 2).

Figures 3A, 3B:
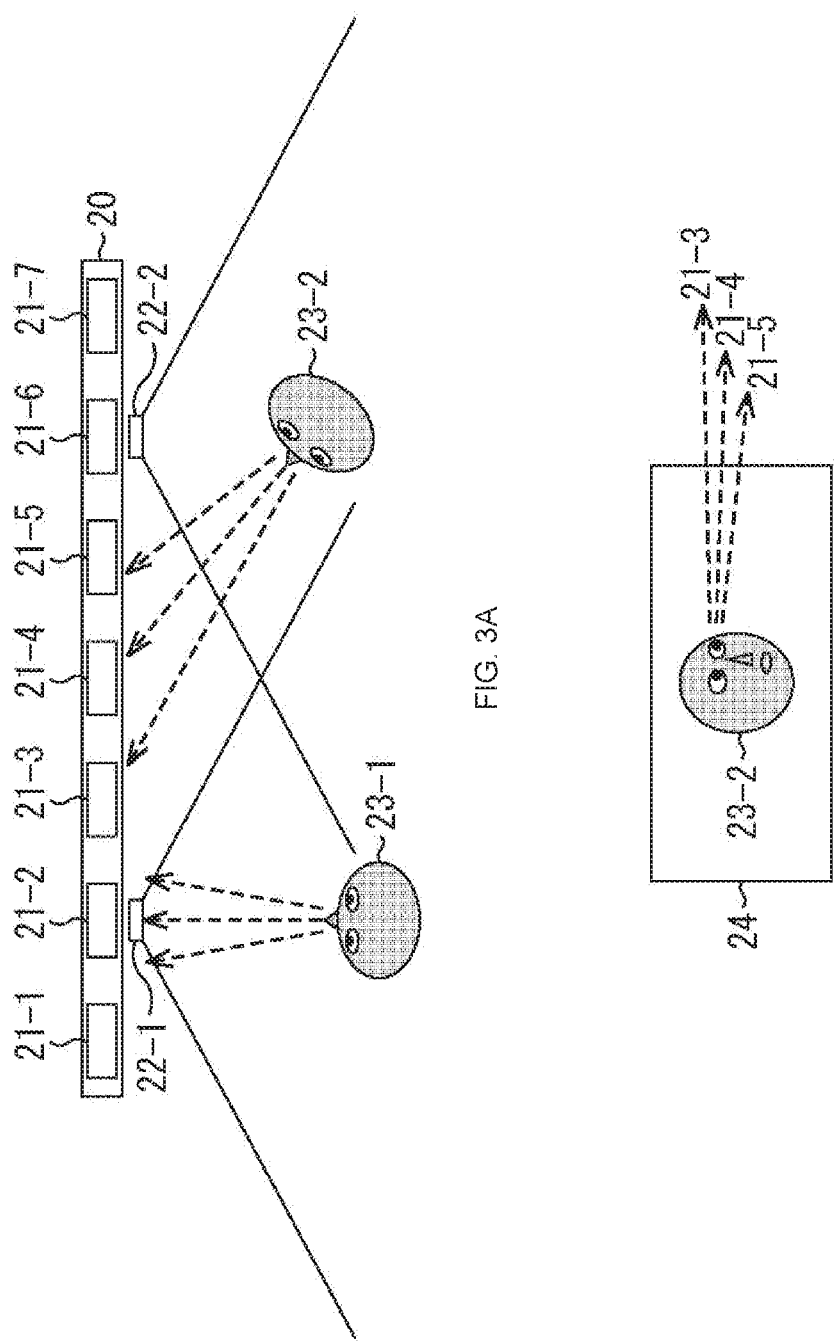
FIGS. 3A and 3B are diagrams explaining an example of conventional gaze estimation.

However, in a case of the above methods, the number of cameras is smaller than the number of product types. Therefore, it has been difficult to estimate, with high accuracy, which product is looked at by a customer from a picked-up image. A reason for the above will be described by using FIGS. 3A and 3B. Before that, definition of words used in the description of the present application will be described. Normally, a plurality of types of products are arranged on a display shelf of products (in other words, a store shelf), and a plurality of products (individuals) are arranged for each type of products as individuals of products. In the description of the present application, products that are only different from each other individually and have the same content in a case where they are referred to collectively will be referred to as a "product type". Furthermore, each of products that are different from each other individually in one product type will be referred to as a "product individual". However, for simplification, there is a case where a "product type" is simply referred to as a "product", and there is also a case where a "product individual" is simply referred to as a "product". FIG. 3A is a diagram showing a state in which, as an example of a conventional technology where the number of cameras is smaller than the number of product types, seven types of products (in other words, seven product types, 21-1 to 21-7) and two cameras (22-1 and 22-2) fewer than the number (seven) of the product types are arranged on a display shelf 20 on which products are displayed, and two customers (23-1 and 23-2) stand in front of the display shelf 20 and look at the products, when viewed from above the shelf. The camera 22-1 picks up an image of the customer 23-1 positioned in front of itself. Furthermore, the camera 22-2 picks up an image of the customer 23-2 positioned in front of itself. At this time, the customer 23-1 faces the front (toward the camera 22-1). For this reason, it is comparatively easy to estimate that the customer 23-1 looks in a direction of the product 21-2 based on a picked-up image obtained by the camera 22-1.

However, since the customer 23-2 looks to the side, a profile of the customer 23-2 is shown in a picked-up image obtained by the camera 22-2 like a picked-up image 24 shown in FIG. 3B. In FIG. 3A, an image of the customer 23-2 is not picked up by the camera 22-1, and picked up only by the camera 22-2. For this reason, in order to identify which of the products 21-3 to 21-5 described in FIG. 3A is looked at by the customer 23-2 whose image of a profile is picked up by the camera 22-2, it is necessary to estimate a product to which a gaze of the customer 23-2 extends on the basis of a slight difference in directions of the face of the customer 23-2 or a slight difference in positions of a pupil in an eyeball of the customer 23-2. For this reason, identifying a product looked at by a customer with high accuracy is accompanied by a technical difficulty. Besides, even if a product to which a gaze of the customer 23-2 extends is estimated, there has not been a means for verifying whether or not a result of the estimation is correct. Under the above circumstances, in a case of the conventional technology in which the number of cameras is smaller than the number of product types, it has been difficult to estimate with high accuracy which product is looked at by a customer, and verify whether or not an estimation result is correct.

Furthermore, if a plurality of cameras are installed, there has been possibility that the same person is shot by a plurality of cameras, and, in such a case, there has been possibility that information associated with the same customer is collected in a duplicate manner. A reason for the above will be described by using FIGS. 4A, 4B, 4C, and 4D. FIG. 4A is a diagram showing a state in which three customers (23-1 to 23-3) stand and look at products in front of the display shelf 20 on which seven types of products (21-1 to 21-7) and three cameras (22-1 to 22-3) are arranged when viewed from above the shelf. As shown in FIG. 4B, a picked-up image 24-1 obtained by the camera 22-1 shows the customer 23-1 and the customer 23-2. Furthermore, as shown in FIG. 4C, a picked-up image 24-2 obtained by the camera 22-2 shows the customer 23-1, the customer 23-2, and the customer 23-3. Moreover, as shown in FIG. 4D, a picked-up image 24-3 obtained by the camera 22-3 shows the customer 23-2 and the customer 23-3.

When customer information is directly collected from these picked-up images, customer information for seven customers are obtained where only three customers actually exist. That is, for example, there has been possibility that wrong information, such as "three customers look at the product 21-2", "two customers look at the product 21-3", "two customers look at the product 21-4", and the like, is collected. Accordingly, it has been difficult to collect information with high accuracy.

In view of the above, an information collection device that collects information associated with a customer or a product is included for each product type and in the vicinity of each product type. In this manner, the information collection device and a product type can be easily associated (in other words, linked), and a customer who is looking in a direction of the information collection device can be easily identified as looking at a product type corresponding to the information collection device. Furthermore, since a direction in which a customer faces can be easily identified with high accuracy, collection of duplicate customer information can easily be restricted. Accordingly, information with higher accuracy can be collected.

<Configuration of Information Collection System>

Figure 5:
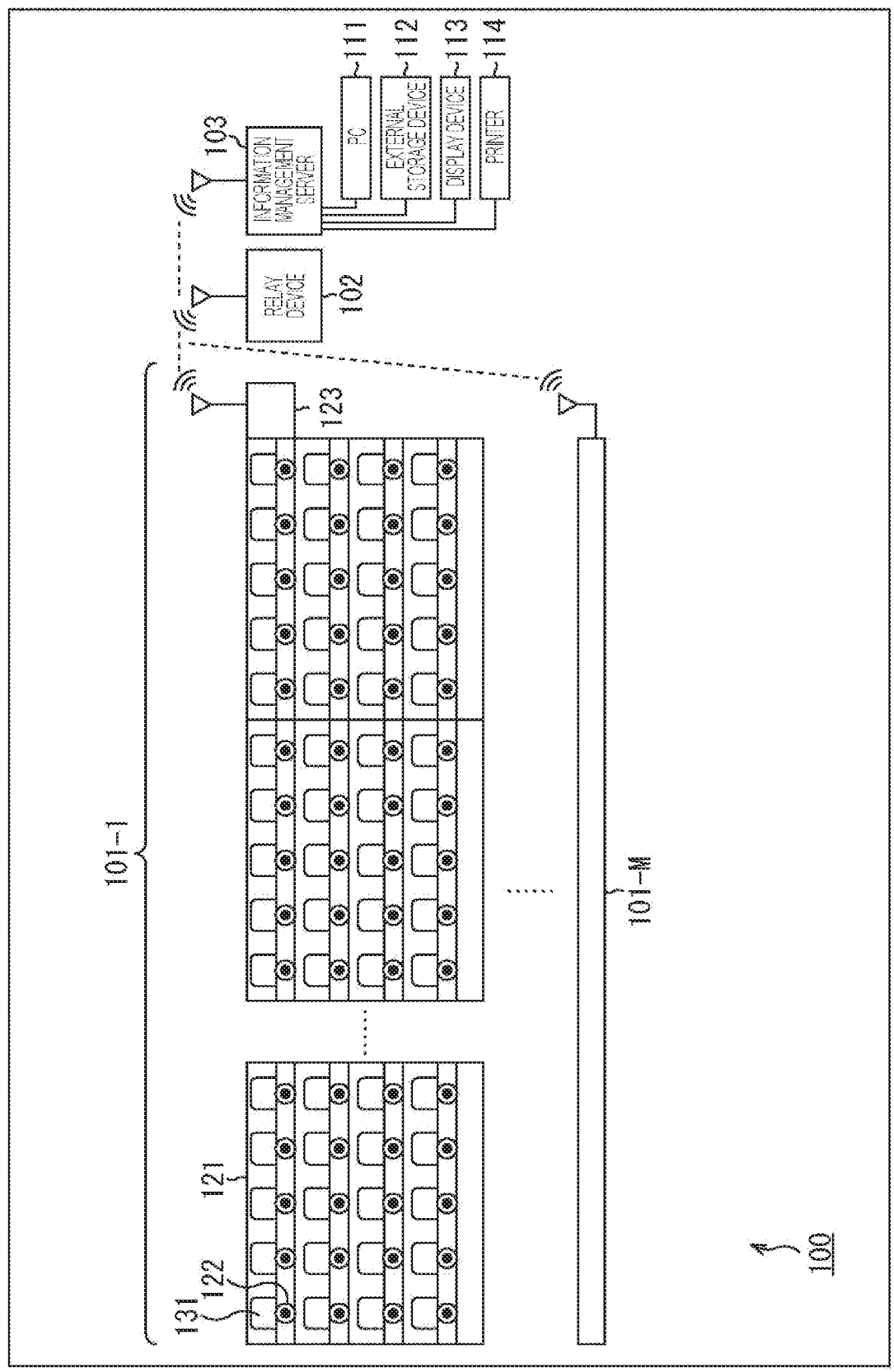
FIG. 5 is a diagram showing a main configuration example of an information collection system.

FIG. 5 is a diagram showing a main configuration example of an information collection system that is an embodiment of an information processing system to which the present technology is applied. An information collection system 100 shown in FIG. 5 is a system that collects information associated with a product and a customer.

As shown in FIG. 5, the information collection system 100 has shelf devices 101-1 to 101-M, a relay device 102, and an information management server 103. The shelf devices 101-1 to 101-M have configurations similar to each other. Hereinafter, the shelf devices 101-1 to 101-M will be referred to as the shelf device 101 in a case where the shelf devices 101-1 to 101-M do not need to be distinguished from each other.

The shelf device 101 has a plurality of product display shelves 121 that are arranged in a line in a horizontal direction. Products 131 are displayed, for example, for each product type on each of the product display shelves 121. Furthermore, an information collection device 122 that collects information associated with a product, a customer, and the like is installed for each product type in the vicinity of the product 131 on the product display shelf 121. Moreover, the shelf device 101 has a local server 123.

The information collection device 122 has a function of collecting information, and collects information associated with a product, a customer, and the like by using the function. The information collection device 122 is installed for each product type of the product display shelf 121 as well as in the vicinity of each product type. In other words, the information collection device 122 is installed in the vicinity of product types (the products 131) different from each other on the product display shelf 121. In this manner, for example, the information collection device 122 is associated (in other words, linked) with a product type (the product 131) by this positional relationship. That is, the information collection device 122 is associated with a product type (the product 131) positioned in the vicinity of the own device. Moreover, the configuration may be such that information associated with the product type (product 131) in the vicinity has been registered in the information collection device 122. The information collection device 122 collects information associated with a customer for a product type associate with the device itself (for example, a customer who shows an interest in the product type). That is, each of the information collection devices 122 is associated with a product type different from one another, and collects information associated with a customer for a product type different from one another.

Furthermore, the information collection device 122 has a communication function, and can perform wired communication or radio communication, or both, with the local server 123 by the communication function. For example, the information collection device 122 can supply information collected by the device itself to the local server 123. Furthermore, for example, the information collection device 122 can also acquire information from the local server 123.

Note that the information collection device 122 may have an information processing function. For example, the information collection device 122 may process information collected by the device itself, and supply the processed information to the local server 123. Furthermore, for example, the information collection device 122 may process information acquired from the local server 123.

The local server 123 has a communication function. The local server 123 can perform wired communication or radio communication, or both, with each of the information collection devices 122 of the shelf device 101 by the communication function. Furthermore, the local server 123 can perform wired communication or radio communication, or both, with the relay device 102 by the communication function. For example, the local server 123 can acquire information collected by each of the information collection devices 122 of the shelf device 101, and supply the information to the relay device 102. Furthermore, for example, the local server 123 can acquire information from the relay device 102, and supply the information to each of the information collection devices 122 of the shelf device 101.

Note that the local server 123 may have an information processing function. For example, the local server 123 may process information collected by each of the information collection devices 122 of the shelf device 101, and supply the processed information to the relay device 102. Furthermore, for example, the local server 123 may process information acquired from the relay device 102, and supply the processed information to each of the information collection devices 122 of the shelf device 101.

The relay device 102 has a communication function. The relay device 102 can perform wired communication or radio communication, or both, with (the local server 123 of) each of the shelf devices 101 by the communication function. Furthermore, the relay device 102 can perform wired communication or radio communication, or both, with the information management server 103 by the communication function. For example, the relay device 102 can acquire information that each of the information collection devices 122 collects from (the local server 123 of) each of the shelf devices 101, and supply the information to the information management server 103. Furthermore, for example, the relay device 102 can also acquire information from the information management server 103, and supply the information to (the local server 123 of) each of the shelf devices 101.

Note that the relay device 102 may have an information processing function. For example, the relay device 102 may process information collected by the information collection devices 122 that is acquired from (the local server 123 of) each of the shelf devices 101, and supply the processed information to the information management server 103. Furthermore, for example, the relay device 102 may process information acquired from the information management server 103, and supply the processed information to (the local server 123 of) each of the shelf devices 101.

The information management server 103 has a communication function. The information management server 103 can perform wired communication or radio communication, or both, with the relay device 102 by the communication function. For example, the information management server 103 can acquire information collected by the information collection devices 122 from the relay device 102. Furthermore, for example, the information management server 103 can also supply optional information to the relay device 102.

Furthermore, the information management server 103 has an information processing function and an information storing function. For example, the information management server 103 can process and store information acquired from the relay device 102. Moreover, the information management server 103 is connected to a personal computer (PC) 111, an external storage device 112, a display device 113, and a printer 114 as externally connected electronic equipment, and can also perform processing by using these pieces of the externally connected electronic equipment. For example, the information management server 103 can cause the personal computer 111 to process information, the external storage device 112 to store information, the display device 113 to display an image, and the printer 114 to print out information.

Figure 6:
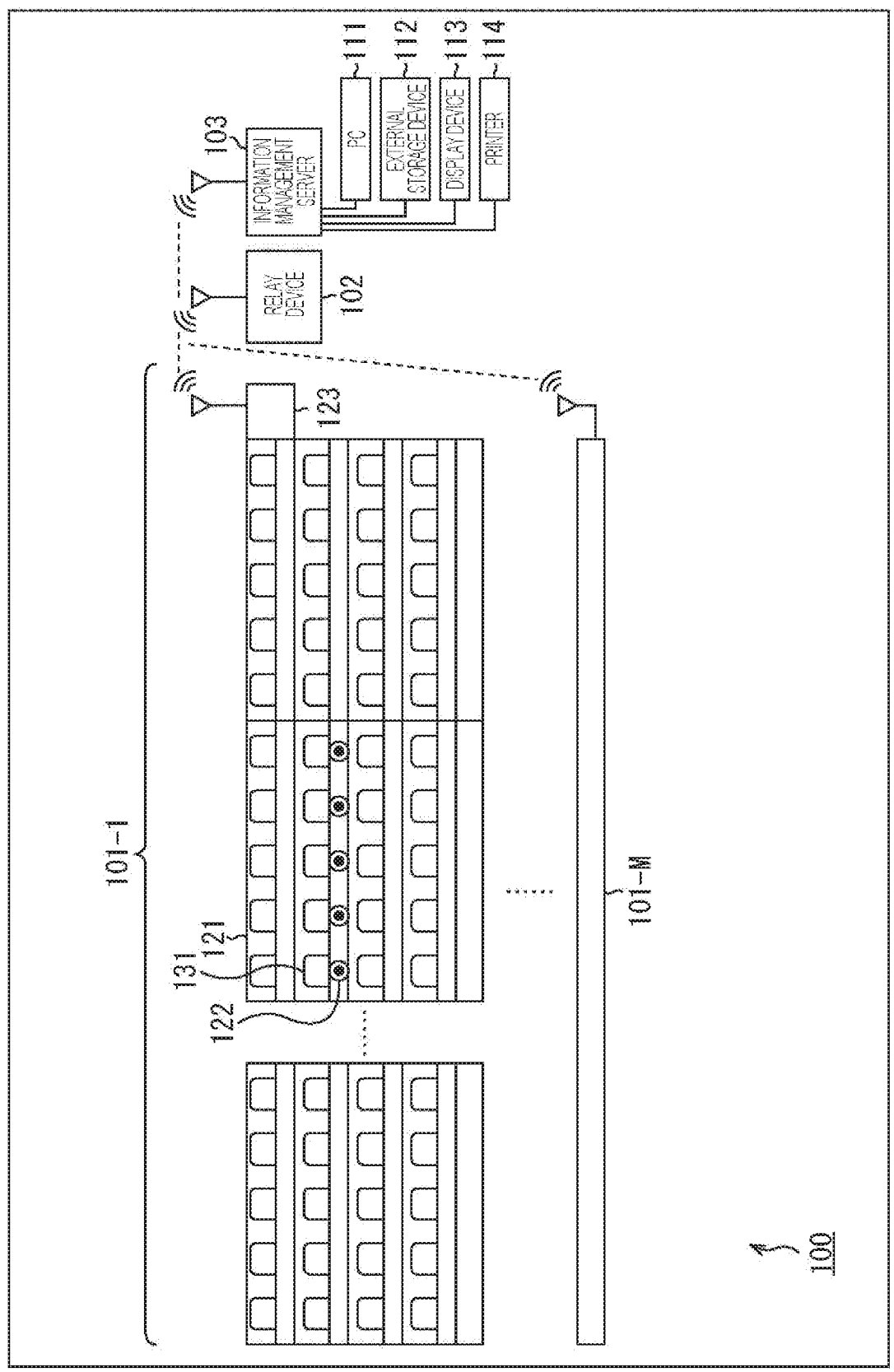
FIG. 6 is a diagram showing another configuration example of the information collection system.

Note that a configuration of the information collection system 100 is optional, and is not limited to the example of FIG. 5. For example, as shown in FIG. 6, the configuration may be such that the information collection devices 122 is provided only for a product type for which information needs to be collected (that is, only for a product type as part of a group of products displayed on the product display shelf 121). Also in a case where a plurality of product types for which information needs to be collected exist, the information collection devices 122 is installed for each of the product types.

Note that the configuration may be such that, while the information collection system 100 includes the information collection devices 122 that are larger in number than product types for which information needs to be collected, information output from the information collection system 100 is narrowed down only to information for the product types for which information needs to be collected and output to the outside of the information collection system 100.

For example, the configuration may be such that (1) the information collection system 100, in which the information collection device 122 is arranged for each of product types that are larger in number than product types for which information needs to be collected, transmits image data obtained by picking up an image of product types larger in number than product types for which information needs to be collected or analysis result data after image analysis to the information management server 103 via the local server 123 and the relay device 102 from the information collection devices 122, and the information management server 103 performs processing for narrowing down information to be output to the outside of the information collection system 100 only to information associated with product types for which information needs to be output, and outputs the narrowed-down information to the outside of the information collection system 100.

Furthermore, the configuration may alternatively be such that (2) the information collection system 100, in which the information collection device 122 is arranged for each of product types that are larger in number than product types for which information needs to be collected, transmits image data obtained by picking up an image of product types larger in number than product types for which information needs to be collected or analysis result data after image analysis to the relay device 102 via the local server 123 from the information collection devices 122, and the relay device 102 performs processing for narrowing down information to be output to the outside of the information collection system 100 only to information associated with product types for which information needs to be output, and outputs the narrowed-down information to the outside of the information collection system 100 via the information management server 103.

Furthermore, the configuration may alternatively be such that (3) the information collection system 100, in which the information collection device 122 is arranged for each of product types that are larger in number than product types for which information needs to be collected, transmits image data obtained by picking up an image of product types larger in number than product types for which information needs to be collected or analysis result data after image analysis to the local server 123 from the information collection devices 122, and the local server 123 performs processing for narrowing down information to be output to the outside of the information collection system 100 only to information associated with product types for which information needs to be output, and outputs the narrowed-down information to the outside of the information collection system 100 via the relay device 102 and the information management server 103.

Furthermore, the configuration may alternatively be such that (4) the information collection system 100 includes the information collection device 122 arranged for each of product types that are larger in number than product types for which information needs to be collected, and each of the information collection devices 122 performs processing for narrowing down information to be transmitted from the information collection devices 122 to the local server 123 only to information associated with product types that need to be output to the outside of the information collection system 100, and outputs the narrowed-down information to the outside of the information collection system 100 via the local server 123, the relay device 102, and the information management server 103.

That is, the number of the information collection devices 122 that collect information associated with a customer and a product may be larger than or the same as the number of product types for which information associated with a customer is collected, may be larger than or the same as the number of product types in information for each product transferred to the information management server 103, or may be larger than or the same as the number of product types for which information associated with a customer is output.

In the above manner, an amount of information to be handled can be restricted. Therefore, increase in a load of a variety of types of processing relating to the information collection can be restricted. Moreover, increase in cost can also be restricted.

<Information Collection Device>

The information collection devices 122 shown in FIGS. 5 and 6 may be any device, and information to be collected may be any information as long as the information is associated with a product or a customer. For example, the configuration may be such that the information collection device 122 picks up an image of a product or a customer, and an obtained picked-up image or information obtained on the basis of the picked-up image is collected as information associated with a product or a customer. Furthermore, the configuration may be such that sensing is performed for a product or a customer by using some sensor, and an obtained sensor output or information obtained on the basis of the sensor output is collected as information associated with a product or a customer. Furthermore, the configuration may be such that the information collection device 122 collects a plurality of types of information (for example, a picked-up image and a sensor output) as information associated with a product or a customer.

Figure 7C:
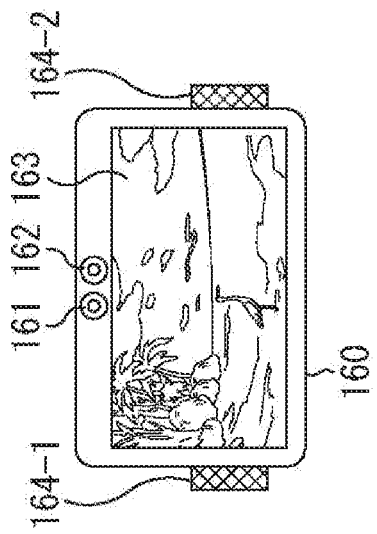
Figure 7B:
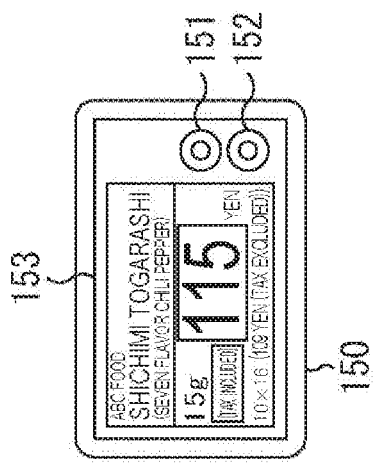
Figure 7A:
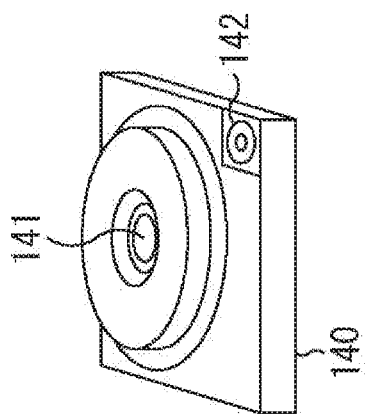

For example, the information collection device 122 may be configured as a network camera 140 as shown in FIG. 7A. The network camera 140 has an image sensor 141 and a ranging sensor 142. For example, the image sensor 141 is an image sensor using a charge coupled device (CCD) and a complementary metal oxide semiconductor (CMOS), and picks up an image of an object and generates (data of) a picked-up image of the object. Note that the image sensor 141 may have an optical mechanism, such as a lens, a diaphragm, and the like. The ranging sensor 142 is a sensor that measures a distance to an object. The specifications of the ranging sensor 142 is optional, and the ranging sensor 142 may measure a distance by any method. For example, the ranging sensor 142 may measure a distance by using an infrared ray. Furthermore, the network camera 140 has a communication function (not shown).

For example, the network camera 140 can pick up an image of a customer by using the image sensor 141, measure a distance to the customer by using the ranging sensor 142, and supply these pieces of information (a picked-up image, a distance measurement result, and the like) as information associated with the customer to the local server 123 by the communication function. Furthermore, for example, the network camera 140 can pick up an image of an external form of an associated product, a barcode, a character describing a product name, and the like by using the image sensor 141, and supply the picked-up image as information associated with the product to the local server 123 by the communication function.

Furthermore, for example, the information collection devices 122 may have a function of outputting information. For example, the information collection device 122 may have a function of displaying a character, an image, and the like. Furthermore, the information collection device 122 may have a function of outputting voice, vibration, and the like. As a matter of course, the information collection device 122 may be configured to be able to output a plurality of types of information (for example, an image, a voice, and the like). Note that the information to be output is optional. For example, the information may be information associated with a product or a customer, or information that is not associated with a product or a customer.

For example, the information collection device 122 may be configured as an electronic shelf label 150 as shown in FIG. 7B. The electronic shelf label 150 is a device that displays information associated with a product, such as a price of a product, and the like. As shown in FIG. 7B, the electronic shelf label 150 has an image sensor 151, a ranging sensor 152, and a monitor 153. The image sensor 151 is a sensor basically similar to the image sensor 141, and picks up an image of an object to obtain a picked-up image. The ranging sensor 152 is a sensor basically similar to the ranging sensor 142, and measures a distance by using, for example, an infrared ray and the like. The monitor 153 is a display device that displays character information and the like. Furthermore, the electronic shelf label 150 has a communication function (not shown).

For example, the electronic shelf label 150 can pick up an image of a customer by using the image sensor 151, measure a distance to the customer by using the ranging sensor 152, and supply these pieces of information (a picked-up image, a distance measurement result, and the like) as information associated with the customer to the local server 123 and the like by the communication function. Furthermore, for example, the electronic shelf label 150 can picks up an image of an external form of an associated product, a barcode, a character describing a product name, and the like by using the image sensor 151, and supply the picked-up image as information associated with the product to the local server 123 and the like by the communication function.

Furthermore, for example, the electronic shelf label 150 can acquire information associated with a product from the local server 123 and the like by the communication function, and causes the monitor 153 to display the information associated with the product as character information and the like. A content of the information associated with a product is optional. For example, information of a product name, a price, a content amount, and the like may be included in the information associated with a product.

Furthermore, for example, the information collection devices 122 may be configured as an electronic point of purchase (POP) advertising 160 as shown in FIG. 7C. The electronic POP advertising 160 is a device that displays information associated with a product, such as an advertisement of a product, and the like. As shown in FIG. 7C, the electronic POP advertising 160 has an image sensor 161, a ranging sensor 162, a monitor 163, and speakers 164-1 and 164-2. The image sensor 161 is a sensor basically similar to the image sensor 141, and picks up an image of an object to obtain a picked-up image. The ranging sensor 162 is a sensor basically similar to the ranging sensor 142, and measures a distance by using, for example, an infrared ray and the like. The monitor 163 is a display device that displays optional image information, such as video, a still image, or the like. Furthermore, the monitor 163 may display optional image information, such as video, a still image, or the like in an area in part of a screen, and display character information in an area on the screen different from the above area. Alternatively, the monitor 163 may display only character information. Note that, needless to say, image information displayed by the monitor 163 may include character information. The speakers 164-1 and 164-2 are voice output devices that output voice. Note that the speakers 164-1 and 164-2 will be referred to as the speaker 164 in a case where the speakers do not need to be distinguished from each other. Furthermore, the electronic POP advertising 160 has a communication function (not shown).

For example, the electronic POP advertising 160 can pick up an image of a customer by using the image sensor 161, measure a distance to the customer by using the ranging sensor 162, and supply these pieces of information (a picked-up image, a distance measurement result, and the like) as information associated with the customer to the local server 123 and the like by the communication function. Furthermore, for example, the electronic POP advertising 160 can pick up an image of an external form of an associated product, a barcode, a character describing a product name, and the like by using the image sensor 161, and supply the picked-up image as information associated with the product to the local server 123 and the like by the communication function.

Furthermore, for example, the electronic POP advertising 160 can acquire information associated with a product from the local server 123 and the like by the communication function, and causes the monitor 163 to display the information associated with the product as moving images, a static image, a character, or the like. A content of the information associated with a product is optional. For example, information of a product name, a price, a content amount, and the like may be included in the information associated with a product. Furthermore, for example, the information may be advertisement video and the like of a product. Furthermore, the electronic POP advertising 160 can cause information associated with a product acquired from the local server 123 to be output as voice from the speaker 164.

Note that, although illustration is omitted, for example, the information collection device 122 may be configured as a character information display device, such as an electric bulletin board. This electric bulletin board is a device that displays optional character information, and can display, for example, character information, such as an advertising message of a product, a guidance for a selling area, and the like. In this case as well, the information collection device 122 further has an information collection function, such as an image sensor, a ranging sensor, and the like, as similar to the cases of the electronic shelf label 150 and the electronic POP advertising 160 described above, and collects information associated with a product and a customer. Furthermore, the information collection device 122 also has a communication function (not shown), and can supply collected information to the local server 123 and the like, and acquire optional information from the local server 123 and the like. Note that, in this case as well, like the case of the electronic POP advertising 160, the information collection device 122 may be configured to have a function of outputting information other than an image, for example, a speaker and the like.

<Configuration of Each Device>

Figure 8:
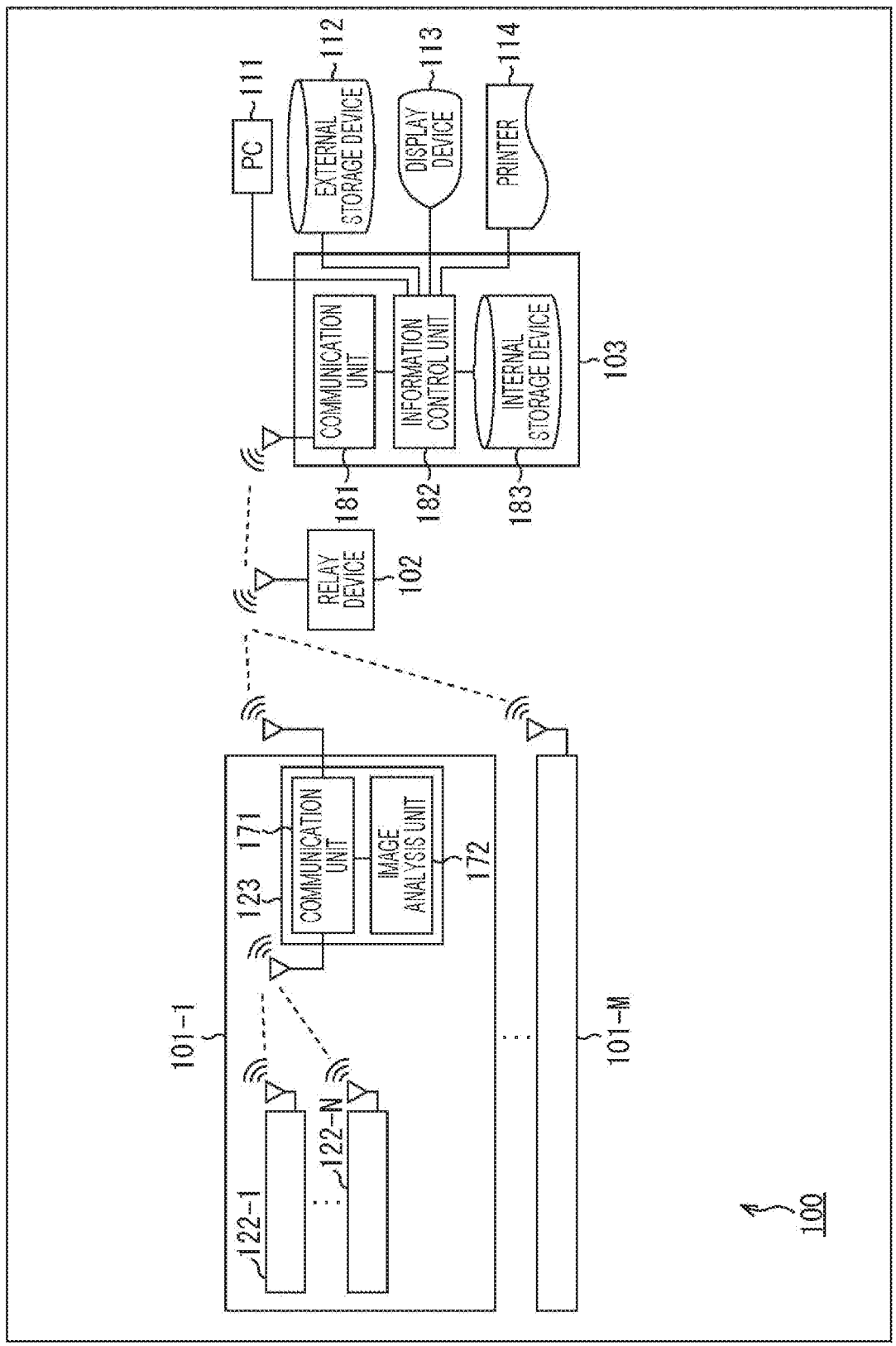
FIG. 8 is a block diagram showing a main configuration example of each device of the information collection system.

FIG. 8 shows a main configuration example of the local server 123 and the information management server 103 of the information collection system 100. In a case of the example of FIG. 8, the local server 123 has a communication unit 171 and an image analysis unit 172. The communication unit 171 performs processing for performing a communication function of the local server 123 described above. In other words, the communication unit 171 performs wired communication or radio communication, or both, with each of the information collection devices 122 (the information collection devices 122-1 to 122-N) of the shelf device 101 and the relay device 102. Furthermore, the image analysis unit 172 analyzes a picked-up image included in information that the communication unit 171 acquires from the information collection devices 122, and supplies a result of the image analysis to the communication unit 171. For example, the image analysis unit 172 identifies which product is looked at by a customer by analyzing a picked-up image, and estimates attributes (gender, age, and the like) of a customer. The communication unit 171 supplies information acquired from the information collection devices 122 and a result of image analysis performed by the image analysis unit 172 to the relay device 102.

Furthermore, in a case of the example of FIG. 8, the information management server 103 has a communication unit 181, an information control unit 182, and an internal storage device 183. The communication unit 181 performs processing for performing a communication function of the information management server 103 described above. The information control unit 182 controls other processing units, externally connected devices, and the like, and processes information. For example, the information control unit 182 performs processing, such as reading and writing information received or transmitted by the communication unit 181 in the internal storage device 183 and the external storage device 112, outputting the information to the display device 113 and the printer 114, providing or receiving the information to or from the personal computer 111, and the like.

Figure 9A:
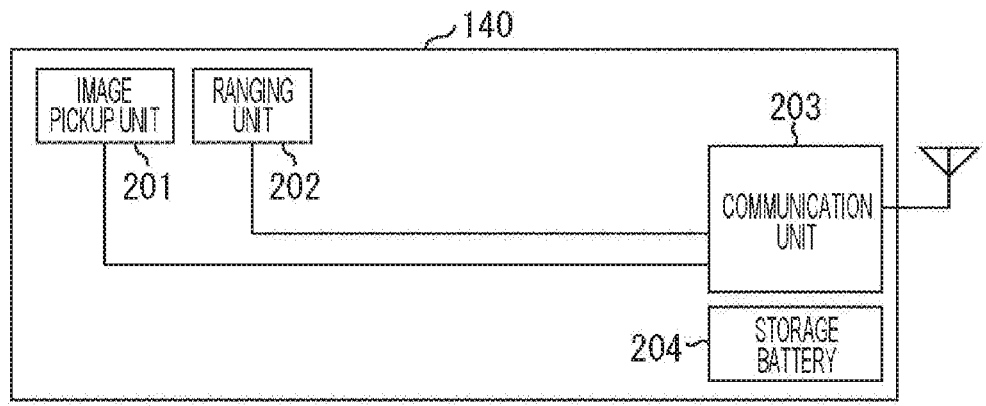

FIGS. 9A, 9B, 9C, and 9D show a main configuration example of the information collection device 122. FIG. 9A is a block diagram showing a configuration example in a case where the information collection device 122 is configured as the network camera 140. As shown in FIG. 9A, the network camera 140 has an image pickup unit 201, a ranging unit 202, and a communication unit 203. The image pickup unit 201 has the image sensor 141, and performs processing relating to image pickup of an object. The ranging unit 202 has the ranging sensor 142, and performs processing relating to measurement of a distance to an object. The communication unit 203 performs processing for performing the communication function of the network camera 140 described above. For example, the communication unit 203 supplies data, such as a picked-up image obtained by the image pickup unit 201, a distance measurement result obtained by the ranging unit 202, and the like as information associated with a customer and a product to the local server 123. Note that the network camera 140 may have a storage unit 204 that stores electric power, so that each processing unit is driven by using power of the storage unit 204. As a matter of course, the configuration may be such that the storage unit 204 is omitted, and each processing unit is driven by using power supplied from an external power supply.

Figure 9B:
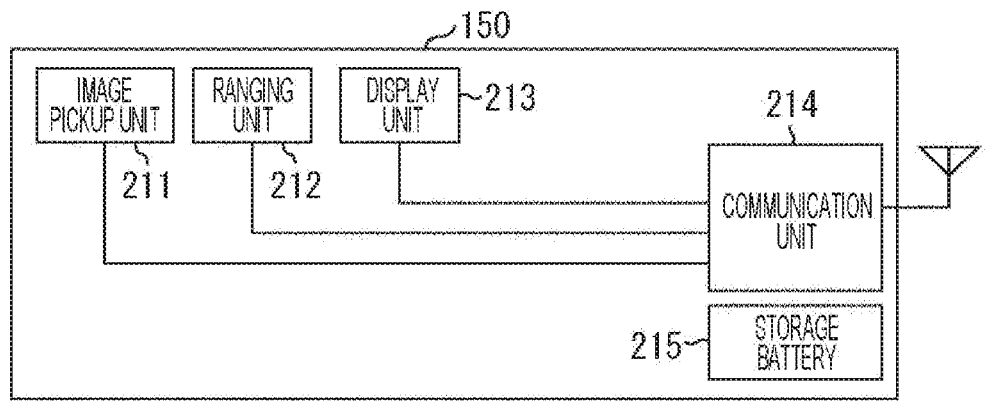

FIG. 9B is a block diagram showing a configuration example in a case where the information collection device 122 is configured as the electronic shelf label 150. As shown in FIG. 9B, the electronic shelf label 150 has an image pickup unit 211, a ranging unit 212, a display unit 213, and a communication unit 214. The image pickup unit 211 has the image sensor 151, and performs processing relating to image pickup of an object. The ranging unit 212 has the ranging sensor 152, and performs processing relating to measurement of a distance to an object. The display unit 213 has the monitor 153, and performs processing relating to display of character information relating to a product. The communication unit 214 performs processing for performing the communication function of the electronic shelf label 150 described above. For example, the communication unit 214 supplies data, such as a picked-up image obtained by the image pickup unit 211, a distance measurement result obtained by the ranging unit 212, and the like as information associated with a customer and a product to the local server 123. Furthermore, the communication unit 214 acquires, for example, character information relating to a product from the local server 123, and supplies the character information to the display unit 213. Note that the electronic shelf label 150 may have a storage unit 215 that stores electric power, so that each processing unit is driven by using power of the storage unit 215. As a matter of course, the configuration may be such that the storage unit 215 is omitted, and each processing unit is driven by using power supplied from an external power supply.

Figure 9C:
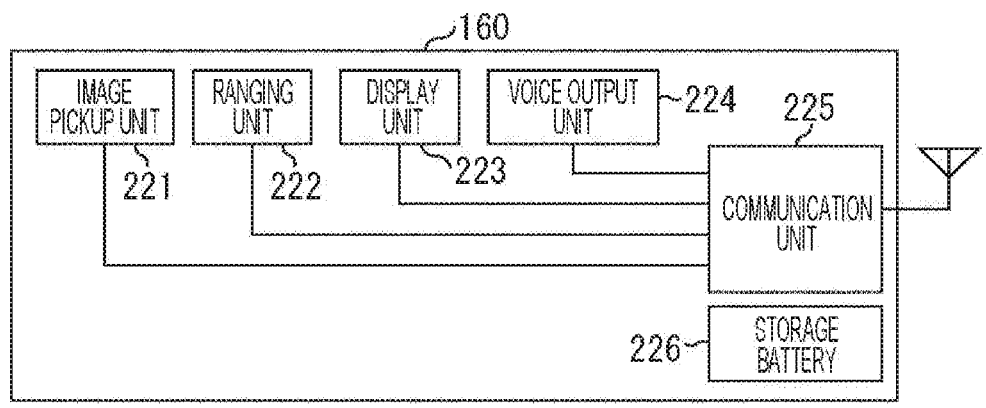

FIG. 9C is a block diagram showing a configuration example in a case where the information collection device 122 is configured as the electronic POP advertising 160. As shown in FIG. 9C, the electronic POP advertising 160 has an image pickup unit 221, a ranging unit 222, a display unit 223, a voice output unit 224, and a communication unit 225. The image pickup unit 221 has the image sensor 161, and performs processing relating to image pickup of an object. The ranging unit 222 has the ranging sensor 162, and performs processing relating to measurement of a distance to an object. The display unit 223 has the monitor 163, and performs processing relating to display of character information relating to a product. The voice output unit 224 has the speaker 164, and performs processing relating to voice output. The communication unit 225 performs processing for performing a communication function of the electronic POP advertising 160 described above. For example, the communication unit 225 supplies data, such as an picked-up image obtained by the image pickup unit 221, a distance measurement result obtained by the ranging unit 222, and the like as information associated with a customer and a product to the local server 123. Furthermore, the communication unit 225 acquires data of an image and voice relating to a product, for example, an advertisement of a product and the like, from the local server 123, supplies the image data to the display unit 223 and supplies the voice data to the voice output unit 224. Note that the electronic POP advertising 160 may have a storage unit 226 that stores electric power, so that each processing unit is driven by using power of the storage unit 226. As a matter of course, the configuration may be such that the storage unit 226 is omitted, and each processing unit is driven by using power supplied from an external power supply.

<Information to be Collected>

Information to be collected in the information collection system 100 is optional. For example, information as shown in FIG. 10 may be collected. In a case of the example of FIG. 10, information of a time at which a customer looks at a product, a time period in which a customer looks at a product, a distance between a customer and a product (which may be the information collection devices 122 or the product display shelf 121), attributes of a customer, such as gender, age, and the like, whether or not a customer picks up a product, whether or not a customer returns a picked-up product to the product display shelf 121, and the like is collected for each product.

As a matter of course, the configuration is not limited to the above example, and any information may be collected. However, for example, information used for analysis, a sales promotion activity, and the like as marketing information is preferably collected. With the information collection system 100 collecting more useful information, not only usability of information collection can be improved, but also an effect obtained by applying the present technology can be made larger.

<Information to be Transmitted>

The information collection system 100 generates information as exemplified in FIG. 10 by analyzing information (for example, a picked-up image, and the like) collected by the information collection device 122. This analysis processing can be performed by an optional device in the information collection system 100.

For example, in a case where the information collection system 100 has the configuration shown in FIG. 8 (described again in FIG. 11A), the analysis processing may be performed by the local server 123 (first mode), the relay device 102 (the second mode), or the information management server 103 (the third mode) as specified in a table shown in FIG. 11B. Like the table shown in FIG. 11B, in a case of the first mode, data of a picked-up image is transmitted between the information collection devices 122 and the local server 123, and data of a result of image analysis is transmitted between the local server 123 and the relay device 102, and between the relay device 102 and the information management server 103. Furthermore, in a case of the second mode, data of a picked-up image is transmitted between the information collection devices 122 and the local server 123, and between the local server 123 and the relay device 102, and data of a result of image analysis is transmitted between the relay device 102 and the information management server 103. Moreover, in a case of the third mode, data of a picked-up image is transmitted between the information collection devices 122 and the local server 123, between the local server 123 and the relay device 102, and between the relay device 102 and the information management server 103.

Note that the image analysis described above may be performed by the information collection device 122. In such a case, data of a result of the image analysis is transmitted between the information collection device 122 and the local server 123, between the local server 123 and the relay device 102, and between the relay device 102 and the information management server 103.

Furthermore, a frame rate at which image data is transmitted (transmission frame rate) is optional. For example, the frame rate may be around 30 frames per second (fps), or around several fps (1 or 2 fps). Furthermore, the transmission frame rate may be set as appropriate in accordance with the number of image sensors or the number of pixels so that an image can be transmitted appropriately between devices.

Note that the configuration of the information collection system 100 is optional, and is not limited to the example of FIG. 8. For example, as shown in FIG. 12A, the configuration may be such that the local server 123 of each of the shelf devices 101 is omitted, and the information collection device 122 and the relay device 102 perform wired communication or radio communication, or both.

Figures 12A, 12B:
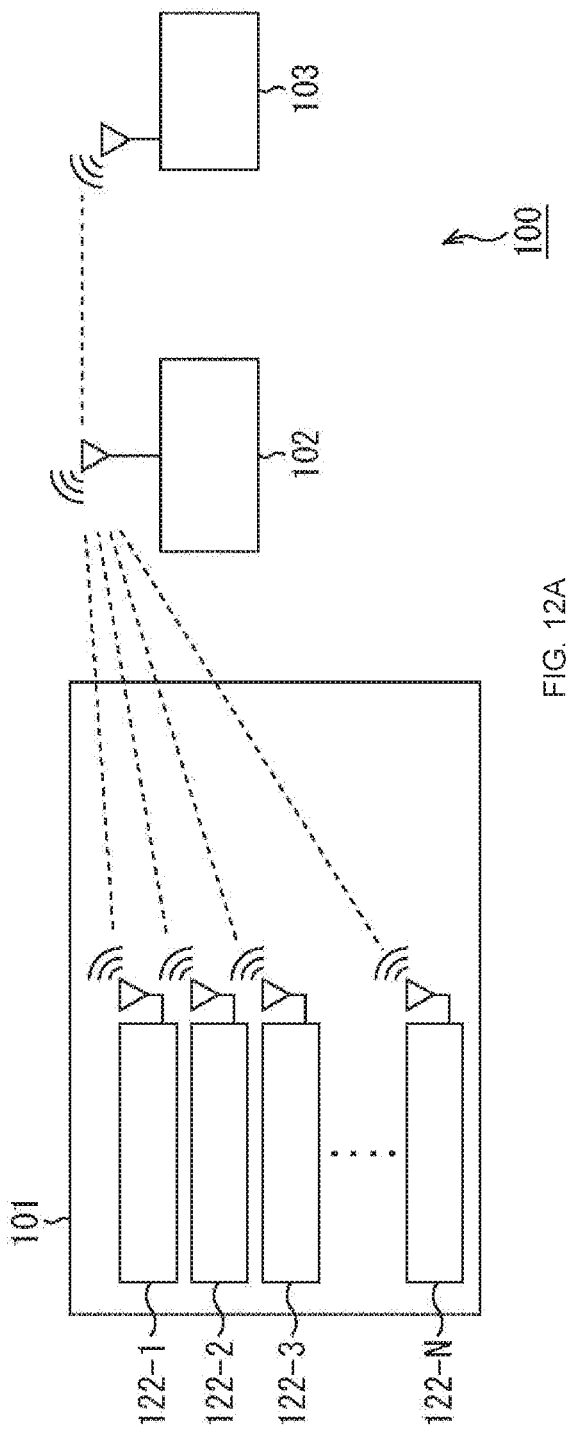
FIGS. 12A and 12B are diagrams explaining a configuration example of the information collection system and an example of a state of information collection.

In this case, the analysis processing described above may be performed by the relay device 102 (first mode) or the information management server 103 (the second mode) as in a table shown in FIG. 12B. Like the table shown in FIG. 12B, in a case of the first mode, data of a picked-up image is transmitted between the information collection device 122 and the relay device 102, and data of a result of the image analysis is transmitted between the relay device 102 and the information management server 103. Furthermore, in a case of the second mode, data of a picked-up image is transmitted either between the information collection device 122 and the relay device 102 and between the relay device 102 and the information management server 103.

Note that, in this case as well, the image analysis described above may be performed by the information collection device 122. In such a case, data of a result of the image analysis is transmitted either between the information collection device 122 and the relay device 102 and between the relay device 102 and the information management server 103.

Furthermore, in this case as well, a transmission frame rate of image data is optional. The transmission frame rate may be set as appropriate in accordance with the number of image sensors and the number of pixels.

Furthermore, for example, as shown in FIG. 13A, the configuration may be such that the relay device 102 is omitted, and the local server 123 and the information management server 103 of each of the shelf devices 101 perform wired communication or radio communication, or both.

In this case, the analysis processing described above may be performed by the local server 123 (first mode) or the information management server 103 (the second mode) as in a table shown in FIG. 13B. Like the table shown in FIG. 13B, in a case of the first mode, data of a picked-up image is transmitted between the information collection device 122 and the local server 123, and data of a result of the image analysis is transmitted between the local server 123 and the information management server 103. Furthermore, in a case of the second mode, data of a picked-up image is transmitted either between the information collection device 122 and the local server 123 and between the local server 123 and the information management server 103.

Note that, in this case as well, the image analysis described above may be performed by the information collection device 122. In such a case, data of a result of the image analysis is transmitted either between the information collection device 122 and the local server 123 and between the local server 123 and the information management server 103.

Furthermore, in this case as well, a transmission frame rate of image data is optional. The transmission frame rate may be set as appropriate in accordance with the number of image sensors and the number of pixels.

Furthermore, for example, as shown in FIG. 14A, the configuration may be such that the local server 123 and the relay device 102 are omitted, and the information collection device 122 of each of the shelf devices 101 and the information management server 103 perform wired communication or radio communication, or both.

In this case, the analysis processing described above may be performed by the information management server 103 (first mode) as in a table shown in FIG. 14B. Like the table shown in FIG. 14B, in a case of the first mode, data of a picked-up image is transmitted between the information collection device 122 and the information management server 103.

Note that, in this case as well, the image analysis described above may be performed by the information collection device 122. In such a case, data of a result of the image analysis is transmitted between the information collection device 122 and the information management server 103.

Furthermore, in this case as well, a transmission frame rate of image data is optional. The transmission frame rate may be set as appropriate in accordance with the number of image sensors and the number of pixels.

<Power Supply>

Figure 15:
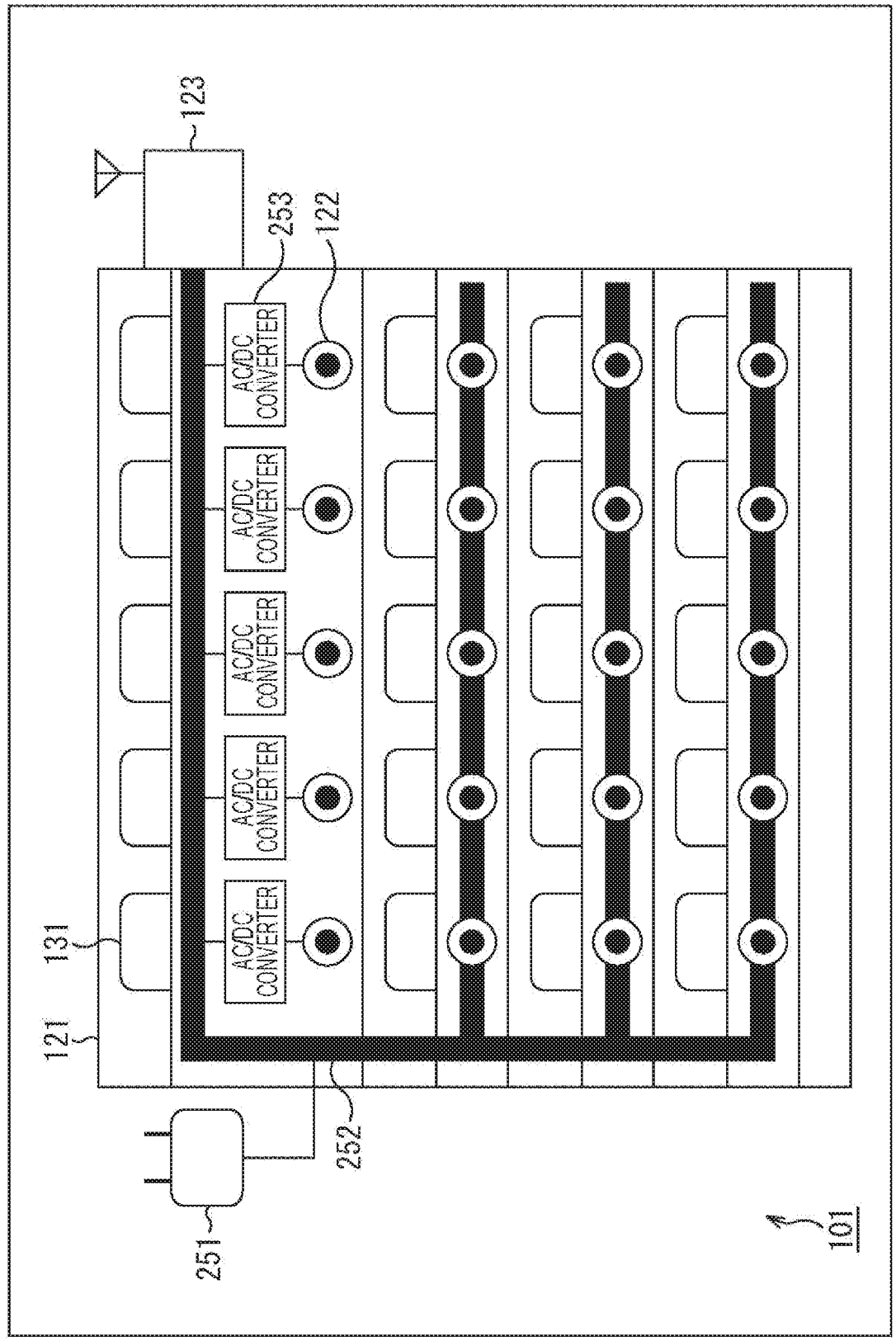
FIG. 15 is a diagram showing an example of a power supply structure.

Next, power supply to the information collection device 122 will be described. The power supply to the information collection device 122 may be performed from an external power supply. In such a case, for example, a configuration as shown in FIG. 15 may be employed. In a case of the example of FIG. 15, a plug 251 is connected to an external AC power supply. Furthermore, a lighting busway (JIS C8366) 252 is arranged in a horizontal direction along a front surface of each shelf of the product display shelf 121. Furthermore, an AC/DC converter 253 that converts an AC power supply to a DC power supply is provided between the lighting busway 252 and each of the information collection devices 122. Then, an external AC power supply is supplied via the plug 251 and the lighting busway 252, converted to a DC power supply by the AC/DC converter 253, and the DC power supply is supplied to each of the information collection devices 122.

Figure 16:
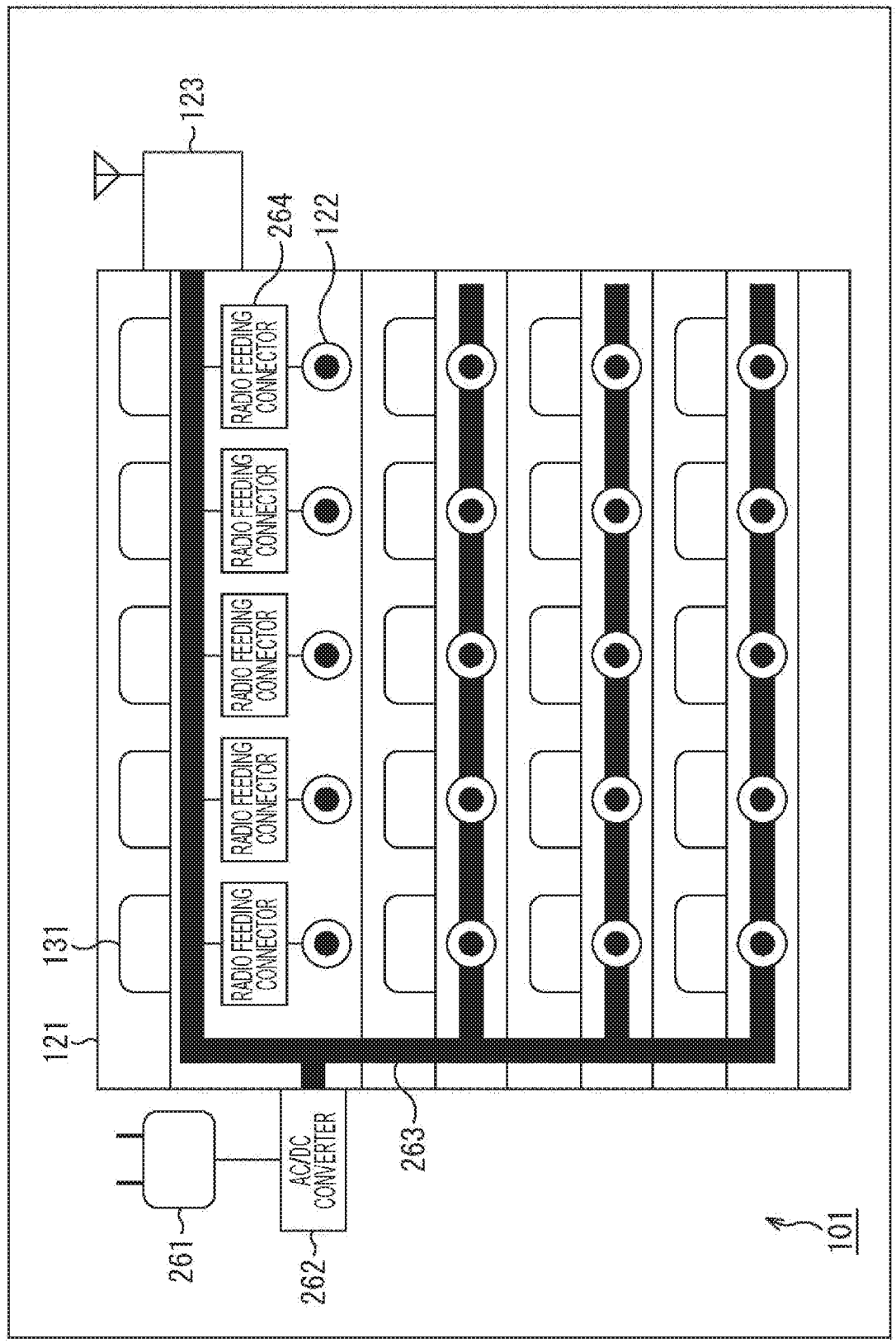
FIG. 16 is a diagram showing an example of the power supply structure.

Furthermore, a configuration as shown in FIG. 16 may be employed. In a case of the example of FIG. 16, a plug 261 is connected to an external AC power supply. Furthermore, the plug 261 is connected to a radio feeding cable 263 via an AC/DC converter 262. The radio feeding cable 263 is installed along each shelf of the product display shelf 121 to be connected to a base unit 264 of a connector for radio power feeding that is arranged in each location on a front surface of each shelf. Furthermore, a remote unit (not shown) of a radio feeding connector is installed in each of the information collection devices 122. Then, the external AC power supply is supplied to the AC/DC converter 262 via the plug 261, and converted to a DC power supply. This DC power supply is supplied to the base unit 264 of a connector for radio power feeding via the radio feeding cable 263. Then, the DC power supply is supplied to a remote unit of a radio feeding connector by radio power feeding from the base unit 264 of the connector for radio power feeding, and is further supplied to the information collection device 122.

Figure 17:
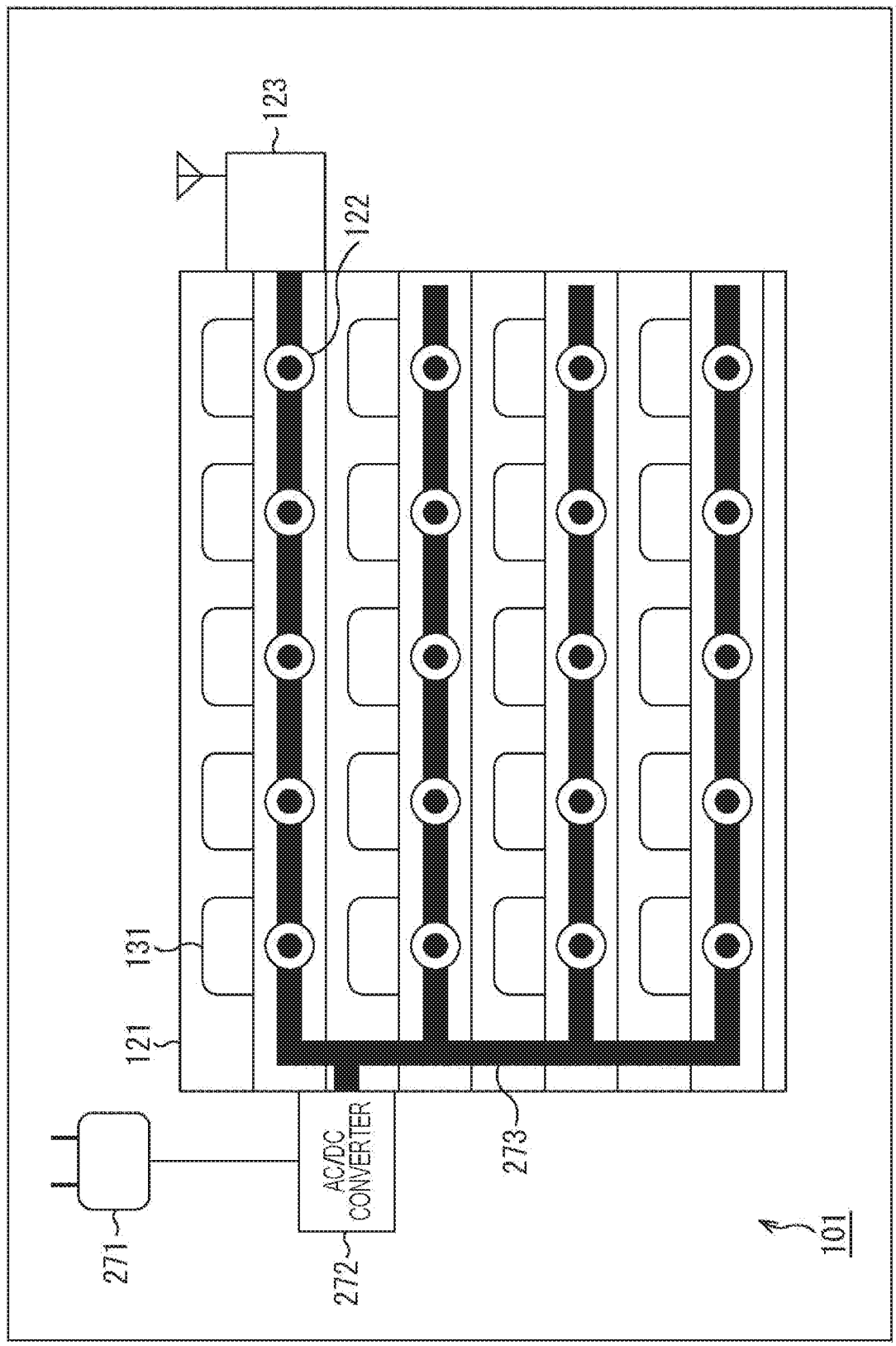
FIG. 17 is a diagram showing an example of the power supply structure.

Furthermore, a configuration as shown in FIG. 17 may be employed. In a case of the example of FIG. 17, a plug 271 is connected to an external AC power supply. Furthermore, the plug 271 is connected to a DC power feeding cable 273 via an AC/DC converter 272. The DC power feeding cable 273 is installed along each shelf of the product display shelf 121 to be connected to each of the information collection devices 122. Then, the external AC power supply is supplied to the AC/DC converter 272 via the plug 271, and converted to a DC power supply. This DC power supply is supplied to each of the information collection devices 122 via the DC power feeding cable 273.

Furthermore, a configuration as shown in FIG. 18 may be employed. In a case of the example of FIG. 18, a plug 281 is connected to an external AC power supply. Furthermore, the plug 281 is connected to the local server 123 via an AC/DC converter 282. Furthermore, a power over Ethernet cable 283 connected to the local server 123 is installed along each shelf of the product display shelf 121 connected to each of the information collection devices 122. Then, the external AC power supply is supplied to the AC/DC converter 282 via the plug 281, converted to a DC power supply, and supplied to the local server 123. Furthermore, this DC power supply is supplied to each of the information collection devices 122 from the local server 123 via the power over Ethernet cable 283.

By employing the above configuration, power from an external power supply can be supplied to the information collection device 122. In this manner, larger power can be supplied to the information collection device 122. Therefore, for example, in a case where the information collection device 122 has a monitor like the case of the electronic shelf label 150 and the electronic POP advertising 160, the monitor can be caused to display advertisement information and the like more brightly. Furthermore, for example, in a case where the information collection device 122 has a speaker like the case of an electronic POP advertising, the speaker can be caused to output an advertising voice more loudly. Accordingly, an effect as an advertisement can be obtained more significantly.

Note that the configuration may be such that the information collection device 122 includes a storage battery as described above, and power is fed from the storage battery. By providing the storage battery, data can be held (prevented from being erased) even in a case where the information collection device 122 is separated from a power supply source due to, for example, movement of an arranged location, or the like. Furthermore, the information collection device 122 in a state of being separated from a power supply source can be driven, and, for example, caused to collect information associated with a product and the like (for example, pick up an image and the like).

<First Method of Identifying a Product Looked at by a Customer>

As described above, (an optional device of) the information collection system 100 analyzes a picked-up image picked up by the information collection device 122 and identifies which product is looked at by a customer. At this time, the information collection system 100 evaluates or analyzes and identifies a direction of a face of a customer, so as to identify which product is looked at by the customer. A specific example of this method of identifying a direction of a face will be described hereinafter.

FIG. 19A is a diagram showing an embodiment in which information collection devices as many as product types arranged on the product display shelf 121 on which products are displayed are arranged for each product type arranged on the product display shelf 121. As an example of the embodiment, FIG. 19A is a diagram showing a state in which five types of products (in other words, five product types, 131-1 to 131-5) are arranged on the product display shelf 121, information collection devices (122-1 to 122-5) as many as the number of (five) product types are arranged for each product type, and one customer (301) stands in front of the product display shelf 121 and looks at the products when viewed from above the shelf.

FIG. 19B shows an example of a picked-up image obtained by each of the information collection devices 122-1 to 122-5 in this case. In FIG. 19B, face images 302-1 to 302-5 are images of a face (head) portion of a customer 301 that are cut out from picked-up images obtained by each of the information collection devices 122-1 to 122-5. In this case, only the customer 301 exists around the product display shelf 121, and all of these face images are face images of the customer 301.

The information collection system 100 compares a direction of a face in each of the above face images. This comparison method is optional. For example, the configuration may be such that, as shown in FIG. 19C, a mark showing a positional relationship between a center of a face or head area and a center of the face (for example, A1/W in FIG. 19C) is calculated for each of the face images 302-1 to 302-5, and compared between each of the images. Furthermore, for example, the configuration may be such that, as shown in FIG. 19D, a mark showing a positional relationship between both ends of a face or head and a center of the face (|B1−B2| or B1/B2 in FIG. 19D) is calculated for each of the face images 302-1 to 302-5, and compared between each of the images. Moreover, for example, the configuration may be such that, as shown in FIG. 19E, a mark showing a positional relationship between a center of a face and a center of each of two eyes (|C1−C2| or C1/C2 in FIG. 19E) is calculated for each of the face images 302-1 to 302-5, and compared between each of the images.

Then, the information collection system 100 identifies an image of a face that is determined to "face the front the most" on the basis of a result of the comparison. This identification method is optional. For example, in the case of FIG. 19C, an image having a value of A1/W closest to zero may be identified (in other words, provided with a conclusion of evaluation or analysis) as an "image of a face facing the front the most". Furthermore, for example, in the case of FIG. 19D, an image having a value of |B1−B2| closest to zero may be identified (in other words, provided with a conclusion of evaluation or analysis) as an "image of a face facing the front the most", or an image having a value of B1/B2 closest to one (image having a value of |B1/B2−1| closest to zero) may be identified (in other words, provided with a conclusion of evaluation or analysis) as an "image of a face facing the front the most". Moreover, for example, in the case of FIG. 19E, an image having a value of |C1−C2| closest to zero may be identified (in other words, provided with a conclusion of evaluation or analysis) as an "image of a face facing the front the most", or an image having a value of C1/C2 closest to one (image having a value of |C1/C2−1| closest to zero) may be identified (in other words, provided with a conclusion of evaluation or analysis) as an "image of a face facing the front the most".

Then, the information collection system 100 identifies the product 131 corresponding to the information collection device 122 that picks up an image that is identified as "facing the front the most" as a "product looked at by a customer".

For example, in the case of FIG. 19B, the face image 302-3 is identified as an "image of a face facing the front the most". Since the face image 302-3 is an image cut out from a picked-up image picked up by the information collection devices 122-3, the customer 301 is identified as looking at the product 131-3 corresponding to the information collection devices 122-3.

A configuration that, by comparing a plurality of images picked up by a plurality of the information collection devices 122, an image of a face of a customer facing the front the most is identified, and, by doing so, a product looked at by the customer is identified, will be described more in detail.

First, as a first case, a case where a customer looks (looks straight, looks directly) at the product type 131 other than those on both ends on the product display shelf 121 will be described. The information collection device 122 is arranged in the vicinity of each of a plurality of the product types 131 arranged on the product display shelf 121. Each of the information collection devices 122 is associated (linked) with each of the product types 131 in the vicinity. An image of a face of a customer looking at a certain product type arranged on the product display shelf 121 is picked up by a plurality of the information collection devices.

Then, by using A1/W, |B1−B2|, |C1−C2|, |B1/B2−1|, or |C1/C2−1| described above as a mark, images picked up by the information collection device 122 are compared (more specifically, values of marks of the images are compared) in the order of arrangement of each of the information collection devices 122 on the product display shelf 121. In the first case, the above mark has a certain positive value in an image picked up by the information collection device 122 associated with the product type 131 arranged on one end of the display shelf. After the above, if values of the marks in images picked up by the information collection device 122 are compared in the order of arrangement of each of the information collection devices 122 on the product display shelf 121, values of the marks decrease monotonously as it is closer to a product type looked at by the customer, and a value of the mark becomes a smallest value (a minimum value, or a value significantly close to zero, with some variations depending on an attitude of the customer looking at a product). Thereafter, as it is farther from the product type looked at by the customer, values of the marks monotonously increase.

For this reason, if images picked up by the information collection device 122 are compared in the order of arrangement of each of the information collection devices 122 on the product display shelf 121 by using A1/W, |B1−B2|, |C1−C2|, |B1/B2−1|, or |C1/C2−1| described above as a mark, the product type 131 associated (linked) with the information collection devices 122 that picks up an image having a value of the above mark at a smallest value (a minimum value, or a value significantly close to zero, with some variations depending on an attitude of the customer looking at a product) can be identified as a product that is looked (looked straight, looked directly) at by the customer. At the same time, in an image picked up by the information collection device 122 associated (linked) with the product type 131 identified above among all product types arranged on a display shelf, that the mark described above relating to a direction of a face of the customer is smallest is confirmed in an image obtained by picking up a face of the customer. Accordingly, identification of a product looked (looked straight, looked directly) at by the customer is confirmed and verified to be correct.

Next, as a second case, a case where a customer looks (looks straight, looks directly) at either one of the product types 131 at both ends on the product display shelf 121 will be described. In this case, in a similar manner as the first case, values of the above mark (A1/W, |B1−B2|, |C1−C2|, |B1/B2−1|, or |C1/C2−1|) in images picked up by the information collection devices 122 are compared in the order of arrangement of the information collection devices 122 on the product display shelf 121.

As a result, (1) a value of the mark described above becomes a smallest value (a minimum value, or a value significantly close to zero, with some variations depending on an attitude of the customer looking at a product) in an image picked up by the information collection device 122 associated with the product type 131 arranged on one end (first end) on a display shelf, and, thereafter, as a distance from the first end to the information collection device 122 becomes larger, a value of the mark monotonously increases, or (2) a value of the mark described above becomes a certain positive value in an image picked up by the information collection device 122 associated with the product type 131 arranged on one end (first end) on a display shelf, and, thereafter, a value of the mark monotonously decreases as a distance from the first end to the information collection device 122 becomes larger, and a value of the mark described above becomes a smallest value (a minimum value, or a value significantly close to zero, with some variations depending on an attitude of the customer looking at a product) in an image picked up by the information collection device 122 associated with the product type 131 arranged on the other end (second end) on the display shelf.

For this reason, if images picked up by the information collection device 122 are compared in the order of arrangement of each of the information collection devices 122 on the product display shelf 121 by using A1/W, |B1−B2|, |C1−C2|, |B1/B2−1|, or |C1/C2−1| described above as a mark, the product type 131 associated (linked) with the information collection devices 122 that picks up an image having a value of the above mark at a smallest value (a minimum value, or a value significantly close to zero, with some variations depending on an attitude of the customer looking at a product) can be identified as a product that is looked (looked straight, looked directly) at by the customer. At the same time, in an image picked up by the information collection device 122 associated (linked) with the product type 131 identified above among all product types arranged on a display shelf, that the mark described above relating to a direction of a face of the customer is smallest is confirmed in an image obtained by picking up a face of the customer. Accordingly, identification of a product looked (looked straight, looked directly) at by the customer is confirmed and verified to be correct.

Moreover, the information collection system 100 measures a time period in which the customer 301 looks at the product. Furthermore, the information collection system 100 acquires attributes, such as age, gender, and the like, of the customer 301 who looks at the product by using an optional analysis method. Moreover, the information collection system 100 finds a distance between the customer 301 and a product looked at by the customer 301 (which may be the information collection device 122 or the product display shelf 121 corresponding to the product). The information collection system 100 collects these analysis results as information associated with a customer.

Even in a case where the same person is included in a plurality of picked-up images, the number of directions (products) looked at by one customer is only one. Accordingly, the number of picked-up images in which a face image is determined to face the front the most is one. Accordingly, by identifying a product looked at by a customer (identifying a direction of a face of the customer) in the above manner, a face image of the same person does not need to be identified from each picked-up image, and a product looked at by the customer can be identified more easily and with higher accuracy. Furthermore, by using a direction of a face, a product looked at by a customer can be identified with a simpler algorithm and with higher accuracy than in a case where a destination of a gaze of a customer is estimated. That is, the information collection system 100 can collect information with higher accuracy more easily. Moreover, that a customer faces the front (that the mark with respect to a direction of a face described above is smallest) is confirmed in an image obtained by picking up a face of the customer. Accordingly, that the above identification of a product looked at by the customer is correct is confirmed and verified.

Note that the configuration may be such that a product looked at by a customer is estimated by estimating a direction of a gaze of a customer. In this case as well, since the information collection system 100 includes the information collection device 122 for each product type, images can be picked up from more directions than a conventional technique with respect to a customer. For this reason, information with higher accuracy can be collected.

<Second Method of Identifying a Product Looked at by a Customer>

Note that the configuration may be such that "whether or not a face is facing this direction (whether or not a direction of a face faces the front)" is determined by identifying a direction of the face in each picked-up image in place of comparing a direction of a face between picked-up images.

This determination method is optional. For example, the configuration may be such that the information collection system 100 calculates a mark (A1/W in FIG. 19C) showing a positional relationship between a center of a face or head region and a center of the face, and makes determination on the basis of a value of the mark. Furthermore, for example, the configuration may be such that the information collection system 100 calculates a mark (B1/B2 in D of FIG. 19D) showing a positional relationship between both ends of a face or head region and a center of the face, and makes determination on a basis of the value of the mark. Moreover, for example, the configuration may be such that the information collection system 100 calculates a mark (C1/C2 in FIG. 19E) showing a positional relationship between a center of a face and a center of each of two eyes, and makes determination on the basis of a value of the mark.

A determination condition of each of the determination methods is optional. For example, in the case of FIG. 19C, if the value of A1/W is close to zero, an image can be determined as an "image of a face facing the front". Accordingly, a face may be determined to be "facing the front" in a case where the value of A1/W is within a range of "0±α". Furthermore, in the case of FIG. 19D, if the value of B1/B2 is close to one, an image can be determined as an "image of a face facing the front". Accordingly, a face may be determined to be "facing the front" in a case where the value of B1/B2 is within a range of "1±β". Moreover, in the case of FIG. 19E, if the value of C1/C2 is close to one, an image can be determined as an "image of a face facing the front". Accordingly, a face may be determined to be "facing the front" in a case where the value is within a range of "1±γ". Note that the above α, β, and γ, which depend on space between installed information collection devices (or products) and accuracy of detection and analysis of a face, may be adjustable in accordance with such parameters.

For example, in the case of FIG. 19B, only the face image 302-3 is determined as an "image of a face facing the front". Since the face image 302-3 is an image cut out from a picked-up image picked up by the information collection devices 122-3, the customer 301 is identified as looking at the product 131-3 corresponding to the information collection devices 122-3.

Moreover, the information collection system 100 measures a time period in which the customer 301 looks at the product. Furthermore, the information collection system 100 acquires attributes, such as age, gender, and the like, of the customer 301 who looks at the product by using an optional analysis method. Moreover, the information collection system 100 finds a distance between the customer 301 and a product looked at by the customer 301 (which may be the information collection device 122 or the product display shelf 121 corresponding to the product). The information collection system 100 collects these analysis results as information associated with a customer.

Even in a case where the same person is included in a plurality of picked-up images, the number of directions (products) looked at by one customer is only one. Accordingly, the number of picked-up images in which a face image is determined to face the front is one. Accordingly, by identifying a product looked at by a customer (identifying a direction of a face of the customer) in the above manner, a face image of the same person does not need to be identified from each picked-up image, and a product looked at by the customer can be identified more easily and with higher accuracy. Furthermore, by using a direction of a face, a product looked at by a customer can be identified with a simpler algorithm and with higher accuracy than in a case where a destination of a gaze of a customer is estimated. That is, the information collection system 100 can collect information with higher accuracy more easily.

Note that the configuration may be such that a product looked at by a customer is estimated by estimating a direction of a gaze of a customer. In this case as well, since the information collection system 100 includes the information collection device 122 for each product type, images can be picked up from more directions than a conventional technique with respect to a customer. For this reason, information with higher accuracy can be collected.

<First Identification Method in a Case of a Plurality of Customers>

Next, a case of a plurality of customers will be described. In a case of an example shown in FIG. 20A, three customers 311 (a customer 311A, a customer 311B, and a customer 311C) stand around the product display shelf 121.

In this case, a face image of each of the customers is included in an picked-up image picked up by each of the information collection devices 122 as shown in an example of FIG. 20B. For example, a picked-up image obtained by the information collection device 122-1 includes a face image 312-1 of the customer 311A and a face image 313-1 of the customer 311B. Furthermore, a picked-up image obtained by the information collection device 122-2 includes a face image 312-2 of the customer 311A and a face image 313-2 of the customer 311B. Moreover, a picked-up image obtained by the information collection device 122-3 includes a face image 312-3 of the customer 311A, a face image 313-3 of the customer 311B, and a face image 314-1 of the customer 311C. Furthermore, a picked-up image obtained by the information collection device 122-4 includes a face image 312-4 of the customer 311A, a face image 313-4 of the customer 311B, and a face image 314-2 of the customer 311C. Moreover, a picked-up image obtained by the information collection devices 122-5 includes a face image 312-5 of the customer 311A, a face image 313-5 of the customer 311B, and a face image 314-3 of the customer 311C.

That is, a plurality of face images of the same person are included in the above picked-up images. In view of the above, the information collection system 100 identifies the "same person" picked up in a duplicate manner in face images picked up by each of the information collection devices 122, and creates a group by gathering the "same person" (a dotted line frame in FIG. 20B).

Then, the information collection system 100 compares directions of faces between each of the face images that are grouped as the "same person". This method of comparing directions of faces is optional. For example, comparison may be made by the method described with reference to FIGS. 19A, 19B, 19C, 19D, and 19E. In a case of the example of FIGS. 20A and 20B, the customer 311A is identified as looking at the information collection device 122-3 (that is, the product 131-3) since the face image 312-3 "faces the front the most". Furthermore, the customer 311B is identified as looking at the information collection devices 122-2 (that is, the product 131-2) since the face image 313-2 "faces the front the most". Moreover, the customer 311C is identified as looking at the information collection devices 122-5 (that is, the product 131-5) since the face image 314-3 "faces the front the most".

In a similar manner as the case of FIGS. 19A, 19B, 19C, 19D, and 19E, the information collection system 100 measures a time period in which each of the customers 311A to 311C looks at a product. Furthermore, the information collection system 100 acquires attributes, such as age, gender, and the like, of the customers 311A to 311C who look at a product by using an optional analysis method. Moreover, the information collection system 100 finds a distance between the customers 311A to 311C and a product looked at by each of the customers (which may be the information collection device 122 or the product display shelf 121 corresponding to the product). The information collection system 100 collects these analysis results as information associated with a customer.

By identifying a product looked at by a customer (identifying a direction of a face of a customer) in the above manner, the product looked at by the customer can be identified by a simpler algorithm and with higher accuracy than a case where a destination of a gaze of a customer is estimated, even in a case where a plurality of customers exist around the product display shelf 121. That is, the information collection system 100 can collect information with higher accuracy more easily.

Note that the configuration may be such that a product looked at by a customer is estimated by estimating a direction of a gaze of a customer. In this case as well, since the information collection system 100 includes the information collection device 122 for each product type, images can be picked up from more directions than a conventional technique with respect to a customer. For this reason, information with higher accuracy can be collected.

<First Identification of the Same Person>

Next, an example of a method of identifying the same person from an image of a customer in the method described above will be described. The method of identifying the same person is optional. For example, identification of the same person may be performed by using a ranging sensor of the information collection device 122.

For example, as shown in FIG. 21A, assume that the products 131-1 to 131-5 are displayed on the product display shelf 121, and the information collection devices 122-1 to 122-5 are installed in a manner corresponding to the products. Then, assume that customers A to G stand around the front of the product display shelf 121. Here, for the purpose of description, an X-coordinate and a Y-coordinate are set with respect to front space of the product display shelf 121 as shown in FIG. 21A. Then, coordinates of a nose of the customer A are set to (x1, y1), coordinates of a nose of the customer B are set to (x2, y2), coordinates of a nose of the customer C are set to (x3, y3), coordinates of a nose of the customer D are set to (x4, y4), coordinates of a nose of the customer E are set to (x5, y5), coordinates of a nose of the customer F are set to (x6, y6), and coordinates of a nose of the customer G are set to (x7, y7).

Each of the information collection devices 122 measures an angle and a distance for a face (or a head) detected in each picked-up image by using a ranging sensor mounted on each of the information collection devices 122 as shown in FIG. 21B. Specifically, an angle and a distance to an object (a face, for example, a position of a nose) are measured. The information collection system 100 finds the X and Y coordinates on the basis of a result of the measurement. Since coordinates of the same person are the same, the same person can be identified on the basis of the coordinates.

For example, as shown in FIG. 21C, all face images for which coordinates of (x5, y5) are found can be identified as face images of the customer E. Furthermore, all face images for which coordinates of (x6, y6) are found can be identified as face images of the customer F. Moreover, all face images for which coordinates of (x7, y7) are found can be identified as face images of the customer G. The information collection system 100 creates a group of the "same face" with respect to all detected faces, and uses the group at the time of comparing face directions.

In the above manner, the information collection system 100 can identify the same person easily and with high accuracy.

<Second Identification of the Same Person>

Furthermore, the configuration may be such that the same person is identified by performing monitoring for a certain period of time (from picked-up images of a plurality of frames).

Figure 22A:
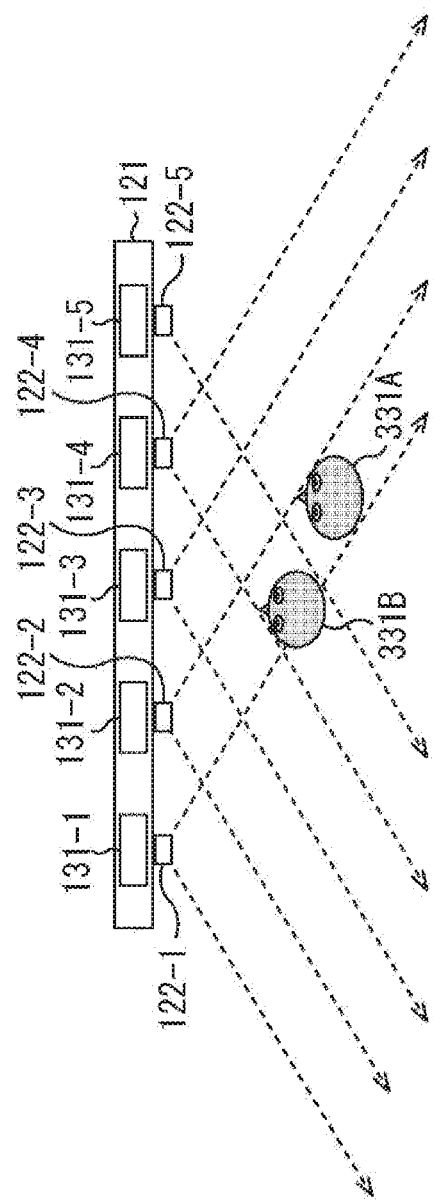
FIGS. 22A and 22B are diagrams explaining an example of a state of identifying the same person.

For example, as shown in FIG. 22A, assume that the products 131-1 to 131-5 are displayed on the product display shelf 121, and the information collection devices 122-1 to 122-5 are installed in a manner corresponding to the products. Then, assume that customers 331A and 331B stand around the front of the product display shelf 121.

Figure 22B:
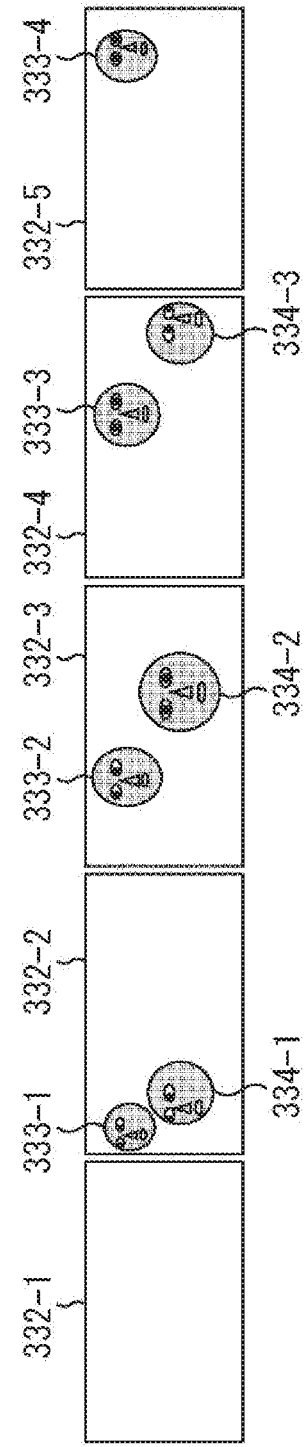

At a certain timing, picked-up images obtained by each of the information collection devices 122 are as shown in FIG. 22B. That is, in a picked-up image 332-1 obtained by the information collection device 122-1, face images of the customers 331A and 331B are not detected. Furthermore, in a picked-up image 332-2 obtained by the information collection device 122-2, a face image 333-1 of the customer 331A, and a face image 334-1 of the customer 331B are detected. Moreover, in a picked-up image 332-3 obtained by the information collection device 122-3, a face image 333-2 of the customer 331A, and a face image 334-2 of the customer 331B are detected. Furthermore, in a picked-up image 332-4 obtained by the information collection devices 122-4, a face image 333-3 of the customer 331A and a face image 334-3 of the customer 331B are detected. Furthermore, in a picked-up image 332-5 obtained by the information collection device 122-5, a face image 333-4 of the customer 331A is detected.

From here, a focus will be placed on movement of a customer in a time direction of each picked-up image in order to identify the "same person". For the "same person", existence or non-existence of movement and directions of movement at the same time are in the same tendency even in images between different cameras. The information collection system 100 identifies the same person by using this tendency.

For example, in a case of FIG. 23, in each picked-up image, three faces of the customer A enclosed by a solid line frame start to move together at a time Ti−1, stop together at a time Ti, and, thereafter, all of the three faces are stationary until a time Ti1+1. That is, these three face images move in one set as indicated by a solid arrow. The information collection system 100 identifies a person in the same series of movements, particularly when movement is started, when a moving action is stopped, and moving directions, as the "same person" as described above.

Furthermore, in each picked-up image, three faces of the customer B enclosed by a dotted line frame are stopped until the time Ti, start to move together at the time Ti, and have moved together to illustrated locations at the time Ti+1. That is, these three face images move in one set as indicated by a dotted arrow. The information collection system 100 identifies a person in the same series of movements, particularly when movement is started, when a moving action is stopped, and moving directions, as the "same person" as described above.

Even if a plurality of people move at the same timing, locations in which a plurality of these different people walk are different from each other. Therefore, timings at which a plurality of these people move into a frame of each camera are different from each other. Therefore, which faces picked up by each camera are of the same person can be determined.

The information collection system 100 creates a group of the "same face" with respect to all detected faces, and uses the group at the time of comparing face directions.

In the above manner, the information collection system 100 can identify the same person easily and with high accuracy.

Note that, the configuration may be such that the information collection system 100 identifies the same person by other optional methods, for example, a method of identifying which faces are of the "same person" by face recognition, or the like.

<Second Identification Method in a Case of a Plurality of Customers>

Note that the configuration may be such that "whether or not a face is facing this direction (whether or not a direction of a face faces the front)" is determined by identifying a direction of the face in each picked-up image as described in <Second method of identifying a product looked at by a customer> even in a case where a plurality of customers are included in a picked-up image. In this case, "whether or not a face is facing this direction (whether or not a direction of a face faces the front)" is preferably determined by identifying a direction of the face for each face image in each picked-up image.

For example, as shown in FIG. 24A, assume that the products 131-1 to 131-5 are displayed on the product display shelf 121, and the information collection devices 122-1 to 122-5 are installed in a manner corresponding to the products. Then, assume that customers 361A, 361B, and 361C stand around the front of the product display shelf 121.

At a certain timing, picked-up images obtained by each of the information collection devices 122 are as shown in FIG. 24B. That is, in a picked-up image 362-1 obtained by the information collection device 122-1, a face image 363-1 of the customer 361A and a face image 364-1 of the customer 361B are detected. Furthermore, in a picked-up image 362-2 obtained by the information collection devices 122-2, a face image 363-2 of the customer 361A, a face image 364-2 of the customer 361B, and a face image 365-1 of the customer 361C are detected. Moreover, in a picked-up image 362-3 obtained by the information collection devices 122-3, a face image 363-3 of the customer 361A, a face image 364-3 of the customer 361B, and a face image 365-2 of the customer 361C are detected. Furthermore, in a picked-up image 362-4 obtained by the information collection devices 122-4, a face image 363-4 of the customer 361A, a face image 364-4 of the customer 361B, and a face image 365-3 of the customer 361C are detected. Moreover, in a picked-up image 362-5 obtained by the information collection device 122-5, a face image 363-5 of the customer 361A, a face image 364-5 of the customer 361B, and a face image 365-4 of the customer 361C are detected.

The information collection system 100 determines "whether or not a face is facing this direction" (specifically, "whether or not a direction of a face faces the front") by identifying directions of all of the detected faces in each of the picked-up images 362. This determination method is optional. For example, determination may be made by a method similar to the method described in <Second method of identifying a product looked at by a customer>.

For example, in a case of FIG. 24B, the information collection system 100 determines that a "face facing the front" "does not exist" for the picked-up image 362-1. Furthermore, the information collection system 100 determines that a "face facing the front" "exists" (the face image 363-2) for the picked-up image 362-2, and determines that "the customer 361A looks at the product 131-2". Moreover, the information collection system 100 determines that a "face facing the front" "exists" (the face image 364-3) for the picked-up image 362-3, and determines that "the customer 361B looks at the product 131-3". Furthermore, the information collection system 100 determines that a "face facing the front" "does not exist" for the picked-up image 362-4. Moreover, the information collection system 100 determines that a "face facing the front" "exists" (the face image 365-4) for the picked-up image 362-5, and determines that "the customer 361C looks at the product 131-5".

Moreover, the information collection system 100 measures a time period in which the customer 361 looks at the product. Furthermore, the information collection system 100 acquires attributes, such as age, gender, and the like, of the customer 361 who looks at the product by using an optional analysis method. Moreover, the information collection system 100 finds a distance between the customer 361 and a product looked at by the customer 361 (which may be the information collection device 122 or the product display shelf 121 corresponding to the product). The information collection system 100 collects these analysis results as information associated with a customer.

By identifying a product looked at by a customer (identifying a direction of a face of a customer) in the above manner, the product looked at by the customer can be identified more easily and with high accuracy, even in a case where a plurality of customers exist around the product display shelf 121. Furthermore, by using a direction of a face, a product looked at by a customer can be identified with a simpler algorithm and with higher accuracy than in a case where a destination of a gaze of a customer is estimated. That is, since the information collection system 100 includes the information collection device 122 for each product type, images can be picked up from more directions than a conventional technique with respect to a customer. For this reason, information with higher accuracy can be collected more easily.

<First Identification Method in a Vertical Direction>

In the above description, identification of a direction of a face of a customer in a horizontal direction is described. This identification may be performed also in a vertical direction.

Figure 25C:
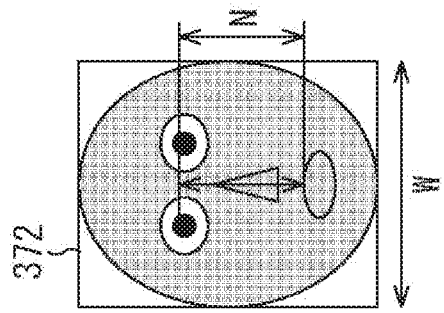
FIGS. 25A, 25B, and 25C are diagrams explaining an example of a state of identifying a product type looked at by a customer.
Figure 25B:
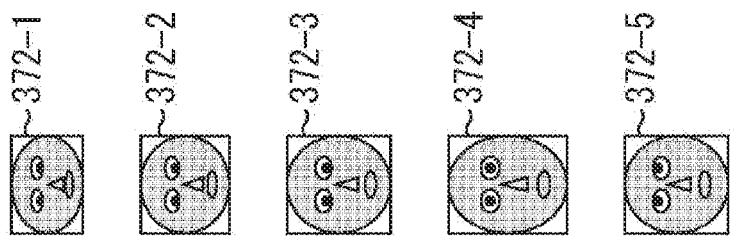
Figure 25A:
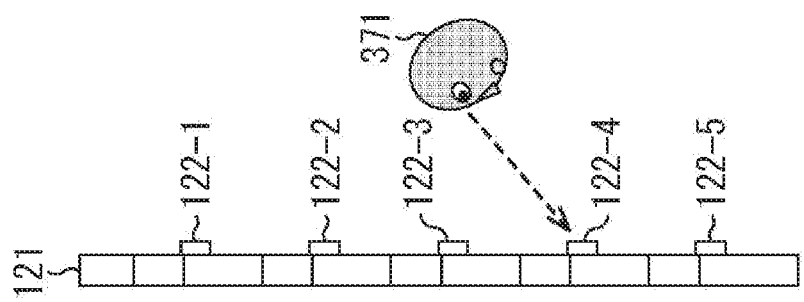

For example, as shown in FIG. 25A, assume that the information collection devices 122-1 to 122-5 are installed on each shelf of the product display shelf 121. That is, assume that the information collection devices 122-1 to 122-5 are arranged in a vertical direction. Then, assume that a customer 371 is around the front of the product display shelf 121.

Furthermore, assume that each face image shown in FIG. 25B is detected from a picked-up image obtained by each of the information collection devices 122-1 to 122-5. That is, assume that a face image 372-1 is detected in a picked-up image obtained by the information collection device 122-1, a face image 372-2 is detected in a picked-up image obtained by the information collection device 122-2, a face image 372-3 is detected in a picked-up image obtained by the information collection device 122-3, a face image 372-4 is detected in a picked-up image obtained by the information collection device 122-4, and a face image 372-5 is detected in a picked-up image obtained by the information collection device 122-5.

The information collection system 100 compares directions of faces in each of the above face images. This comparison method is optional. For example, the configuration may be such that the information collection system 100 calculates a ratio of a length between an eye and an upper lip to a width of a face (N/W in a face image 372 in FIG. 25C) for each of the face images 372-1 to 372-5, and compares the mark (N/W) between the images.

Then, the information collection system 100 identifies an image of a face that is determined to "face the front the most" on the basis of a result of the comparison. This identification method is optional. For example, in the case of FIG. 25C, an image having a largest value of N/W may be identified (in other words, provided with a conclusion of evaluation or analysis) as an "image of a face facing the front the most". According to this method, in a case of an example of FIG. 25B, the face image 372-4 in a picked-up image obtained by the information collection devices 122-4 is identified as an "image of a face facing the front the most".

Then, the information collection system 100 identifies the product 131 corresponding to the information collection device 122 that picks up an image that is identified as "facing the front the most" as a "product looked at by a customer".

Moreover, the information collection system 100 measures a time period in which the customer 371 looks at the product. Furthermore, the information collection system 100 acquires attributes, such as age, gender, and the like, of the customer 371 who looks at the product by using an optional analysis method. Moreover, the information collection system 100 finds a distance between the customer 371 and a product looked at by the customer 371 (which may be the information collection device 122 or the product display shelf 121 corresponding to the product). The information collection system 100 collects these analysis results as information associated with a customer.

In a case of a vertical direction as well, there is only one direction (product) looked at by one customer. Accordingly, in this case as well, by performing identification in the above manner, a face image of the same person does not need to be identified from each picked-up image, and a product looked at by the customer can be identified more easily and with higher accuracy. Furthermore, a product looked at by a customer can be identified only by comparing directions of faces. That is, a product looked at by a customer can be identified with a simpler algorithm and with higher accuracy than in a case where a destination of a gaze of a customer is estimated. That is, the information collection system 100 can collect information with higher accuracy more easily.

Note that the configuration may be such that a product looked at by a customer is estimated by estimating a direction of a gaze of a customer. In this case as well, since the information collection system 100 includes the information collection device 122 for each product type, images can be picked up from more directions than a conventional technique with respect to a customer. For this reason, information with higher accuracy can be collected.

<Second Identification Method in a Vertical Direction>

The method of identifying a direction of a face of a customer in a vertical direction is not limited to the example described above. For example, a direction of a face may be identified by evaluating a mark in each image without comparing a mark between face images.

For example, in the case of FIG. 25A, assume that the face images 372-1 to 372-5 as shown in FIG. 25B are detected from each picked-up image in a manner similar to the case described in <First identification method in a vertical direction>. The information collection system 100 identifies directions of these faces and determines "whether or not a face looks in this direction". More specifically, the information collection system 100 determines "whether or not a direction of a face faces the front". In this case, comparison with face images in the other picked-up images is not performed.

Note that this method of identifying a direction of a face is optional. For example, as shown in FIG. 25C, the configuration may be such that the information collection system 100 calculates a ratio of a length between an eye and an upper lip to a width of a face (N/W in FIG. 25C) for the face image 372, and makes determination on the basis of the value.

For example, assume that statistical average values of N and W are N0 and W0, respectively. If N/W, which is a mark of a direction of a face is close to N0/W0, an image can be determined as an "image of a face facing the front". Accordingly, in a case where the value is within a range of "N0/W0±α", the image may be determined as a face "facing the front". Note that this α, which may be an optional value, may also be, for example, 10% of the value of N0/W0. Furthermore, a value of a, which depends on space between products or installed information collection devices 122 and accuracy of detection and analysis of a face, may be adjustable.

Moreover, the information collection system 100 measures a time period in which the customer 371 looks at the product. Furthermore, the information collection system 100 acquires attributes, such as age, gender, and the like, of the customer 371 who looks at the product by using an optional analysis method. Moreover, the information collection system 100 finds a distance between the customer 371 and a product looked at by the customer 371 (which may be the information collection device 122 or the product display shelf 121 corresponding to the product). The information collection system 100 collects these analysis results as information associated with a customer.

In this case as well, there is only one direction (product) looked at by one customer. Accordingly, in this case as well, by performing identification in the above manner, a face image of the same person does not need to be identified from each picked-up image, and a product looked at by the customer can be identified more easily and with higher accuracy. Furthermore, by using a direction of a face, a product looked at by a customer can be identified with a simpler algorithm and with higher accuracy than in a case where a destination of a gaze of a customer is estimated. That is, the information collection system 100 can collect information with higher accuracy more easily.

Note that the configuration may be such that a product looked at by a customer is estimated by estimating a direction of a gaze of a customer. In this case as well, since the information collection system 100 includes the information collection device 122 for each product type, images can be picked up from more directions than a conventional technique with respect to a customer. For this reason, information with higher accuracy can be collected.

<Regarding Information Display>

For example, in a case where an information output (display) function is included like an electronic shelf label, an electronic POP advertising, and the like, the information collection device 122 can output (display, and the like) information. For example, this information may be stored in advance in a storage unit incorporated in the information collection device 122, or may be input to the information collection device 122 by the user and the like.

Figure 26:
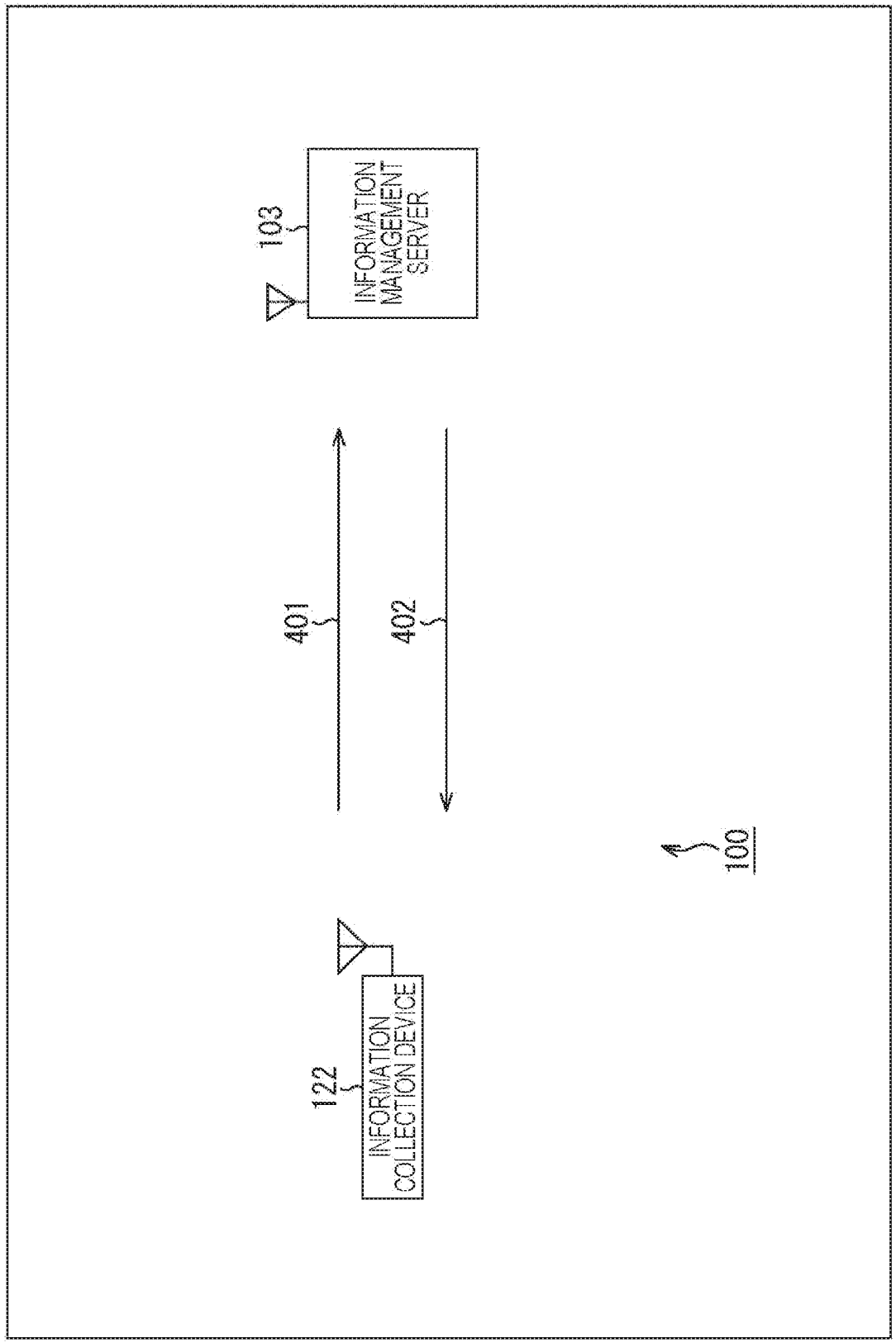
FIG. 26 is a diagram showing a main configuration example of an information display system.

Furthermore, the information may be supplied from other devices via a communication function. For example, as shown in FIG. 26, the information may be supplied from the information management server 103 (the information collection device 122 may output information supplied from the information management server 103). Note that communication between the information collection device 122 and the information management server 103 does not need to be performed via the local server 123, the relay device 102, or the like, and illustration and description of these are omitted in FIG. 26. As described above, the information collection device 122 supplies collected information (information associated with a product and a customer, and the like) to the information management server 103 by using a communication function (an arrow 401). Then, the information management server 103 supplies information to the information collection device 122 by using this communication function (which, as a matter of course, may be other communication functions) (an arrow 402). The information collection device 122 outputs the information supplied from the information management server 103 as, for example, an image, voice, and the like.

At that time, the information management server 103 may supply information associated with information supplied from the information collection device 122 to the information collection device 122. For example, if the information collection device 122 picks up an image of a product, identifies the product on the basis of the picked-up image, and supplies identification information of the product to the information management server 103, the information management server 103 supplies information associated with a product corresponding to the identification information (for example, a product name, a price, and the like) (that is, information associated with a product whose image has been picked up) to the information collection device 122. The information collection device 122 outputs the product name, price, and the like as an image (including character information), voice, and the like. Only by causing the information collection device 122 to pick up an image of a product, information of the product name, price, and the like can be easily output to (displayed on, and the like) the information collection device 122.

Furthermore, for example, if the information collection device 122 picks up an image of a customer, identifies attributes of the customer on the basis of the picked-up image, and supplies attribute information of the customer to the information management server 103, the information management server 103 supplies information associated with a product corresponding to the attribute information (for example, a product name, a price, and the like recommended to a customer of the attributes) (that is, information to be presented to the customer whose image has been picked up) to the information collection device 122. The information collection device 122 outputs the product name, price, and the like as an image (including character information), voice, and the like. In the above manner, the information collection device 122 can easily output (display, and the like) information appropriate for a customer positioned around.

Note that, in the example of FIG. 26, the information management server 103 may supply information (independent information) not related to information supplied from the information collection device 122 to the information collection device 122. In this case, transmission times of information may be independent of each other. That is, the information management server 103 may supply information independent of information from the information collection device 122 to the information collection device 122 at a timing independent of a supplying timing of the information from the information collection device 122.

For example, the information management server 103 supplies information not related to information supplied from the information collection device 122, such as guide information on a selling place, guide information on a product on sale or scheduled to be on sale for a limited time, and the like, to the information collection device 122 at a timing not related to an information supply timing from the information collection device 122 (for example, even if information is not supplied from the information collection device 122), and the information collection device 122 outputs the information as an image (including character information), voice, and the like. In this manner, optional information can be output to the information collection device 122 more easily. As a matter of course, the information management server 103 can optionally select the information collection device 122 to which such information is supplied. That is, optional information can be easily output to an optional location (the information collection device 122).

Figure 27:
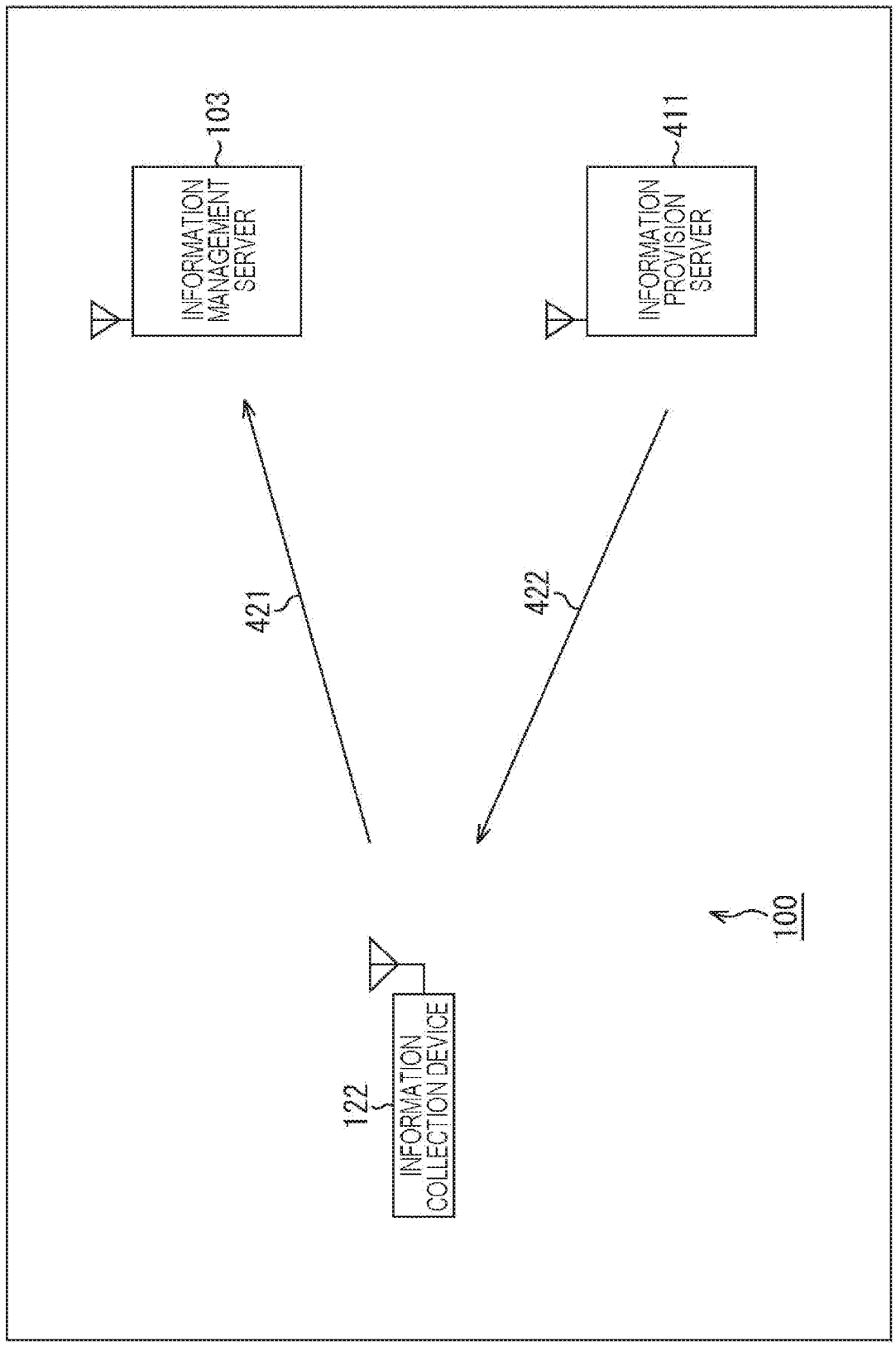
FIG. 27 is a diagram showing a main configuration example of an information display terminal.

Note that information output by the information collection device 122 may be supplied from a device other than the information management server 103. For example, as shown in FIG. 27, the information may be supplied from an information provision server 411 that is separate from the information management server 103.

That is, in this case, the information collection device 122 supplies collected information (information associated with a product and a customer, and the like) to the information management server 103 by using a communication function (an arrow 421). Furthermore, the information provision server 411 supplies information to the information collection devices 122 by using this communication function (which, as a matter of course, may be other communication functions) (an arrow 422). The information collection device 122 outputs the information supplied from the information provision server 411 as, for example, an image, voice, and the like.

In a similar manner as a case of the example of FIG. 26, information supplied from the information collection device 122 to the information management server 103 and information supplied from the information provision server 411 to the information collection device 122 may be related to each other, or independent of each other. Furthermore, transmission timings of these pieces of information may also be related to each other or independent of each other.

Moreover, a plurality of the information provision servers 411 may be provided. That is, the configuration may be such that the information collection device 122 can output information supplied from a plurality of devices.

Furthermore, the information management server 103 in FIG. 26 and the information provision server 411 in FIG. 27 that supply information to be output by the information collection device 122 may supply optional information to an optional one of the information collection device 122 at an optional timing. For example, the configuration may be such that the same information can also be supplied to a plurality of the information collection devices 122, or information related to information supplied from a certain one of the information collection device 122 can be supplied to the information collection device 122, and information not related to the information supplied from the information collection device 122 can be supplied to the other information collection devices 122. Furthermore, the configuration may be such that information is not supplied to part of the information collection devices 122. Furthermore, for example, the configuration may be such that information associated with information supplied from a certain one of the information collection devices 122 to the other information collection devices 122.

Note that, in the examples of FIGS. 26 and 27, the configuration may be such that the information collection device 122 does not have a function of supplying information to the information management server 103. Information collected by the information collection device 122 may be taken out from the information collection device 122 by an optional method. For example, the configuration may be such that collected information is stored in a removable medium, such as a USB memory and the like, and is output to the outside (for example, other devices, such as the information management server 103 and the like) of the information collection devices 122 via the removable medium.

2. Second Embodiment

<Electronic Shelf Label System>

Figure 28:
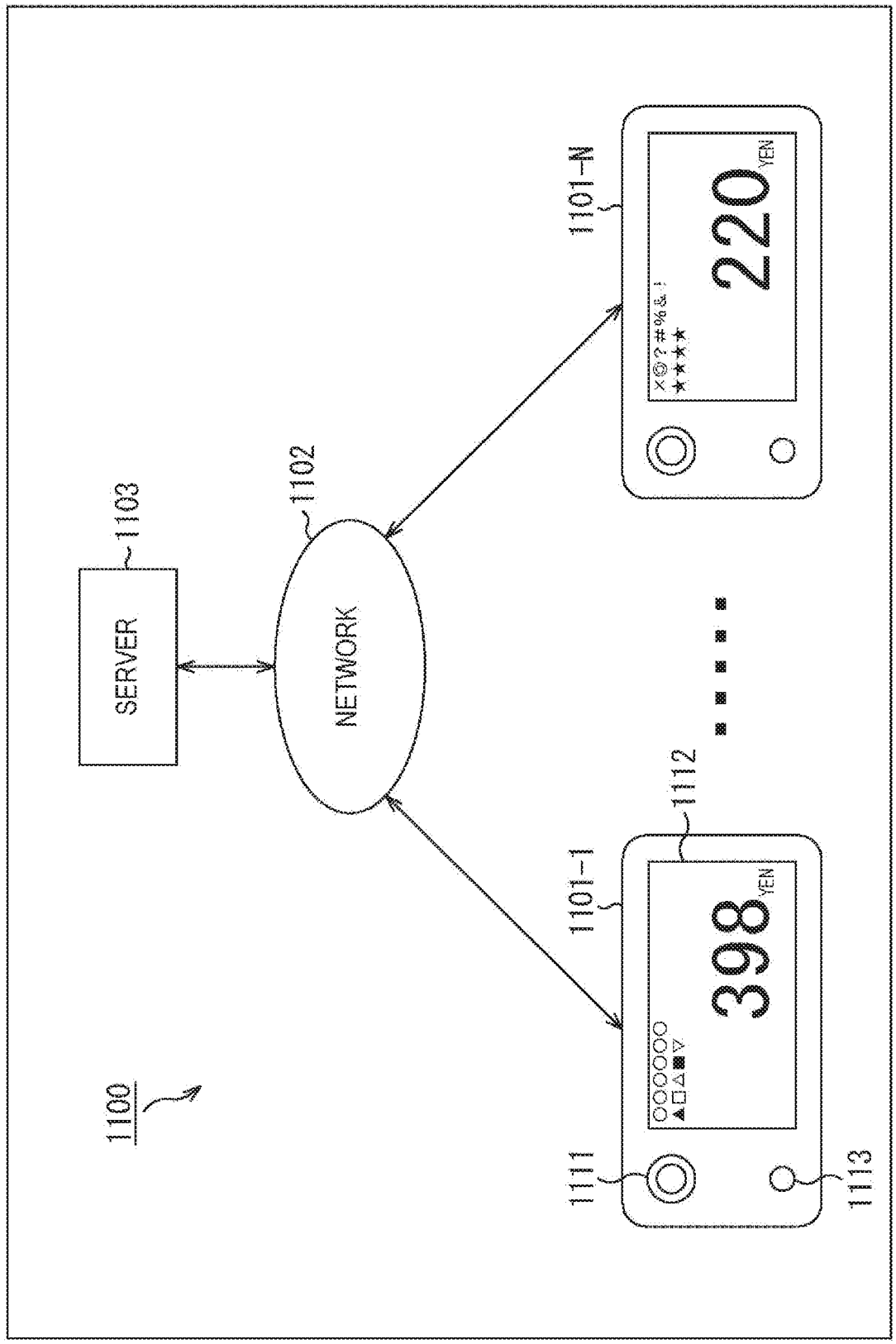
FIG. 28 is a diagram showing a main configuration example of an electronic shelf label system.

Next, a more specific example of the information processing system described above will be described. FIG. 28 is a diagram showing a main configuration example of an electronic shelf label system that is an embodiment of an information processing system to which the present technology is applied. An electronic shelf label system 1100 shown in FIG. 28 is a system that causes an electronic shelf label 1101 to display information of a product.

As shown in FIG. 28, the electronic shelf label system 1100 has N (N is an optional natural number) of the electronic shelf labels 1101 (electronic shelf labels 1101-1 to 1101-N). In a case where the electronic shelf labels 1101-1 to 1101-N are not distinguished from each other, such electronic shelf labels are referred to as the electronic shelf labels 1101. As shown on the electronic shelf label 1101-1, a housing of the electronic shelf label 1101 is provided with a camera 1111, a monitor 1112, and a mode identification light emitting diode (LED) 1113.

The camera 1111 has an optional image pickup element, for example, a charge coupled device (CCD) image sensor, a complementary metal oxide semiconductor (CMOS) image sensor, or the like, and picks up an image of an object in front of the camera 1111. Note that the configuration may be such that the camera 1111 has an optional optical system, for example, a lens, a diaphragm, and the like, in addition to the image pickup element.

The monitor 1112 has an optional display device, for example, a liquid crystal display (LCD), an organic electro luminescence display (OELD), or the like, and displays optional information relating to a product, for example, a product name, a category, a price, identification information (for example, an identification number, a barcode, and the like), and the like.

The mode identification LED 1113 is a display device that shows an operation mode of the electronic shelf label 1101. The mode identification LED 1113 shows an operation mode of the electronic shelf label 1101 by, for example, a luminescent color, existence or non-existence of luminescence, and the like. Note that a display device that shows an operation mode of the electronic shelf label 1101 is not limited to an LED, and may be configured with an optional display device. Furthermore, for example, the configuration may be such that the above display device is omitted, and an image (for example, a picture, a character, a mark, and the like) showing an operation mode of the electronic shelf label 1101 is displayed on the monitor 1112.

Note that a configuration of a housing of the electronic shelf label 1101 is optional, and is not limited to the example shown in FIG. 28. For example, each of the camera 1111, the monitor 1112, and the mode identification LED 1113 may be arranged at a position different from that in the example of FIG. 28 on a housing of the electronic shelf label 1101. Furthermore, a plurality of each of the camera 1111, the monitor 1112, and the mode identification LED 1113 may be provided. The number of each of them is optional, and does not need to be the same as one another. Moreover, the electronic shelf label 1101 may include a ranging sensor.

Furthermore, the electronic shelf label 1101 has a communication function, and can perform communication with other devices, for example, a server 1103, and the like, via the network 1102.

The network 1102 is an optional communication network, and may be a communication network for wired communication or a communication network for radio communication, or may be configured with both. Furthermore, the network 1102 may be configured with one communication network or a plurality of communication networks. For example, a communication network and a communication channel of an optional communication standard, such as the Internet, a public telephone line network, a wide-area communication network for a radio mobile body, such as what is called a 3G network, 4G network, or the like, a wide area network (WAN), a local area network (LAN), a radio communication network that performs communication in compliance with the Bluetooth (registered trademark) standard, a communication channel of short-range radio communication, such as near field communication (NFC) and the like, a communication channel of infrared communication, a communication network of wired communication in compliance with standards of a high-definition multimedia interface (HDMI), a universal serial bus (USB), and the like, and the like may be included in the network 1102.

The server 1103 provides information associated with a product and the like to the electronic shelf label 1101. The server 1103 has a communication function, and can perform communication with other devices, such as the electronic shelf label 1101 and the like, via the network 1102. A configuration of the server 1103 will be described later. The configuration of the server 1103 is optional, and the server 1103 may be configured with one device, configured with a plurality of devices, or may be configured as a virtual server that operates on one or a plurality of servers. Moreover, the configuration may be such that a configuration of the server 1103 is not identified, and what is called a cloud server is used.

<Installation Example of an Electronic Shelf Label>

Figure 29:
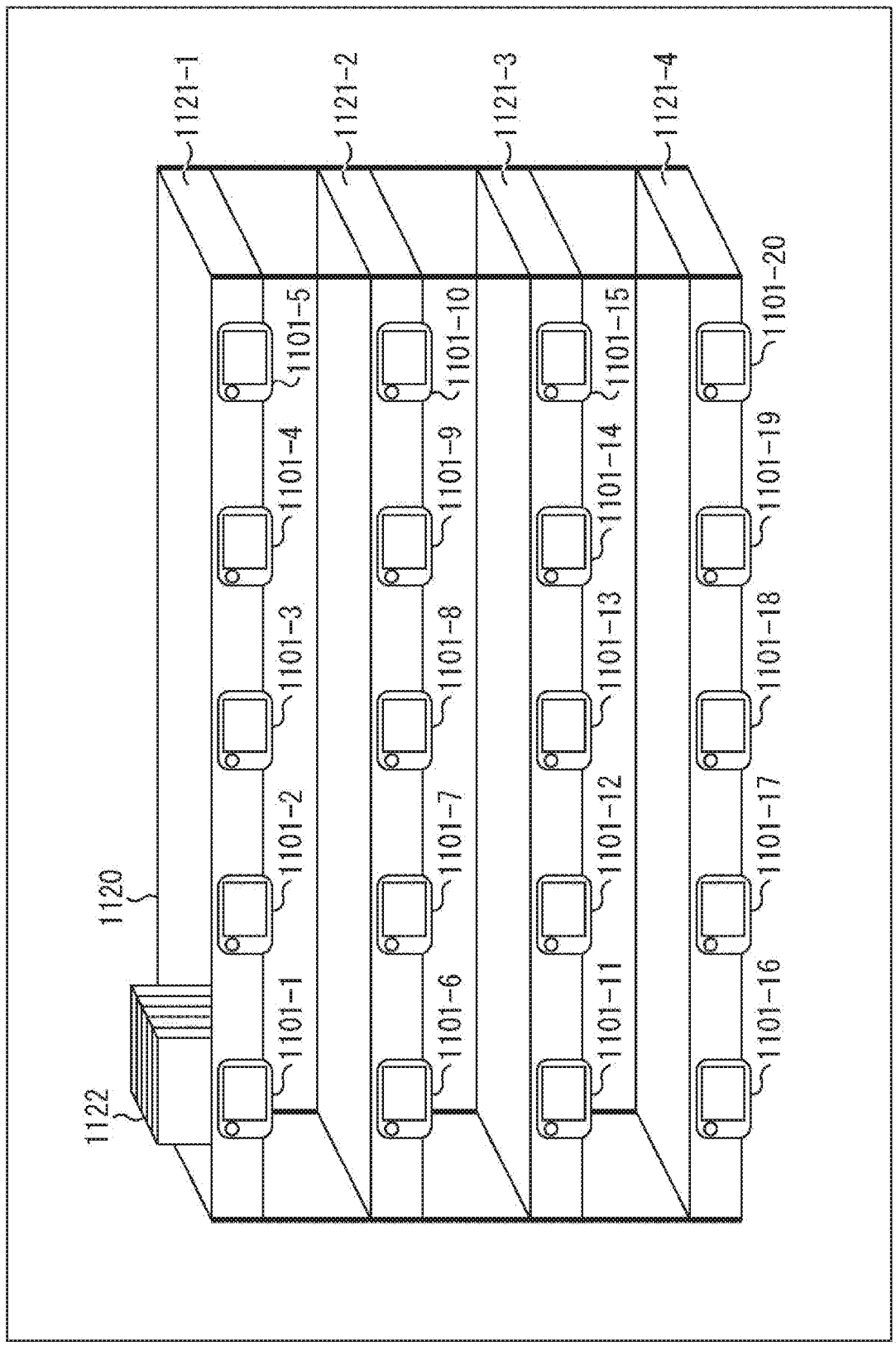
FIG. 29 is a diagram explaining an example of a state of arrangement of an electronic shelf label.

FIG. 29 is a diagram showing an example of a state of installation of the electronic shelf label 1101. As shown in FIG. 29, the electronic shelf label 1101 is installed in the vicinity of each product type for each product type. In a case of the example of FIG. 29, the electronic shelf labels 1101-1 to 1101-20 are installed on a front side (customer side) of a product shelf (in other words, a display shelf of a product) 1120. A product 1122 is arranged on each of shelves 1121-1 to 1121-4 of the product shelf 1120. Note that, hereinafter, the shelves 1121-1 to 1121-4 will be referred to as the shelf 1121 in a case where these shelves do not need to be distinguished from each other. Furthermore, in FIG. 29, only one group of the products 1122 are shown. However, an optional number of the products 1122 can be arranged at an optional position on the shelf 1121.

In FIG. 29, illustration of the product 1122 is omitted. However, in actuality, each of the electronic shelf label 1101 is arranged in the vicinity of a product for which each of the electronic shelf label 1101 displays information. For example, information (for example, a product name, a price, and the like) of the product 1122 illustrated in FIG. 29 is displayed on the electronic shelf label 1101-1 arranged in the vicinity of the product. A customer can grasp a corresponding relationship between the product 1122 and the electronic shelf label 1101 from their positional relationship, a product name and the like displayed on the electronic shelf label.

<Configuration of the Electronic Shelf Label>

Figure 30:
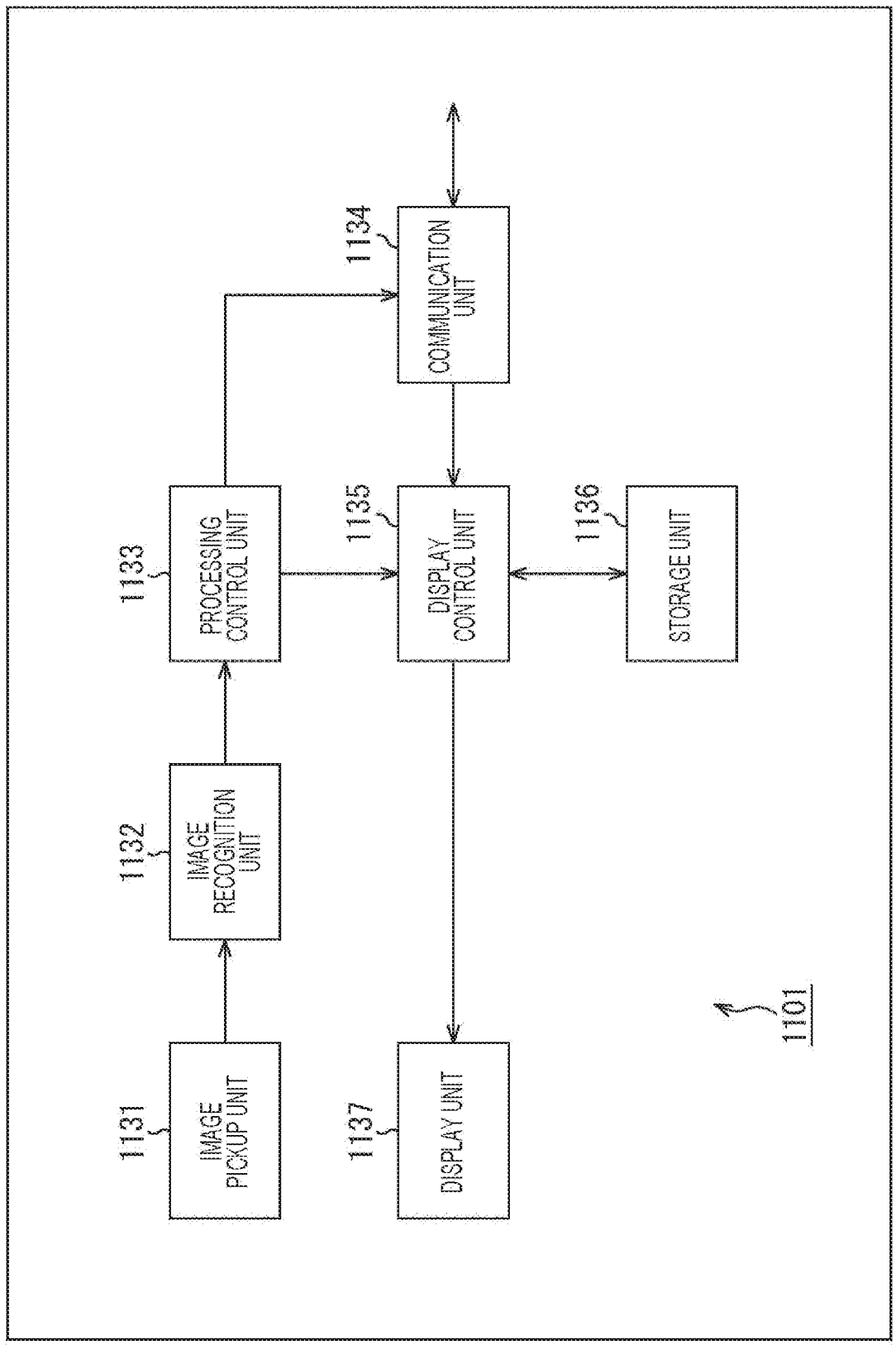
FIG. 30 is a block diagram showing a main configuration example of the electronic shelf label.

FIG. 30 is a block diagram showing a main configuration example of the electronic shelf label 1101. As shown in FIG. 30, the electronic shelf label 1101 has processing units such as, for example, an image pickup unit 1131, an image recognition unit 1132, a processing control unit 1133, a communication unit 1134, a display control unit 1135, a storage unit 1136, a display unit 1137, and the like.

The image pickup unit 1131 is a processing unit that includes the camera 1111 and the like, and picks up an image of an object to obtain a picked-up image (image data). The image pickup unit 1131 supplies image data of an obtained picked-up image to the image recognition unit 1132. The image recognition unit 1132 is a processing unit that analyzes image data (picked-up image) supplied from the image pickup unit 1131, and recognizes desired information associated with a product included in the picked-up image. The image recognition unit 1132 notifies the processing control unit 1133 of a result of the recognition.

The processing control unit 1133 is a processing unit that performs processing relating to selection of an operation mode on the basis of a result of recognition performed by the image recognition unit 1132. The processing control unit 1133 supplies data corresponding to the selected operation mode to the communication unit 1134 and the display control unit 1135. The communication unit 1134 is a processing unit that performs communication with other devices. For example, the communication unit 1134 supplies data supplied from the processing control unit 1133 to the server 1103 via the network 1102. Furthermore, for example, the communication unit 1134 acquires data from the server 1103 via the network 1102, and supplies the data to the display control unit 1135.

The display control unit 1135 is a processing unit that performs processing relating to display control of the display unit 1137. For example, the display control unit 1135 generates an image to be displayed by using data supplied from the processing control unit 1133, the communication unit 1134, and the like, supplies the image to be displayed to the display unit 1137, and causes the display unit 1137 to display the image to be displayed. Note that the display control unit 1135 can store data supplied from the processing control unit 1133, the communication unit 1134, and the like in the storage unit 1136, and read out the data at an optional timing. That is, the display control unit 1135 can generate an image to be displayed and cause the display unit 1137 to display the image to be displayed at an optional timing regardless of a data supply timing.

The storage unit 1136 is a processing unit that has an optional storage medium, and can store information supplied from the display control unit 1135. The storage unit 1136 supplies stored information to the display control unit 1135 in response to a request from the display control unit 1135. The display unit 1137 is a processing unit that has, for example, the monitor 1112 and the mode identification LED 1113, and performs processing relating to display and the like of an image to be displayed supplied from the display control unit 1135.

Figure 31:
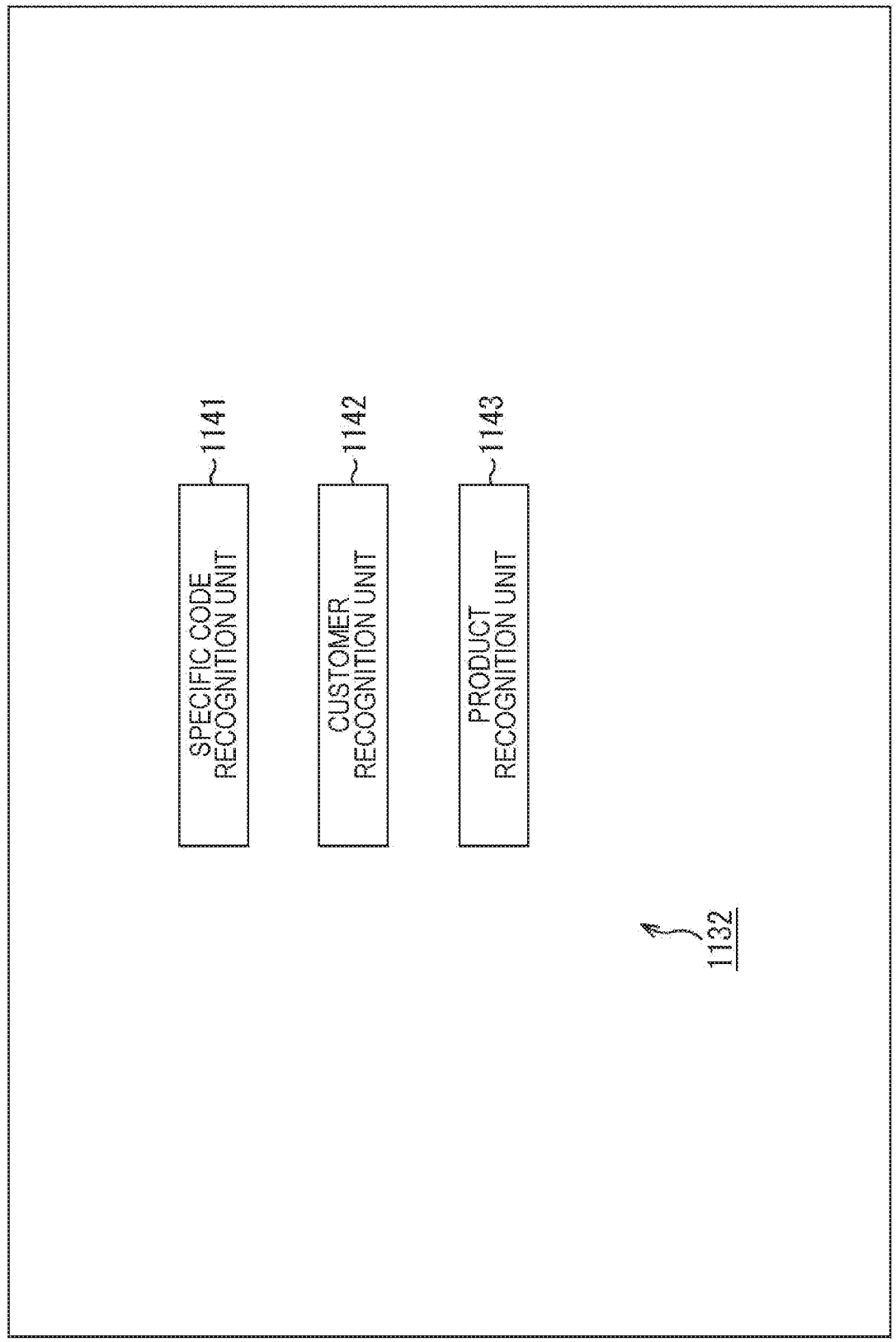
FIG. 31 is a block diagram showing a main configuration example of an image recognition unit.

FIG. 31 is a block diagram showing a main configuration example of the image recognition unit 1132 of FIG. 30. As shown in FIG. 31, the image recognition unit 1132 has, for example, a specific code recognition unit 1141, a customer recognition unit 1142, and a product recognition unit 1143.

The specific code recognition unit 1141 performs processing relating to recognition of a specific code for setting an operation mode included in a picked-up image. The customer recognition unit 1142 performs processing relating to recognition of a face of a customer and the like included in a picked-up image. The product recognition unit 1143 performs processing relating to recognition of information associated with a product included in a picked-up image.

<Information Setting Mode>

In a case where displayed information of a product is updated, the electronic shelf label 1101 operates in an information setting mode. In a case of the information setting mode, the electronic shelf label 1101 picks up an image of information associated with a product by using the camera 1111 and recognizes the information associated with the product included in the picked-up image, so as to update information to be displayed on the monitor 1112.

For example, the image pickup unit 1131 picks up an image of information associated with a product by using the camera 1111. The information associated with a product may be any information, as long as the information allows the product to be identified. For example, the information may be an appearance, packaging, and the like of a product, or information (identification information) that identifies the product described on places other than the product, such as the packaging, a product catalog, and the like. This identification information may be any information, and may be, for example, a product name, a barcode, a QR code (registered trademark), a manufacturing number, an identification number, and the like, may be information other than these, or may be a combination of a plurality of types of information.

The product recognition unit 1143 of the image recognition unit 1132 recognizes information associated with a product included in the picked-up image. The processing control unit 1133 supplies the information associated with a product as recognition data recognized by the image recognition unit 1132 to the communication unit 1134. The communication unit 1134 supplies the recognition data to the server 1103. The server 1103 supplies data to be displayed associated with a product corresponding to the recognition data to the electronic shelf label 1101.

The communication unit 1134 of the electronic shelf label 1101 acquires the data to be displayed, and the display control unit 1135 generates an image to be displayed by using the data to be displayed. A content of the image to be displayed is optional, and, for example, may include at least any one of a product name, a price, and a barcode (identification information) of a product whose image is picked up by the image pickup unit 1131 (or a product corresponding to "information associated with a product" whose image is picked up). Furthermore, for example, information of a production place, a producer, and the like of a product may be included. Furthermore, information of a discount price and the like may be included. As a matter of course, information other than the above examples may be included in the image to be displayed. For example, information regarding a product different from a product whose image is picked up (or a product corresponding to "information associated with a product" whose image is picked up) may be displayed. For example, information associated with a product recommended to a customer by a seller side may be included. Furthermore, a plurality of types of information may be included in the image to be displayed.

The display unit 1137 causes the monitor 1112 to display the image to be displayed. That is, the display unit 1137 causes an "image associated with a product" corresponding to information associated with a product recognized by the image recognition unit 1132 to be displayed.

Accordingly, for example, a salesperson of a store that sells a product sets the electronic shelf label 1101 to the "information setting mode", and causes the camera 1111 to pick up an image of a product and the like (for example, a product, packaging of a product, a product catalog, and the like). In this manner, a content displayed on the monitor 1112 of the electronic shelf label 1101 can be updated to information regarding the product. That is, dedicated devices, such as a handy terminal, become unnecessary when information is updated, and increase in cost can be restricted. Furthermore, since operation of dedicated devices, such as a handy terminal, becomes unnecessary, information to be displayed by the electronic shelf label 1101 can be updated more easily. That is, usability can be improved.

Note that the configuration may be such that the electronic shelf label 1101 operates alone, and information to be displayed can be updated without using the server 1103. For example, the electronic shelf label 1101 may store a plurality of pieces of data to be displayed regarding a product in advance, and select a piece of data to be displayed to be used on the basis of information associated with a product for which an image is picked up. However, by using the server 1103 as described above, limitation caused by a storage capacity of the electronic shelf label 1101 can be restricted, and more products and more pieces of information can be supported (a more variety of pieces of information can be displayed). Furthermore, more up-to-date information can be displayed. Moreover, in a case where an entire system is considered, information of a plurality of the electronic shelf labels 1101 can be managed collectively by the server 1103. Accordingly, management becomes easier, and increase in cost can be restricted.

<Information Acquisition Mode>

In a case where information is not updated, the electronic shelf label 1101 displays an image to be displayed including information associated with a product. At this time, the electronic shelf label 1101 operates in an information acquisition mode, and can collect information associated with a customer. Furthermore, an image to be displayed can also be updated on the basis of the collected information.

For example, the image pickup unit 1131 picks up an image of a face, a hand, and the like of a customer by using the camera 1111. The customer recognition unit 1142 of the image recognition unit 1132 recognizes information associated with a customer from an image of a customer included in the picked-up image. The information associated with a customer may be any information, and may be, for example, registration information, such as age (or age group), gender, name, contact address, and the like, expression, position, direction, motion, gaze, temperature, state of breathing, lines of palm, fingerprint, and the like, may be information other than these, or may be a combination of a plurality of types of information.

The processing control unit 1133 supplies the information associated with a customer as recognition data recognized by the image recognition unit 1132 to the communication unit 1134. The communication unit 1134 supplies the recognition data to the server 1103. The server 1103 acquires and manages the recognition data. In the above manner, the server 1103 can easily collect information associated with a customer from each of the electronic shelf labels 1101, and can analyze a type and a behavior of a customer and use a result of the analysis and a total result for planning and the like of a sales strategy. Moreover, the result of the analysis and the total result can also be used for control of information display performed by the electronic shelf label 1101. That is, usability can be improved.

Note that, since the electronic shelf label 1101 is installed at a position close to a product, by operating in the information acquisition mode as described above, the electronic shelf label 1101 can collect information regarding a customer in the vicinity of a product, for example, which product is compared with which product, whether the customer only looks at a product or picks up the product, how many products the customer put in a basket, whether the customer returned the product to a shelf, and the like. Accordingly, more useful information can be obtained.

Furthermore, for example, the configuration may be such that data to be displayed on the electronic shelf label 1101 is selected on the basis of information associated with a customer collected by the server 1103, and the data to be displayed is supplied to the electronic shelf label 1101. A content of the data to be displayed is optional. For example, information associated with a product may be included in the data to be displayed. For example, the server 1103 may select, as data to be displayed, information associated with a product that is expected to have an advertising effect by being presented to a customer on the basis of collected information associated with the customer. Furthermore, for example, the server 1103 may identify a way of displaying by which a more significant effect can be obtained (for example, a layout of an image to be displayed and the like) on the basis of collected information associated with a customer, and select data to be displayed that shows the displaying method.

The communication unit 1134 of the electronic shelf label 1101 acquires the data to be displayed, the display control unit 1135 generates an image to be displayed (image relating to a product) from the data to be displayed, and the display unit 1137 causes the monitor 1112 to display the image to be displayed. That is, the display unit 1137 can cause the monitor 1112 to display an image relating to a product corresponding to collected information associated with a customer. Accordingly, the electronic shelf label 1101 can perform display by which a more significant effect (for example, a sales promotion effect) can be expected.

<Switching of Modes>

The electronic shelf label 1101 can switch between the information setting mode and the information acquisition mode described above. This switching method is optional. For example, the configuration may be such that a switch for switching an operation mode is provided on a housing of the electronic shelf label 1101, and the user and the like manually moves the switch to switch an operation mode. Furthermore, for example, the configuration may be such that the electronic shelf label 1101 picks up an image of a specific code so that the switching of an operation mode can be performed.

For example, the image pickup unit 1131 uses the camera 1111 to pick up an image (of a specific code) exclusively used for switching an operation mode. This specific code may be any image. The specific code may be a character, a number, a mark, or the like, or may be a barcode, a QR code, or the like. The specific code may be a face, a hand (a vein and a fingerprint), and the like of a person registered in advance, such as an administrator or the like. Furthermore, the specific code may be something other than the above, or a combination of a plurality of types of information.

The specific code recognition unit 1141 of the image recognition unit 1132 recognizes a specific code included in the picked-up image. The processing control unit 1133 switches an operation mode in accordance with a result of recognition of the specific code. In other words, the processing control unit 1133 selects information to be used as recognition data in accordance with a result of recognition of a specific code. In other words, the processing control unit 1133 controls whether to supply information associated with a product to the server 1103, or to supply information associated with a customer to the server 1103.

The display unit 1137 updates display of the mode identification LED 1113 in accordance with the switching of a mode. For example, the display unit 1137 switches a display color of the mode identification LED 1113, or lights up, turns off, or blinks the mode identification LED 1113. Note that the display unit 1137 may use the mode identification LED 1113 to notify that an operation mode is switched.

As described above, the electronic shelf label 1101 can easily switch an operation mode without using a dedicated device. That is, the electronic shelf label 1101 can operate in the two modes described above more easily. Accordingly, usability can be improved.

<Configuration of a Server>

Figure 32:
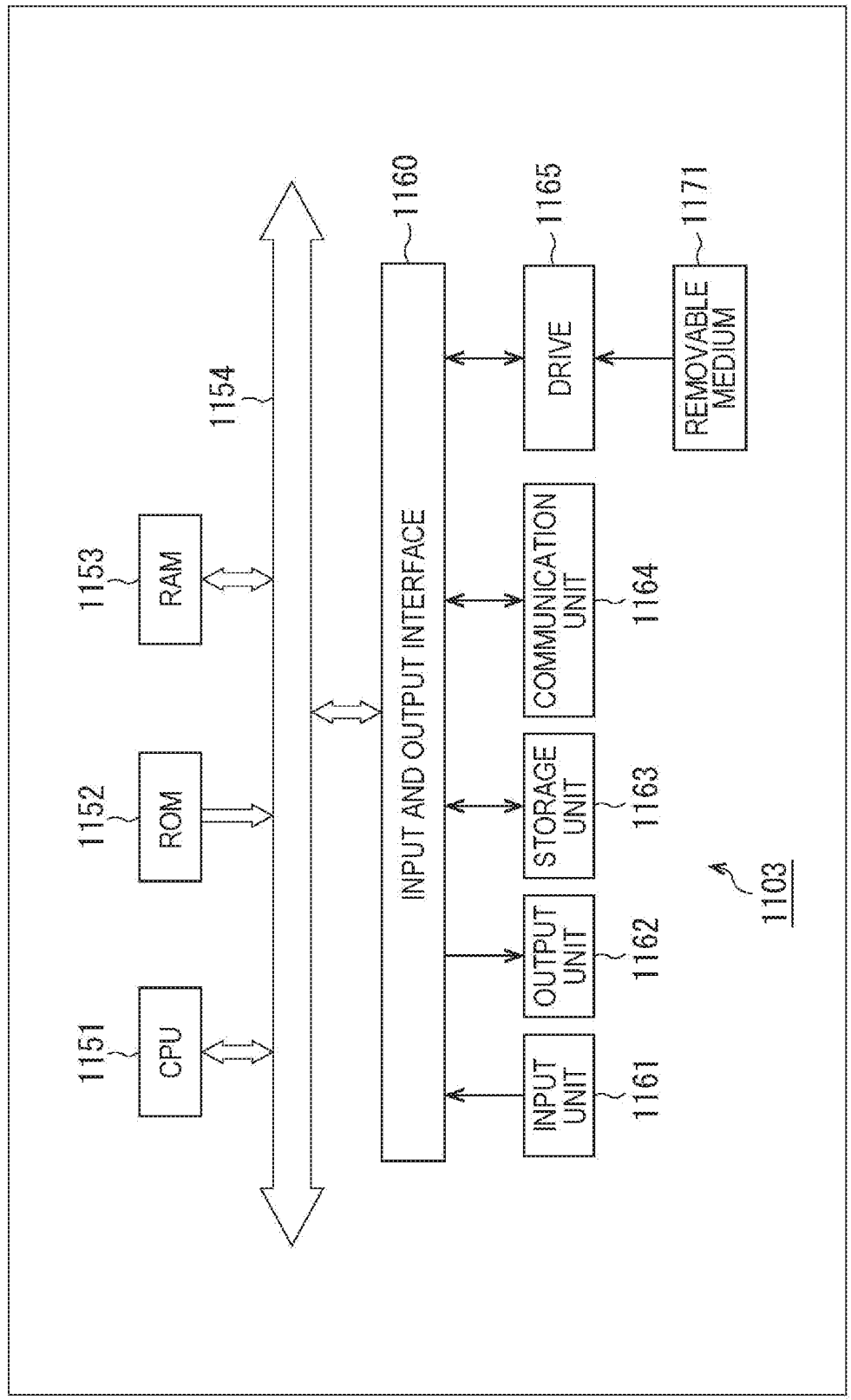
FIG. 32 is a block diagram showing a main configuration example of a server.

FIG. 32 is a block diagram showing a main configuration example of the server 1103. As shown in FIG. 32, the server 1103 has a central processing unit (CPU) 1151, a read only memory (ROM) 1152, and a random access memory (RAM) 1153 which are mutually connected via a bus 1154.

Furthermore, an input and output interface 1160 is also connected to the bus 1154. An input unit 1161, an output unit 1162, and a storage unit 1163, a communication unit 1164, and a drive 1165 are connected to the input and output interface 1160.

The input unit 1161 has an optional input device such as, for example, a keyboard, a mouse, a touch panel, an image sensor, a microphone, a switch, an input terminal, and the like. The output unit 1162 has an optional output device such as, for example, a display, a speaker, an output terminal, and the like. The storage unit 1163 has an optional storage medium such as, for example, a non-volatile memory and the like, such as a hard disk, a RAM disk, a solid state drive (SSD), a USB memory, and the like. The communication unit 1164 has a communication interface of an optional communication standard for wired or radio communication, or both, such as, for example, Ethernet (registered trademark), Bluetooth, USB, HDMI (registered trademark), IrDA, and the like. The drive 1165 drives a removable medium 1171 having an optional storage medium, such as a magnetic disk, an optical disk, a magneto-optical disk, a semiconductor memory, or the like, that is mounted on itself.

In the server 1103 configured as described above, for example, the CPU 1151 loads a program stored in the storage unit 1163 into the RAM 1153 via the input and output interface 1160 and the bus 1154 and executes the program so as to be able to perform a function described later. Furthermore, data and the like necessary for the CPU 1151 to execute a variety of types of processing are stored as appropriate in the RAM 1153.

A program executed by the CPU 1151 can be recorded in the removable medium 1171 used, for example, as a package medium and the like, and applied. In such a case, the program can be installed in the storage unit 1163 via the input and output interface 1160 by mounting the removable medium 1171 on the drive 1165. Furthermore, the program can also be provided via a wired or radio transmission medium, such as a local area network, the Internet, or digital satellite broadcasting. In such a case, the program can be received by the communication unit 1164 and installed in the storage unit 1163. Other than the above, the program can also be installed in the ROM 1152 or the storage unit 1163 in advance.

<Process of Information Acquisition Processing>

Next, processing executed in the electronic shelf label system 1100 as described above will be described. The electronic shelf label 1101 executes information acquisition processing to perform processing in the information setting mode described above, processing in the information acquisition mode, switching of an operation mode, or the like.

An example of a process of the information acquisition processing will be described with reference to a flowchart of FIG. 33. When the information acquisition processing is started, the image pickup unit 1131 of the electronic shelf label 1101 starts image pickup by the camera 1111 in step S1101. Furthermore, in step S1102, each processing unit of the electronic shelf label 1101 performs initial setting.

In step S1103, the image pickup unit 1131 picks up an image of an object by using the camera 1111 to obtain a picked-up image. In step S1104, the image recognition unit 1132 performs image recognition processing to recognize information included in the picked-up image. Details of the image recognition processing will be described later. In step S1105, the processing control unit 1133 performs recognition data selection processing on the basis of a result of the image recognition processing to select data to be used as recognition data. Details of the recognition data selection processing will be described later. In step S1106, the display control unit 1135 controls the display unit 1137 to perform display that shows a current operation mode. The display unit 1137 performs the display by using the mode identification LED 1113. In step S1107, the communication unit 1134 transmits the recognition data selected by the processing of step S1105 to the server 1103.

In step S1108, the electronic shelf label 1101 determines whether or not to finish the information acquisition processing, and, if determining not to finish the processing, the electronic shelf label 1101 returns the processing to step S1103 and repeats the processing of step S1103 and subsequent steps. Furthermore, when the electronic shelf label 1101 determines to finish the information acquisition processing in step S1108, the information acquisition processing is finished.

<Process of Image Recognition Processing>

Next, an example of a process of image recognition processing executed in step S1104 in FIG. 33 will be described with reference to flowcharts of FIGS. 34 and 35.

When the image recognition processing is started, the product recognition unit 1143 of the image recognition unit 1132 analyzes a picked-up image, and recognizes information associated with a product included in the picked-up image. For example, the product recognition unit 1143 recognizes a design of a housing and packaging of a product, a product name, identification information, and the like included in the picked-up image. The product recognition unit 1143 stores a result of the recognition of information associated with a product.

Furthermore, the customer recognition unit 1142 of the image recognition unit 1132 analyzes a picked-up image, and recognizes information associated with a customer included in the picked-up image. For example, the customer recognition unit 1142 recognizes a face, a hand, a motion, a gaze, and the like of a customer included in a picked-up image. The customer recognition unit 1142 stores a result of the recognition of information associated with a customer.

Furthermore, the specific code recognition unit 1141 of the image recognition unit 1132 analyzes a picked-up image, and recognizes a specific code included in the picked-up image. For example, the specific code recognition unit 1141 recognizes a barcode, a QR code, an identification number, a face of an administrator, and the like included in a picked-up image.

Figure 33:
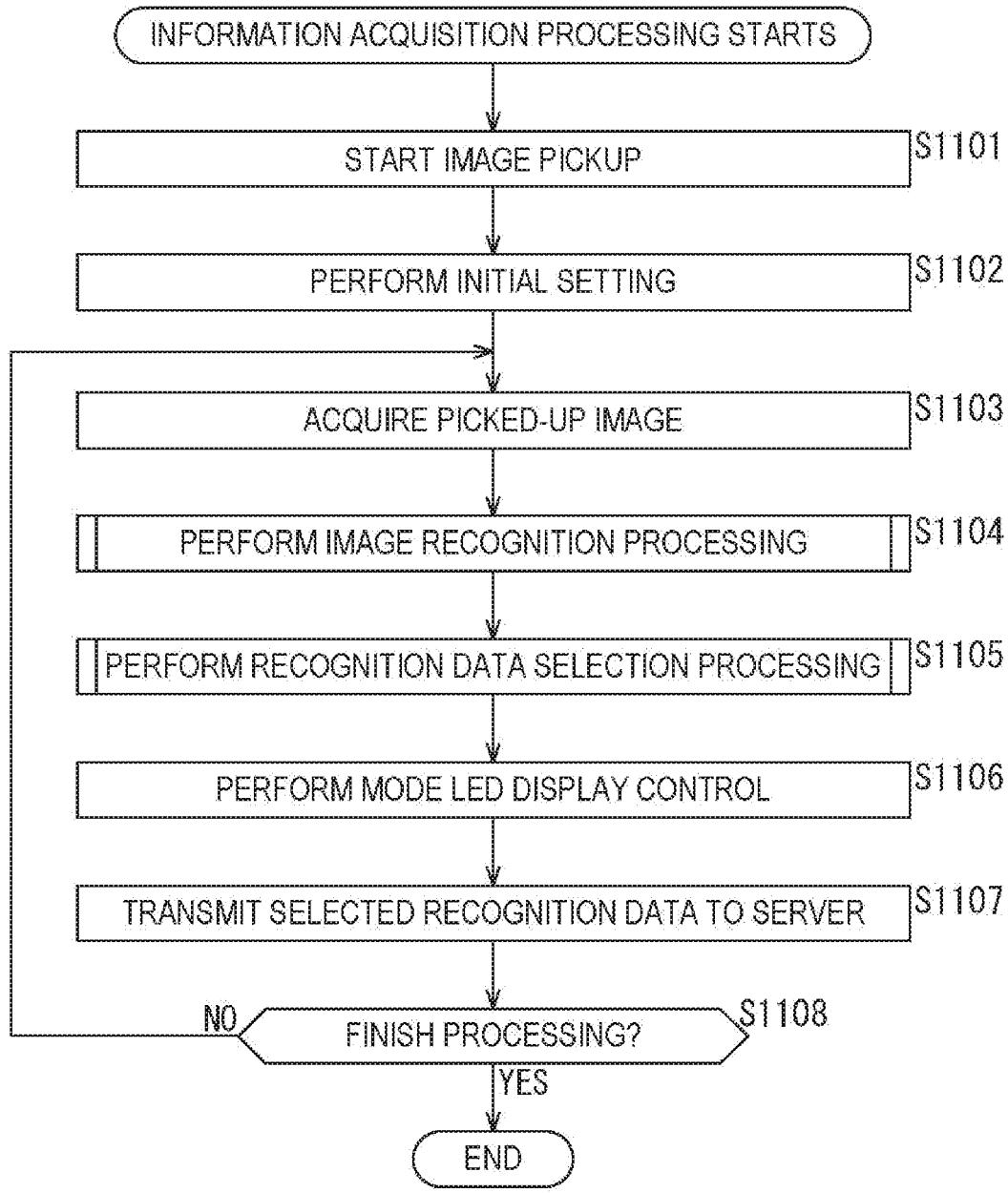
FIG. 33 is a flowchart explaining an example of a process of information acquisition processing.
Figure 34:
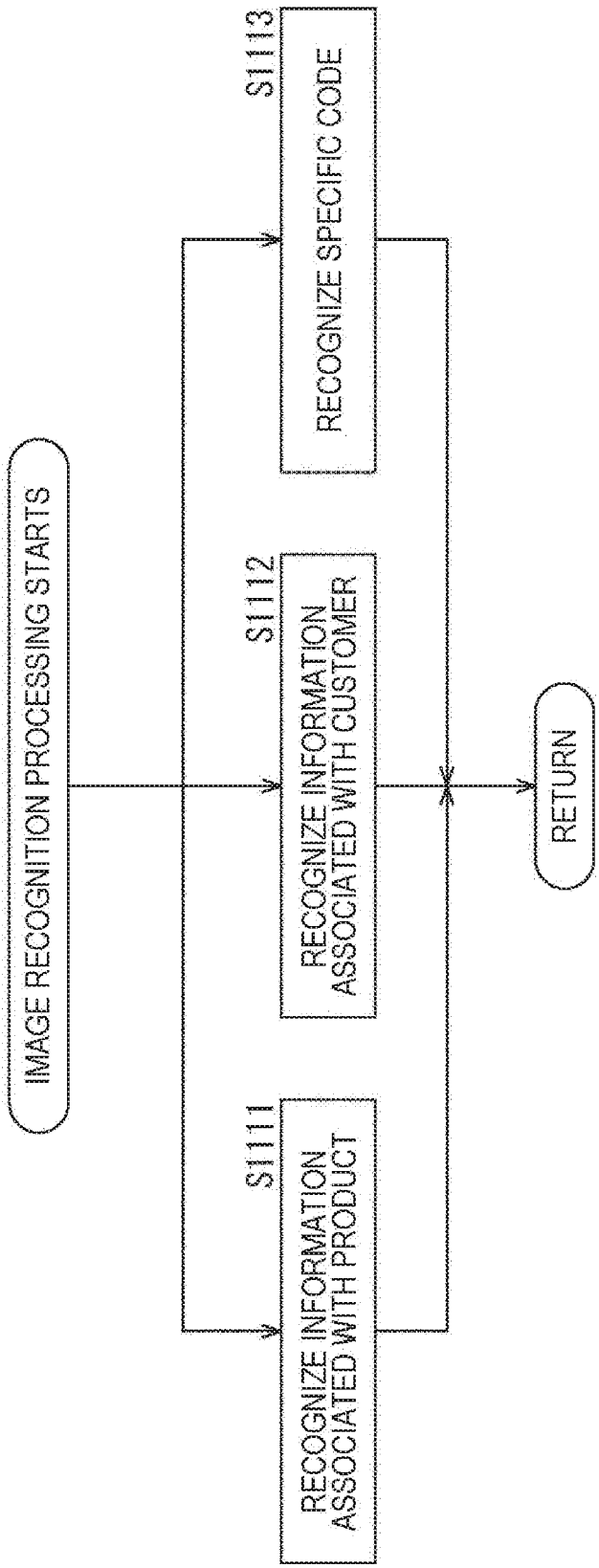
FIG. 34 is a flowchart explaining an example of a process of image recognition processing.
Figure 35:
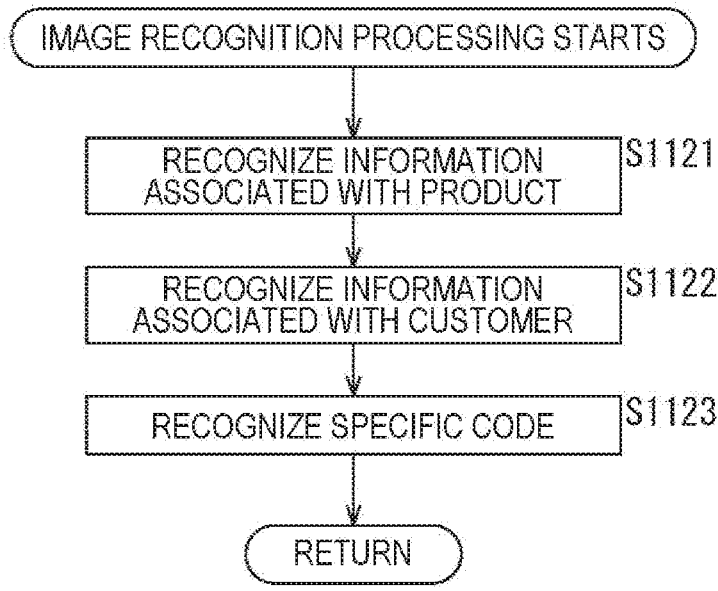
FIG. 35 is a flowchart explaining an example of a process of the image recognition processing.

Each piece of the above processing may be executed in parallel as shown in steps S1111 to S1113 in FIG. 34, or may be executed in series as shown in steps S1121 to S1123 in FIG. 35. When the above processing is finished, the image recognition processing is finished, and the processing returns to FIG. 33.

<Process of Recognition Data Selection Processing>

Figure 37:
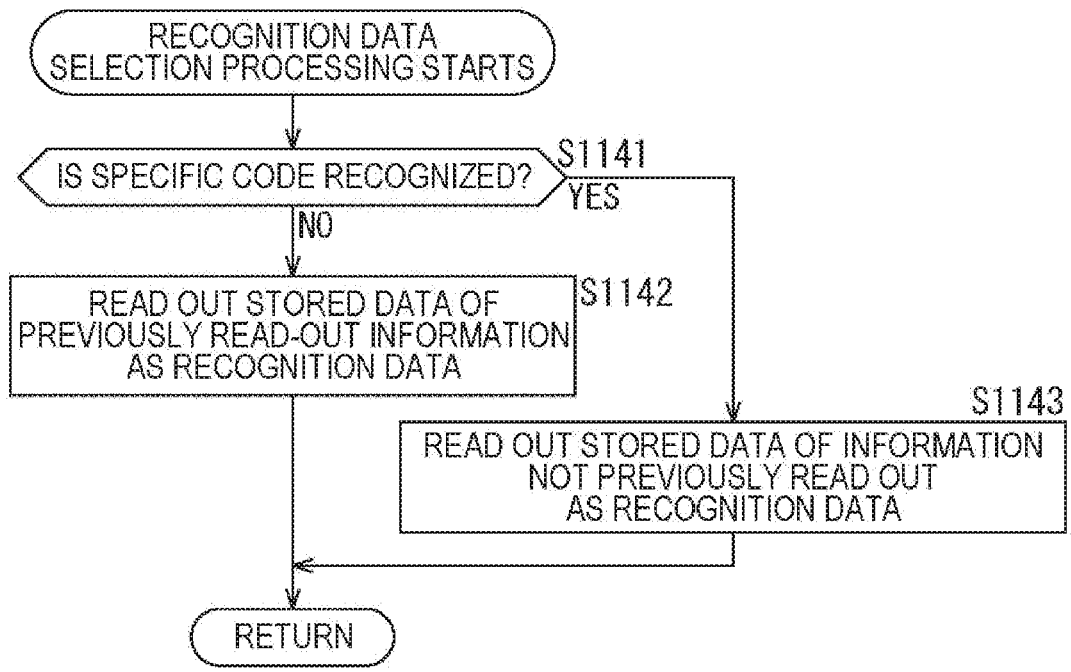
FIG. 37 is a flowchart explaining an example of a process of the image data selection processing.
Figure 38:
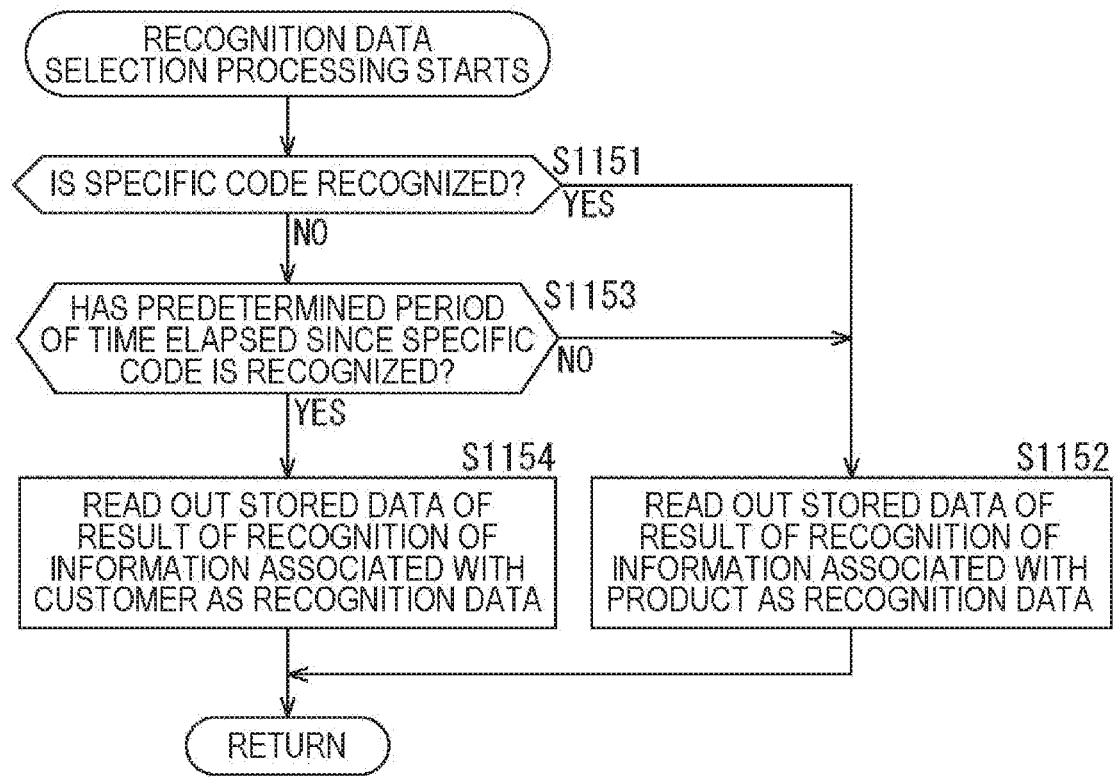
FIG. 38 is a flowchart explaining an example of a process of the image data selection processing.

Next, an example of a process of recognition data selection processing executed in step S1105 in FIG. 33 will be described with reference to flowcharts of FIGS. 36 to 38.

For example, if an administrator positions a predetermined specific code (for example, optional information, such as a barcode, an identification number, a face of the administrator, or the like) in front of the camera 1111 and causes the camera 1111 to pick up an image, the specific code recognition unit 1141 recognizes the specific code in step S1104 in FIG. 33. The specific code used for designation of an operation mode may be, for example, information unique to a mode. That is, the configuration may be such that a first specific code showing an information setting mode and a second specific code showing an information acquisition mode exist as the specific codes, and an operation mode is controlled depending on of which of the specific codes an image is picked up. For example, the configuration may be such that, in a case where an image of the first specific code is picked up, the information setting mode is selected, and in a case where an image of the second specific code is picked up, the information acquisition mode is selected. The first specific code and the second specific code may be any information as long as the codes are distinguishable from each other.

An example of a process of the recognition data selection processing in this case will be described with reference to a flowchart of FIG. 36. When the recognition data selection processing is started, the processing control unit 1133 determines, in step S1131, whether or not the first specific code is recognized by the processing of step S1104 in FIG. 33. In a case where the first specific code is determined to be recognized, the processing proceeds to step S1132.

In step S1132, the processing control unit 1133 sets an operation mode to the information setting mode, and reads out stored data of a result of recognition of information associated with a product as recognition data from the product recognition unit 1143. The readout result of recognition of information associated with a product is transmitted as recognition data to the server 1103 in step S1107 in FIG. 33. Furthermore, in this case, in step S1106 in FIG. 33, display of the mode identification LED 1113 is set to display showing the information setting mode. When the processing of step S1132 is finished, the recognition data selection processing is finished, and the processing returns to FIG. 33.

In step S1131, in a case where the first specific code is determined not to be recognized, the processing proceeds to step S1133. In step S1133, the processing control unit 1133 determines whether or not the second specific code is recognized by the processing of step S1104 in FIG. 33. In a case where the second specific code is determined to be recognized, the processing proceeds to step S1134.

In step S1134, the processing control unit 1133 sets an operation mode to the information acquisition mode, and reads out stored data of a result of recognition of information associated with a customer as recognition data from the customer recognition unit 1142. The readout result of recognition of information associated with a customer is transmitted as recognition data to the server 1103 in step S1107 in FIG. 33. Furthermore, in this case, in step S1106 in FIG. 33, display of the mode identification LED 1113 is set to display showing the information acquisition mode. When the processing of step S1134 is finished, the recognition data selection processing is finished, and the processing returns to FIG. 33.

In step S1133, in a case where the second specific code is determined not to be recognized, the processing proceeds to step S1135. In step S1135, the processing control unit 1133 keeps an operation mode to the mode that is the same as that when the stored data is read out previously, and reads out stored data of information corresponding to the mode as recognition data. For example, in a case where the previous mode is the information setting mode, the processing control unit 1133 reads out, in a manner similar to the case of step S1132, stored data of a result of recognition of information associated with a product as recognition data from the product recognition unit 1143. Furthermore, for example, in a case where the previous mode is the information acquisition mode, the processing control unit 1133 reads out, in a manner similar to the case of step S1134, stored data of a result of recognition of information associated with a customer as recognition data from the customer recognition unit 1142. The readout recognition data is transmitted to the server 1103 in step S1107 in FIG. 33. Furthermore, in this case, in step S1106 in FIG. 33, display of the mode identification LED 1113 is kept to be the previous one. When the processing of step S1135 is finished, the recognition data selection processing is finished, and the processing returns to FIG. 33.

Furthermore, the configuration may be such that a single specific code is used for designation of an operation mode, and an operation mode is switched in a case where the specific code is recognized. An example of a process of the recognition data selection processing in this case will be described with reference to a flowchart of FIG. 37. When the recognition data selection processing is started, the processing control unit 1133 determines, in step S1141, whether or not the specific code is recognized by the processing of step S1104 in FIG. 33. In a case where the specific code is determined not to be recognized, the processing proceeds to step S1142.

In step S1142, the processing control unit 1133 sets an operation mode to the mode that is the same as that when read out previously, and reads out stored data read out previously as recognition data. For example, if a previous operation mode is the information setting mode, and stored data of a result of recognition of information associated with a product is read out as recognition data, the processing control unit 1133 sets an operation mode to the information setting mode this time again, and reads out stored data of a result of recognition of information associated with a product as recognition data. In contrast, if a previous operation mode is the information acquisition mode, and stored data of a result of recognition of information associated with a customer is read out as recognition data, the processing control unit 1133 sets an operation mode to the information acquisition mode this time again, and reads out stored data of a result of recognition of information associated with a customer as recognition data. When the processing of step S1142 is finished, the recognition data selection processing is finished, and the processing returns to FIG. 33.

Furthermore, in step S1141, in a case where the specific code is determined to be recognized, the processing proceeds to step S1143. In step S1143, the processing control unit 1133 switches an operation mode, and reads out stored data that is not read out previously as recognition data. For example, if a previous operation mode is the information setting mode, and stored data of a result of recognition of information associated with a product is read out as recognition data, the processing control unit 1133 switches an operation mode to the information acquisition mode this time, and reads out stored data of a result of recognition of information associated with a customer as recognition data. In contrast, if a previous operation mode is the information acquisition mode, and stored data of a result of recognition of information associated with a customer is read out as recognition data, the processing control unit 1133 switches an operation mode to the information setting mode this time, and reads out stored data of a result of recognition of information associated with a product as recognition data. When the processing of step S1143 is finished, the recognition data selection processing is finished, and the processing returns to FIG. 33.

Furthermore, the configuration may be such that, in a case where either one of the information setting mode and the information acquisition mode is set in an initial state, and the specific code is recognized, an operation mode is set to the other mode for a certain period of time. An example of a process of the recognition data selection processing in this case will be described with reference to a flowchart of FIG. 38. Note that, here, description will be made by assuming that the information acquisition mode is set in an initial state. When the recognition data selection processing is started, the processing control unit 1133 determines, in step S1151, whether or not the specific code is recognized by the processing of step S1104 in FIG. 33. In a case where the specific code is determined to be recognized, the processing proceeds to step S1152.

In step S1152, the processing control unit 1133 switches an operation mode to the information setting mode, and reads out stored data of a result of recognition of information associated with a product as recognition data. When the processing of step S1152 is finished, the recognition data selection processing is finished, and the processing returns to FIG. 33.

Furthermore, in step S1151, in a case where the specific code is determined not to be recognized, the processing proceeds to step S1153. In step S1153, the processing control unit 1133 determines whether or not a predetermined period of time or longer has elapsed since the specific code is recognized previously. In a case where a predetermined period of time or longer is determined not to have elapsed, the processing returns to step S1152.

Furthermore, in step S1153, in a case where a predetermined period of time or longer is determined to have elapsed since the specific code is recognized previously, the processing proceeds to step S1154. In step S1154, the processing control unit 1133 sets an operation mode to the information acquisition mode, and reads out stored data of a result of recognition of information associated with a customer as recognition data. When the processing of step S1154 is finished, the recognition data selection processing is finished, and the processing returns to FIG. 33.

<Process of Data Provision Processing>

Figure 39:
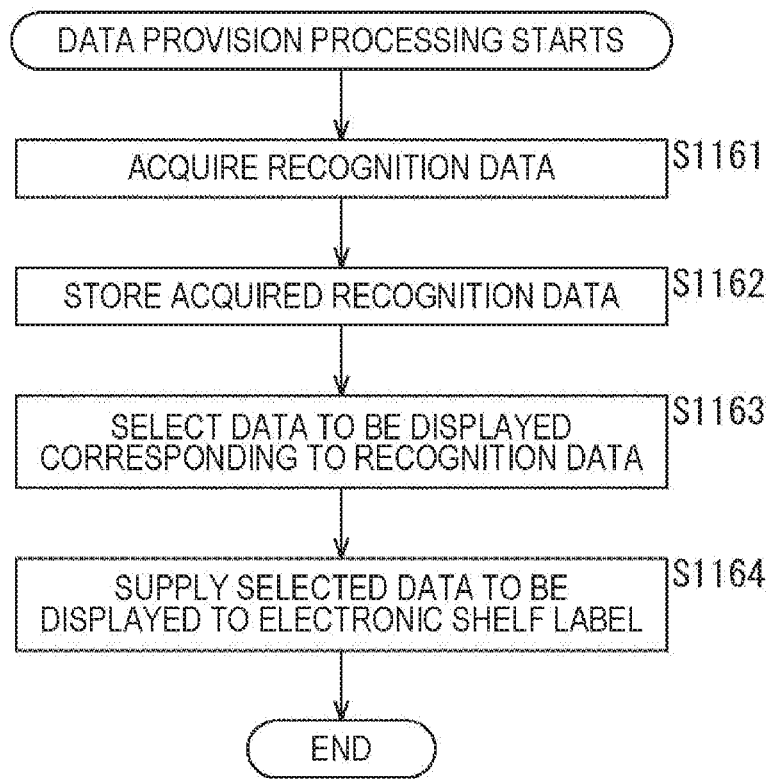
FIG. 39 is a flowchart explaining an example of a process of data provision processing.

The server 1103, to which recognition data is supplied from the electronic shelf label 1101 as described above, performs data provision processing so as to provide data to be displayed corresponding to the recognition data to the electronic shelf label 1101. An example of a process of the data provision processing will be described with reference to a flowchart of FIG. 39.

When the data provision processing is started, the CPU 1151 of the server 1103, in step S1161, controls the communication unit 1164 to acquire recognition data supplied from the electronic shelf label 1101. In step S1162, the CPU 1151 stores the recognition data acquired by the processing of step S1161 in the storage unit 1163. In step S1163, the CPU 1151 selects data to be displayed (data including information to be displayed on the electronic shelf label 1101) corresponding to the recognition data among a group of pieces of data to be displayed stored in the storage unit 1163. In step S1164, the CPU 1151 controls the communication unit 1164 to supply the selected data to be displayed to the electronic shelf label 1101.

When the processing of step S1164 is finished, the data provision processing is finished.

<Process of Display Control Processing>

Figure 40:
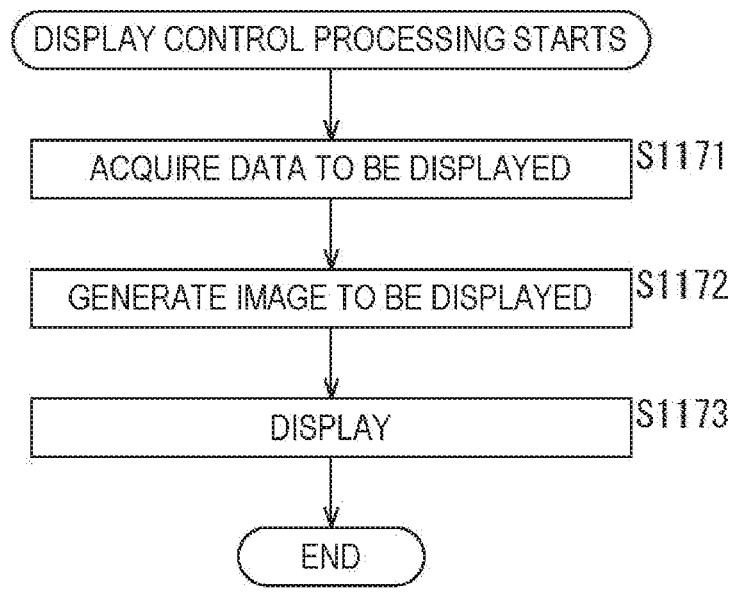
FIG. 40 is a flowchart explaining an example of a process of display control processing.

When data to be displayed is supplied from the server 1103 as described above, the electronic shelf label 1101 executes display control processing, and causes the monitor 1112 to display the data to be displayed. An example of a process of the display control processing will be described with reference to a flowchart of FIG. 40.

When the display control processing is started, the communication unit 1134, in step S1171, acquires data to be displayed supplied from the server 1103. In step S1172, the display control unit 1135 uses the data to be displayed to generate an image to be displayed. In step S1173, the display unit 1137 causes the monitor 1112 to display the image to be displayed.

When the processing of step S1173 is finished, the display control processing is finished.

Note that the configuration may be such that the data to be displayed acquired in step S1171 is temporarily stored in the storage unit 1136, and, at a timing of displaying, the display control unit 1135 reads out the data to be displayed, and generates an image to be displayed. In the above manner, a display timing of an image to be displayed can be made independent of an acquisition timing of data to be displayed.

By performing each piece of processing as described above, the electronic shelf label 1101 can operate in the information setting mode and the information acquisition mode described above, and, furthermore, these operation modes can be switched, and usability can be improved.

3. Third Embodiment

<Selection by Electronic Shelf Label>

The second embodiment describes that information (data to be displayed) displayed by the electronic shelf label 1101 is selected by the server 1103. However, the information may be selected by the electronic shelf label 1101. For example, the configuration may be such that the server 1103 supplies a plurality of pieces of data to be displayed to the electronic shelf label 1101 in advance, and the electronic shelf label 1101 selects and displays data corresponding to information associated with a product recognized from a picked-up image from among the supplied data to be displayed.

<Process of Data Provision Processing>

Figure 41:
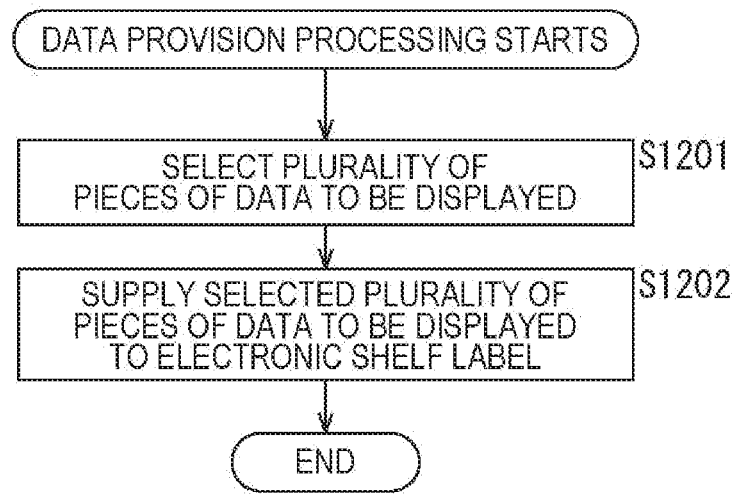
FIG. 41 is a flowchart explaining an example of a process of the data provision processing.

In such a case, the server 1103 executes the data provision processing to supply data to be displayed to the electronic shelf label 1101. An example of a process of the data provision processing will be described with reference to a flowchart of FIG. 41.

When the data provision processing is started, the CPU 1151 of the server 1103 selects, in step S1201, a plurality of pieces of data from data to be displayed stored in the storage unit 1163. The standard of this selection is optional. In step S1202, the CPU 1151 controls the communication unit 1164 to supply a plurality of pieces of the data to be displayed selected in step S1201 to the electronic shelf label 1101.

When the processing of step S1202 is finished, the data provision processing is finished.

<Process of Acquisition Processing for Data to be Displayed>

Figure 42:
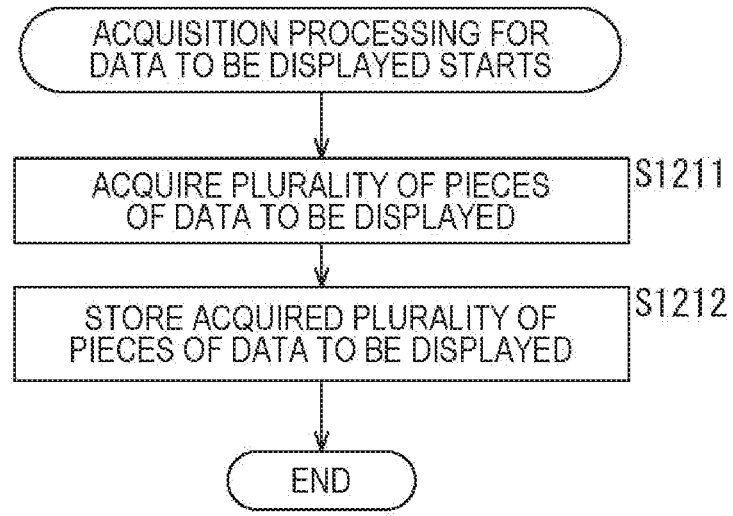
FIG. 42 is a flowchart explaining an example of a process of display data acquisition processing.

With respect to this processing, the electronic shelf label 1101 executes acquisition processing for data to be displayed so as to acquire data to be displayed supplied from the server 1103. An example of a process of the acquisition processing for data to be displayed will be described with reference to a flowchart of FIG. 42.

When the acquisition processing for data to be displayed is started, the communication unit 1134 of the electronic shelf label 1101 acquires, in step S1211, a plurality of pieces of data to be displayed supplied from the server 1103. In step S1212, the storage unit 1136 stores a plurality of pieces of data to be displayed acquired in step S1211.

When the processing of step S1212 is finished, the acquisition processing for data to be displayed is finished.

<Process of Information Acquisition Processing>

The electronic shelf label 1101 that has performed the acquisition processing for data to be displayed executes information acquisition processing to perform processing in the information setting mode described above, processing in the information acquisition mode, switching of an operation mode, or the like.

An example of a process of the information acquisition processing in this case will be described with reference to a flowchart of FIG. 43. When the information acquisition processing is started, the image pickup unit 1131 of the electronic shelf label 1101 starts image pickup by using the camera 1111 in step S1221. Furthermore, in step S1222, each processing unit of the electronic shelf label 1101 performs initial setting.

In step S1223, the image pickup unit 1131 picks up an image of an object by using the camera 1111 to obtain a picked-up image. In step S1224, the image recognition unit 1132 performs image recognition processing to recognize information included in the picked-up image. Details of the image recognition processing are optional. For example, processing similar to that in the case of the second embodiment may be executed.

In step S1225, the processing control unit 1133 performs recognition data selection processing on the basis of a result of the image recognition processing to select data to be used as recognition data. Details of the recognition data selection processing are optional. For example, processing similar to that in the case of the second embodiment may be executed.

In step S1226, the display control unit 1135 controls the display unit 1137 to perform display that shows a current operation mode. The display unit 1137 performs the display by using the mode identification LED 1113. In step S1227, the electronic shelf label 1101 performs display control processing to cause the monitor 1112 to display information corresponding to the recognition data selected by the processing of step S1225. Details of the display control processing will be described later.

In step S1228, the communication unit 1134 transmits the recognition data selected by the processing of step S1225 to the server 1103.

In step S1229, the electronic shelf label 1101 determines whether or not to finish the information acquisition processing, and, if determining not to finish the processing, the electronic shelf label 1101 returns the processing to step S1223 and repeats the processing of step S1223 and subsequent steps. Furthermore, when the electronic shelf label 1101 determines to finish the information acquisition processing in step S1229, the information acquisition processing is finished.

<Process of Display Control Processing>

Next, an example of a process of the display control processing executed in step S1227 in FIG. 43 will be described with reference to a flowchart of FIG. 44. When the display control processing is started, the display control unit 1135 selects, in step S1231, data to be displayed corresponding to the recognition data selected by the processing of step S1225 in FIG. 43 from among a plurality of pieces of data to be displayed stored in the storage unit 1136, and reads out the data to be displayed from the storage unit 1136.

In step S1232, the display control unit 1135 uses the readout data to be displayed to generate an image to be displayed, and supplies the image to be displayed to the display unit 1137. In step S1233, the display unit 1137 causes the monitor 1112 to display the image to be displayed generated by the processing of step S1232.

Figure 43:
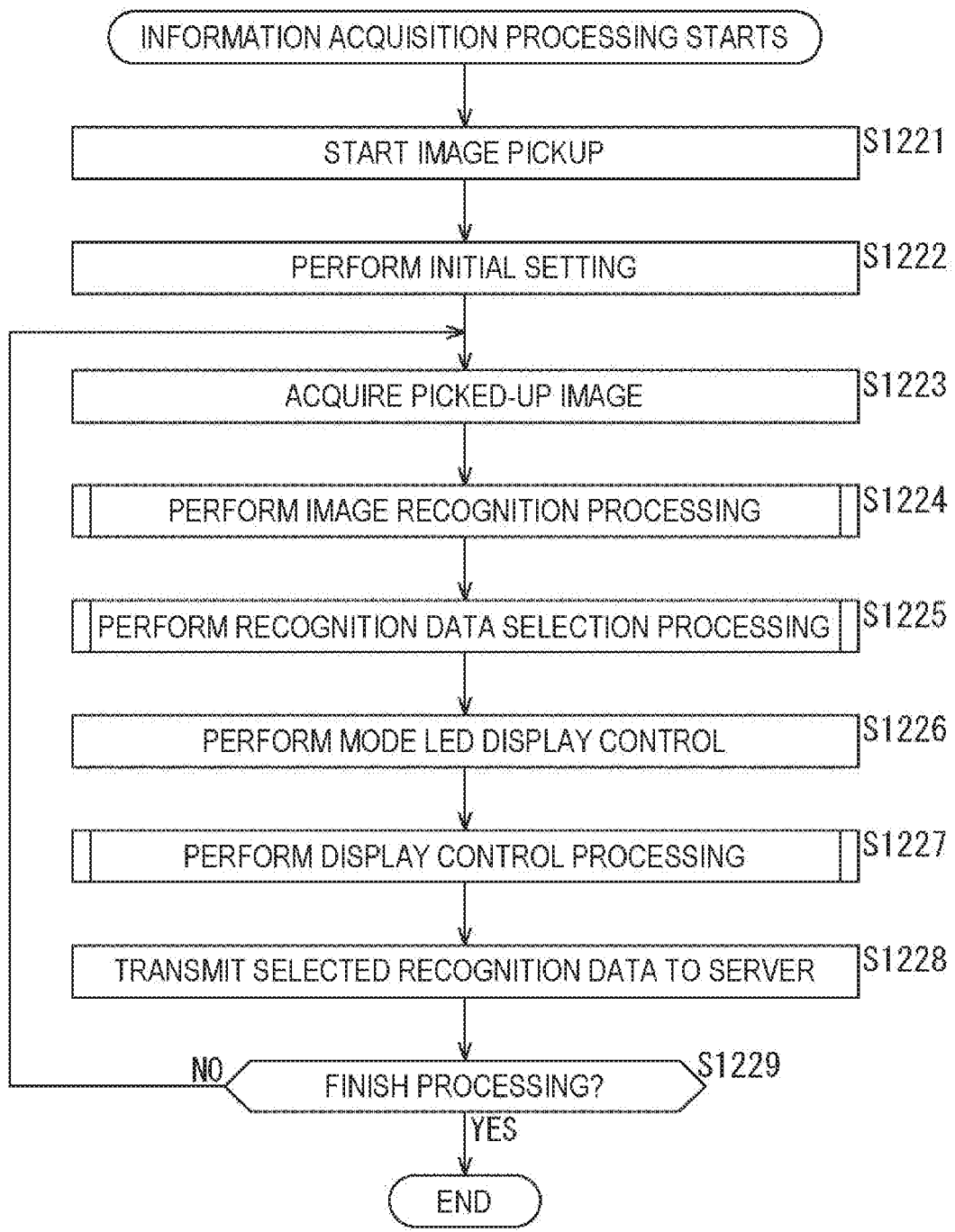
FIG. 43 is a flowchart explaining an example of a process of the information acquisition processing.
Figure 44:
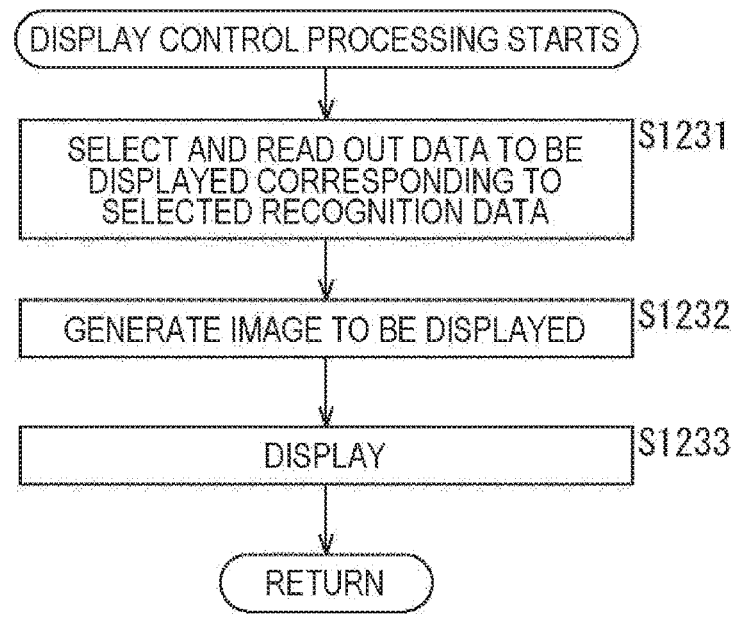
FIG. 44 is a flowchart explaining an example of a process of the display control processing.

When the processing of step S1233 is finished, the display control processing is finished, and the processing returns to FIG. 43.

<Process of Data Acquisition Processing>

Figure 45:
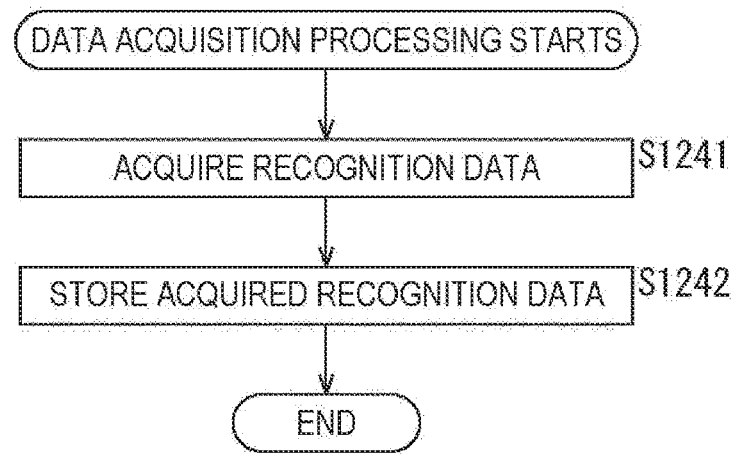
FIG. 45 is a flowchart explaining an example of a process of data acquisition processing.

With respect to the information acquisition processing as described above, the server 1103 executes data acquisition processing so as to collect recognition data supplied from the electronic shelf label 1101. An example of a process of the data acquisition processing will be described with reference to a flowchart of FIG. 45.

When the data acquisition processing is started, the CPU 1151 of the server 1103 controls, in step S1241, the communication unit 1164 to acquire recognition data supplied from the electronic shelf label 1101. In step S1242, the CPU 1151 stores the acquired recognition data in the storage unit 1163. When the recognition data is stored in the storage unit 1163, the data acquisition processing is finished.

By executing each piece of processing as described above, the electronic shelf label 1101 can easily select data to be displayed corresponding to information associated with a product or a customer recognized in a picked-up image, and display the image to be displayed. In the above manner, for example, even in a case where communication with the server 1103 is temporarily interrupted, the electronic shelf label 1101 can cause the monitor 1112 to display an image to be displayed corresponding to recognized information. That is, usability can be improved.

4. Fourth Embodiment

<Identification of Size of a Face, and the Like>

In the above description, information associated with a customer is collected. This information associated with a customer may be any information. For example, the configuration may be such that the information includes at least any one of a position of a face of a customer (how close the customer approaches a product), a time at which a face of a customer is detected (when the customer comes), and a time period in which a face of a customer is detected (how long the customer is there). That is, information showing an action of a customer which shows how much the customer shows an interest in a product may be included in information associated with a customer.

Figure 46A:
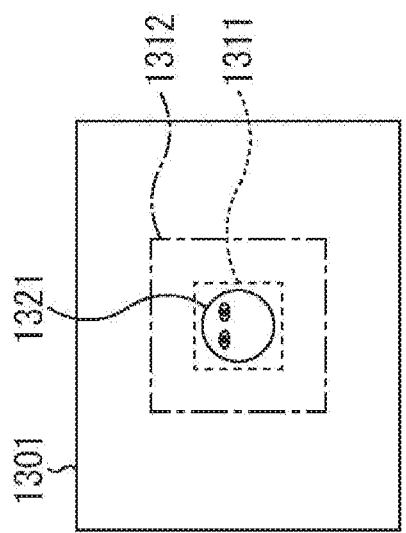
FIGS. 46A, 46B, 46C, and 46D are diagrams explaining an example of a state of identifying a face position.

For example, a position of a face of a customer may be determined on the basis of size of a detected face (that is, how close the customer approaches a product may be determined). For example, the configuration may be such that, as shown in FIG. 46A, the electronic shelf label 1101 sets frames 1311 and 1312 for an angle of view of a picked-up image 1301 (that is, an image pickup range of the camera 1111), and determines size of a face by comparing these two frames with a face image. Note that, as shown in FIG. 46A, the frame 1311 is set to be smaller than the frame 1312. Furthermore, as shown in FIG. 46A, the frames 1311 and 1312 may be set around a center of an angle of view of the picked-up image 1301 or may be movable. For example, the frames 1311 and 1312 may be set to a position corresponding to a position of a face image in the picked-up image 1301. Furthermore, size and shapes of the frames 1311 and 1312 may be changed in accordance with a situation.

Figure 46B:
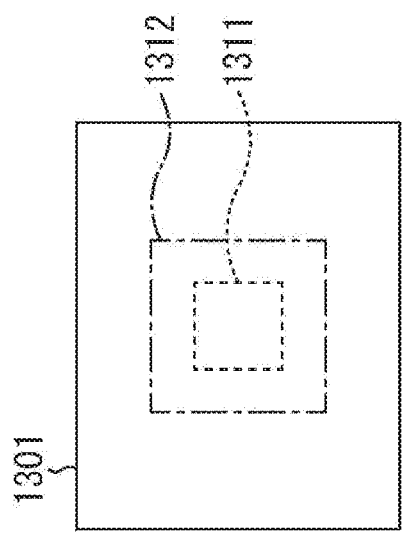
Figure 46C:
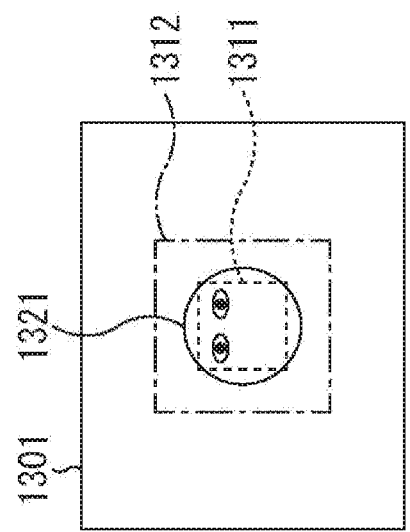
Figure 46D:
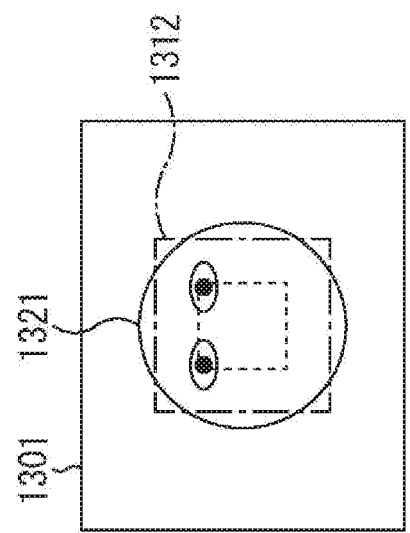

For example, as shown in FIG. 46B, when a face image 1321 is smaller than the frame 1311, the electronic shelf label 1101 determines that the customer is positioned far from a product (the electronic shelf label 1101), and estimates that an interest of the customer on the product is small. Furthermore, for example, as shown in FIG. 46C, in a case where the face image 1321 is larger than the frame 1311, and is smaller than the frame 1312, the electronic shelf label 1101 determines that the customer is positioned closer to a product (the electronic shelf label 1101) than the case of FIG. 46B, and estimates that an interest of the customer on the product is higher than that in the case of FIG. 46B. Moreover, for example, as shown in FIG. 46D, in a case where the face image 1321 is larger than the frame 1312, the electronic shelf label 1101 determines that the customer is positioned closer to a product (the electronic shelf label 1101) than in the case of FIG. 46C, and estimates that an interest of the customer on the product is higher than that in the case of FIG. 46C.

<Process of Customer Information Recognition Processing>

In this case, the customer recognition unit 1142 performs customer information recognition processing in step S1104 in FIG. 33 (step S1112 in FIG. 34 or step S1122 in FIG. 35), so as to recognize these parameters.

An example of a process of the customer information recognition processing will be described with reference to a flowchart of FIG. 47. When the customer information recognition processing is started, the customer recognition unit 1142 detects a face from a picked-up image in step S1301. In step S1302, the customer recognition unit 1142 recognizes a face detection time that is a time at which a face is detected in step S1301. That is, the customer recognition unit 1142 recognizes when a customer shows an interest in a product. In step S1303, the customer recognition unit 1142 determines and recognizes size of the face detected in step S1301 by, for example, the method described with reference to FIGS. 46A, 46B, 46C, and 46D. That is, the customer recognition unit 1142 recognizes how much a customer shows an interest. In step S1304, the customer recognition unit 1142 measures and recognizes a time period in which a face is detected in step S1301. That is, the customer recognition unit 1142 recognizes how long a customer shows an interest. Then, the customer recognition unit 1142 stores these results of the recognition of information associated with a customer.

When the processing of step S1304 is finished, the customer information recognition processing is finished, and the processing returns to FIG. 33.

By performing the customer information recognition processing as described above, the electronic shelf label 1101 can obtain a more variety of information as information associated with a customer.

5. Fifth Embodiment

<Moving Object Detection>

Furthermore, the electronic shelf label 1101 may recognize a motion (behavior) of a customer as information associated with a customer. Moreover, in such a case, a camera for detecting a motion of a customer may be provided separately from the camera 1111. For example, as shown in FIG. 48A, a camera 1341 separate from the camera 1111 may be provided in a housing of the electronic shelf label 1101. In this case, the configuration may be such that, for example, as shown in FIG. 48B, the electronic shelf label 1101 picks up an image of a face 1351 of a customer by using the camera 1111, and detects a motion of a hand 1352 of the customer who attempts to touch a product 1122-1 or a product 1122-2 placed on the shelf 1121 by using the camera 1341.

Figure 48B:
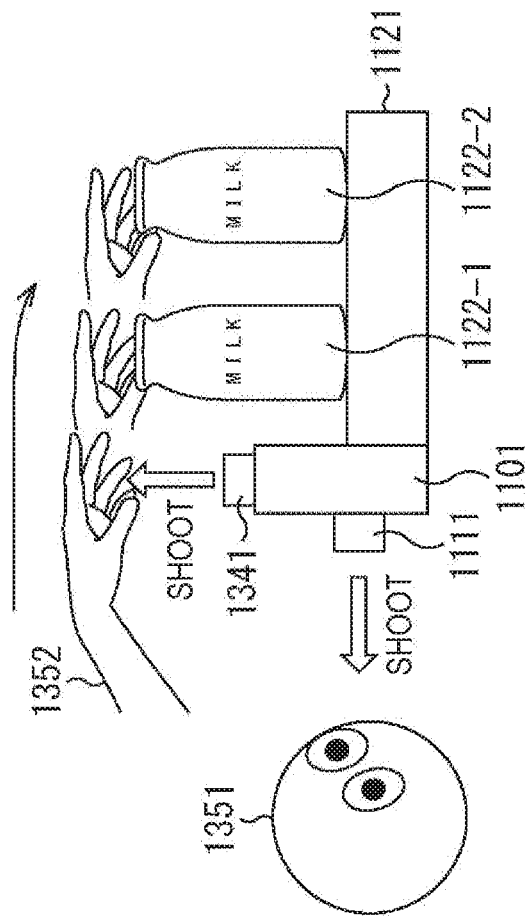
FIGS. 48A and 48B are diagrams explaining an example of a state of a moving object detection function.
Figure 48A:
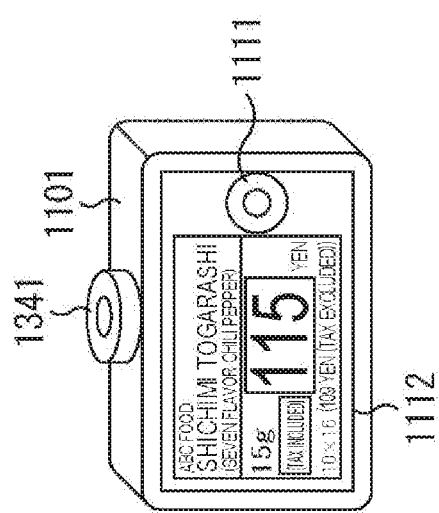

Note that, in a case of the example of FIGS. 48A and 48B, the camera 1341 is provided on a top surface (a surface facing an upper side) of a housing of the electronic shelf label 1101. A position and a shooting direction of the camera 1341 are optional. Furthermore, performance for resolution required for the camera 1341, which only needs to obtain a picked-up image from which a moving object can be detected, is lower than that required for the camera 1111. That is, the camera 1341 may use an image pickup element of a lower resolution than the camera 1111. Furthermore, in order to allow a moving object of higher speed to be detected, a frame rate of the camera 1341 may be set to be higher than that of the camera 1111.

<Configuration of the Electronic Shelf Label>

A main configuration example of the electronic shelf label 1101 in this case is shown in a block diagram of FIG. 49. As shown in FIG. 49, in this case, the electronic shelf label 1101 further has an image pickup unit 1361 and a moving object detection unit 1362 in addition to the configuration shown in FIG. 30, and has a processing control unit 1363 in place of the processing control unit 1133.

The image pickup unit 1361 is a processing unit that includes a camera 1341 and the like, and picks up an image of an object to obtain a picked-up image (image data). The image pickup unit 1361 supplies image data of an obtained picked-up image to the moving object detection unit 1362. The moving object detection unit 1362 is a processing unit that analyzes image data (a picked-up image) supplied from the image pickup unit 1361, and detects a moving object (for example, a hand of a customer, and the like) included in the picked-up image. This detection method of a moving object is optional. For example, the configuration may be such that a moving object detection is performed by comparing images between a current frame and a previous frame. Furthermore, for example, the configuration may be such that a background image (an image in an initial state) is set, and a moving object detection is performed by comparing the background image and an image of a current frame. The moving object detection unit 1362 notifies the processing control unit 1363 of a result of the detection.

The processing control unit 1363 is a processing unit that performs processing relating to selection of an operation mode on the basis of a result of recognition performed by the image recognition unit 1132 and a result of detection performed by the moving object detection unit 1362. The processing control unit 1363 supplies data corresponding to the selected operation mode to the communication unit 1134 and the display control unit 1135. For example, in a case where the "information acquisition mode" is selected, the processing control unit 1363 selects a result of recognition performed by the image recognition unit 1132 and a result of moving object detection performed by the moving object detection unit 1362 as recognition data, and supplies the recognition data to the communication unit 1134. That is, in a case of the information acquisition mode, the communication unit 1134 supplies recognition data including a result of recognition performed by the image recognition unit 1132 and a result of moving object detection (for example, whether or not a customer picks up a product, and the like) performed by the moving object detection unit 1362 to the server 1103 via the network 1102.

<Process of Customer Information Recognition Processing>

In this case, in step S1101 of the information acquisition processing of FIG. 33 (step S1221 in a case of the information acquisition processing of FIG. 43), the image pickup unit 1361 starts image pickup together with the image pickup unit 1131, and, in step S1103 (step S1223 in a case of the information acquisition processing of FIG. 43), acquires a picked-up image together with the image pickup unit 1131.

The customer recognition unit 1142 and the moving object detection unit 1362 perform customer information recognition processing in step S1104 in FIG. 33 (step S1112 in FIG. 34 or step S1122 in FIG. 35), so as to recognize information associated with a customer.

Figure 50:
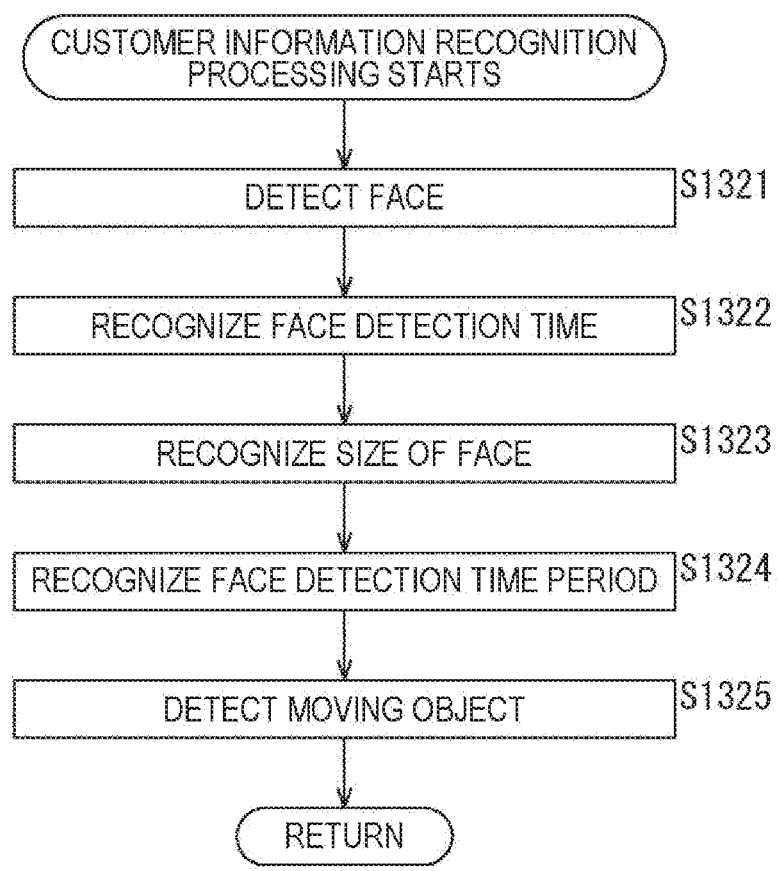
FIG. 50 is a flowchart explaining an example of a process of the customer information recognition processing.

An example of a process of the customer information recognition processing will be described with reference to a flowchart of FIG. 50. When the customer information recognition processing is started, each piece of processing from step S1321 to step S1324 is executed in a similar manner as each piece of processing from step S1301 to step S1304 in FIG. 47. In step S1325, the moving object detection unit 1362 detects a moving object from a picked-up image obtained by the image pickup unit 1361. That is, the moving object detection unit 1362 recognizes whether or not a customer picks up a product. Then, the customer recognition unit 1142 stores these results of the recognition of information associated with a customer.

When the processing of step S1325 is finished, the customer information recognition processing is finished, and the processing returns to FIG. 33. By performing the customer information recognition processing as described above, the electronic shelf label 1101 can obtain a more variety of information as information associated with a customer.

6. Sixth Embodiment

<Display Control>

The fifth embodiment is described with respect to the case where information associated with a motion (behavior) of a customer is collected as information associated with the customer. The configuration may be such that information (an image) displayed on the electronic shelf label 1101 is controlled on the basis of information associated with the motion (behavior) of a customer. For example, the configuration may be such that the server 1103 selects data to be displayed that is supplied to the electronic shelf label 1101 on the basis of information associated with a motion (behavior) of a customer supplied as recognition data. In such a case, the server 1103 preferably executes data provision processing in a similar manner as in the case described in the second embodiment, selects data to be displayed in accordance with recognition data (information associated with a motion (behavior) of a customer), and supplies the recognition data to the electronic shelf label 1101. Furthermore, for example, the configuration may be such that the electronic shelf label 1101 selects data to be displayed on the basis of information associated with a recognized motion (behavior) of a customer. In such a case, the electronic shelf label 1101 preferably executes display control processing in a similar manner as in the case described in the third embodiment, selects data to be displayed in accordance with information associated with a motion (behavior) of a customer, and displays the recognition data.

In the above manner, for example, when a customer approaches the electronic shelf label 1101 within a predetermined distance, the electronic shelf label 1101 can change a displayed content of the monitor 1112. For example, the electronic shelf label 1101 can perform display in more varieties and more effectively in accordance with a situation, in such a manner as causing the monitor 1112 to display service information that introduces a service targeted for the customer, and the like, for example.

<Attributes of a Customer>

Furthermore, for example, the configuration may be such that information (an image) to be displayed on the electronic shelf label 1101 is controlled in accordance with attributes of a customer, such as age (or age group), gender, and the like of the customer. In such a case, the customer recognition unit 1142 determines attributes of a customer included in a picked-up image, and recognizes a result of the determination as information associated with the customer. Processing other than the above may be executed in a similar manner as the cases described in the second and third embodiments.

<Process of Customer Information Recognition Processing>

Figure 51:
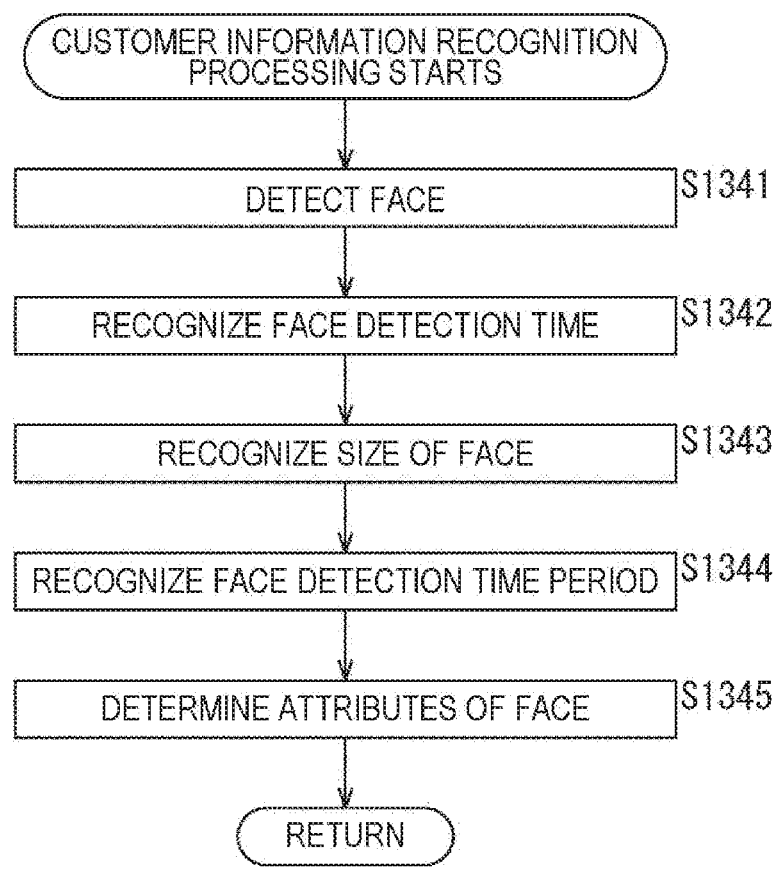
FIG. 51 is a flowchart explaining an example of a process of the customer information recognition processing.

In this case, an example of a process of the customer information recognition processing that the customer recognition unit 1142 executes in step S1104 in FIG. 33 (step S1112 in FIG. 34 or step S1122 in FIG. 35) will be described with reference to a flowchart of FIG. 51.

Figure 47:
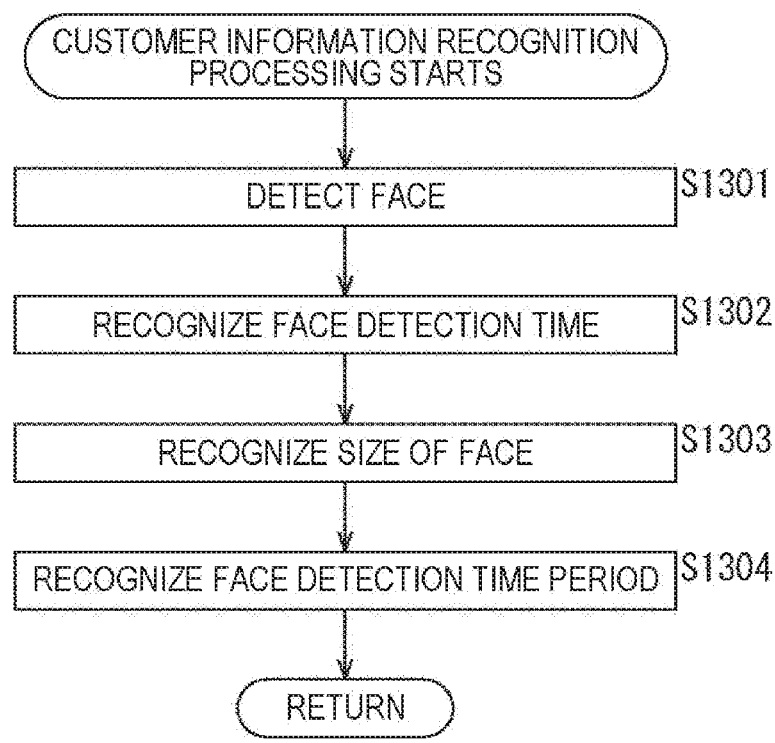
FIG. 47 is a flowchart explaining an example of a process of customer information recognition processing.

When the customer information recognition processing is started, each piece of processing from step S1341 to step S1344 is executed in a similar manner as each piece of processing from step S1301 to step S1304 in FIG. 47. In step S1345, the customer recognition unit 1142 determines attributes of a customer, such as gender, age, and the like of the customer, from a face detected in step S1341. Then, the customer recognition unit 1142 stores the result of the recognition and result of determination of information associated with a customer.

When the processing of step S1345 is finished, the customer information recognition processing is finished, and the processing returns to FIG. 33. By performing the customer information recognition processing as described above, the electronic shelf label 1101 can obtain a more variety of information as information associated with a customer. Accordingly, the electronic shelf label 1101 can control a display content in accordance with more varieties of information. That is, the electronic shelf label 1101 can display more varieties of information.

<Identification Information of a Customer>

Furthermore, for example, the configuration may be such that information (an image) to be displayed on the electronic shelf label 1101 is controlled in accordance with identification information of a customer. For example, the configuration may be such that, if a customer who approaches the electronic shelf label 1101 holds an ID card or the like in front of the camera 1111 of the electronic shelf label 1101, and causes an image of a customer-specific ID code registered in (displayed on) the card to be picked up, the electronic shelf label 1101 displays information corresponding to the customer-specific ID code (in other words, information corresponding to the customer who is the owner of the ID card). For example, the configuration may be such that, in a case where the customer is a special customer (regular customer), the monitor 1112 displays a price applied with a predetermined discount in place of a regular price of a product. Processing other than the above may be executed in a similar manner as the cases described in the second and third embodiments.

By using the above identification information, more detailed identification of a customer can be performed more precisely and more easily. Accordingly, more appropriate information can be presented to each customer. That is, display control can be performed more in detail.

<Configuration of the Image Recognition Unit>

Figure 52:
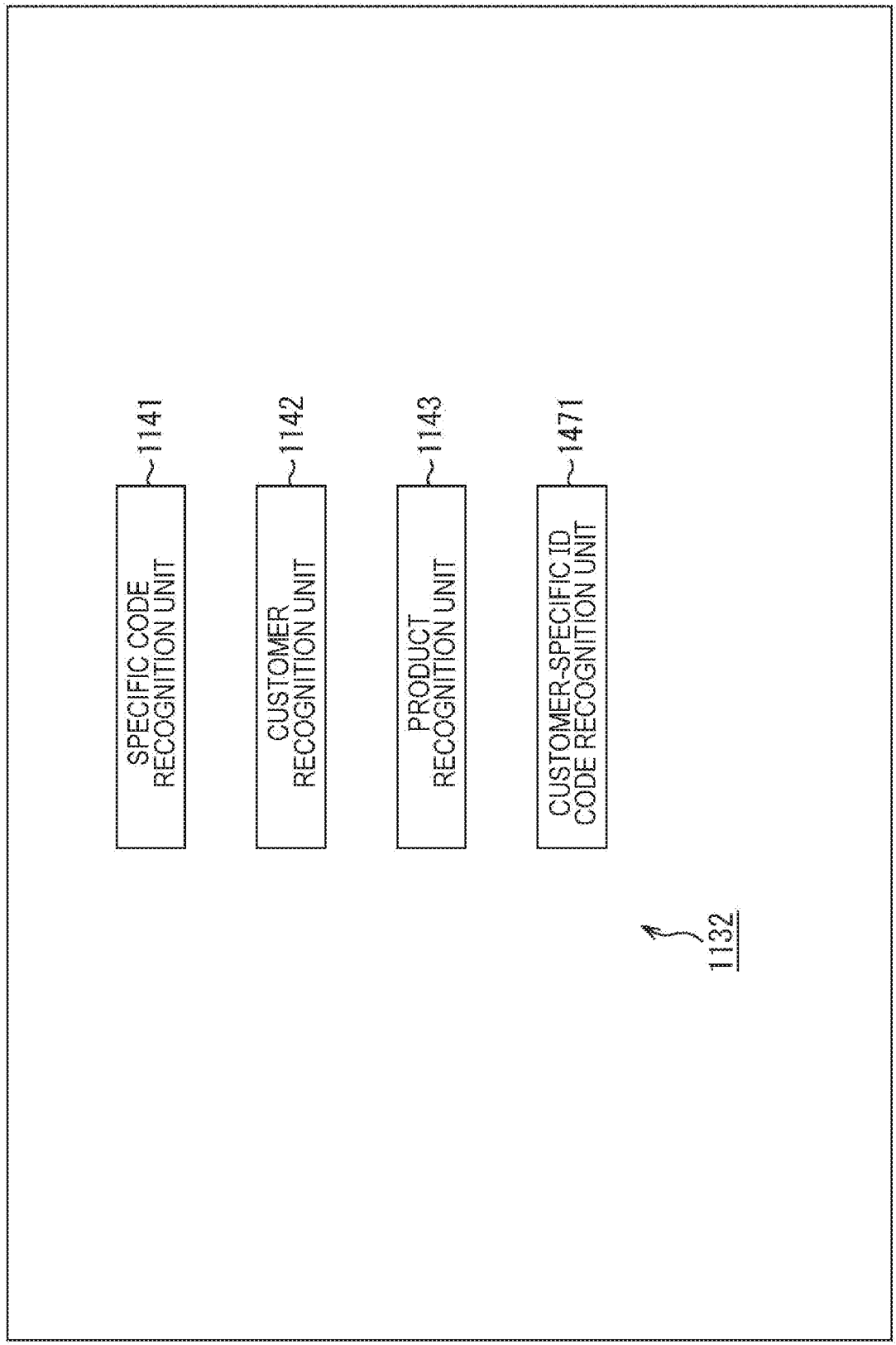
FIG. 52 is a block diagram showing a main configuration example of the image recognition unit.

A main configuration example of the image recognition unit 1132 in this case is shown in FIG. 52. In this case, the image recognition unit 1132 has a customer-specific ID code recognition unit 1471 in addition to the configuration shown in FIG. 31. The customer-specific ID code recognition unit 1471 performs processing relating to recognition of a customer-specific ID code included in a picked-up image.

<Process of Image Recognition Processing>

Figure 53:
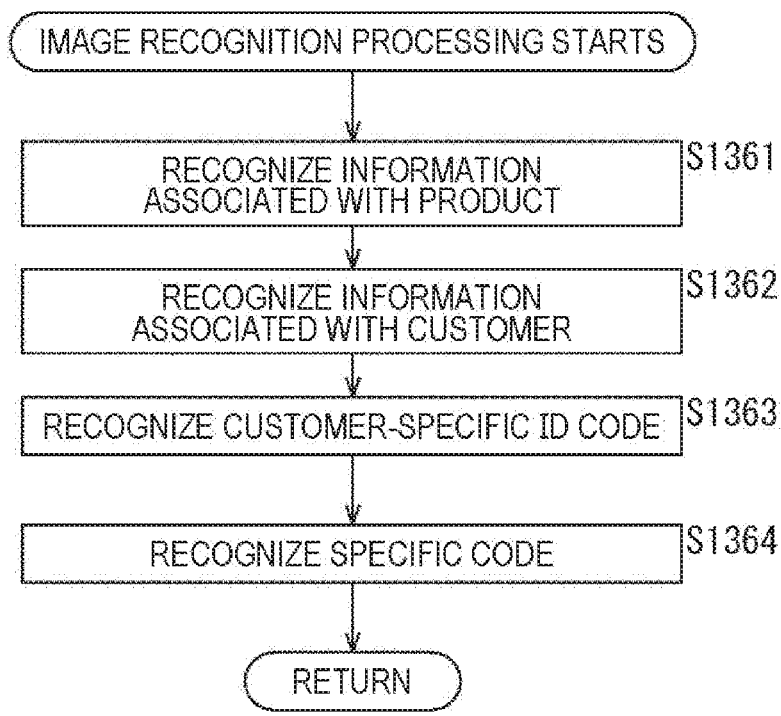
FIG. 53 is a flowchart explaining an example of a process of the image recognition processing.

An example of a process of the image recognition processing executed in step S1104 in FIG. 33 in this case will be described with reference to a flowchart of FIG. 53. In this case, when the image recognition processing is started, the product recognition unit 1143 recognizes information associated with a product in step S1361. In step S1362, the customer recognition unit 1142 recognizes information associated with a customer. In step S1363, the customer-specific ID code recognition unit 1471 recognizes a customer-specific ID code included in a picked-up image. In step S1364, the specific code recognition unit 1141 recognizes a specific code. When the processing of step S1364 is finished, the information recognition processing is finished, and the processing returns to FIG. 33.

Note that, in this case as well, processing of each step of the image recognition processing can be executed in parallel with one another as in the example of FIG. 34.

<Process of Recognition Data Selection Processing>

Figure 54:
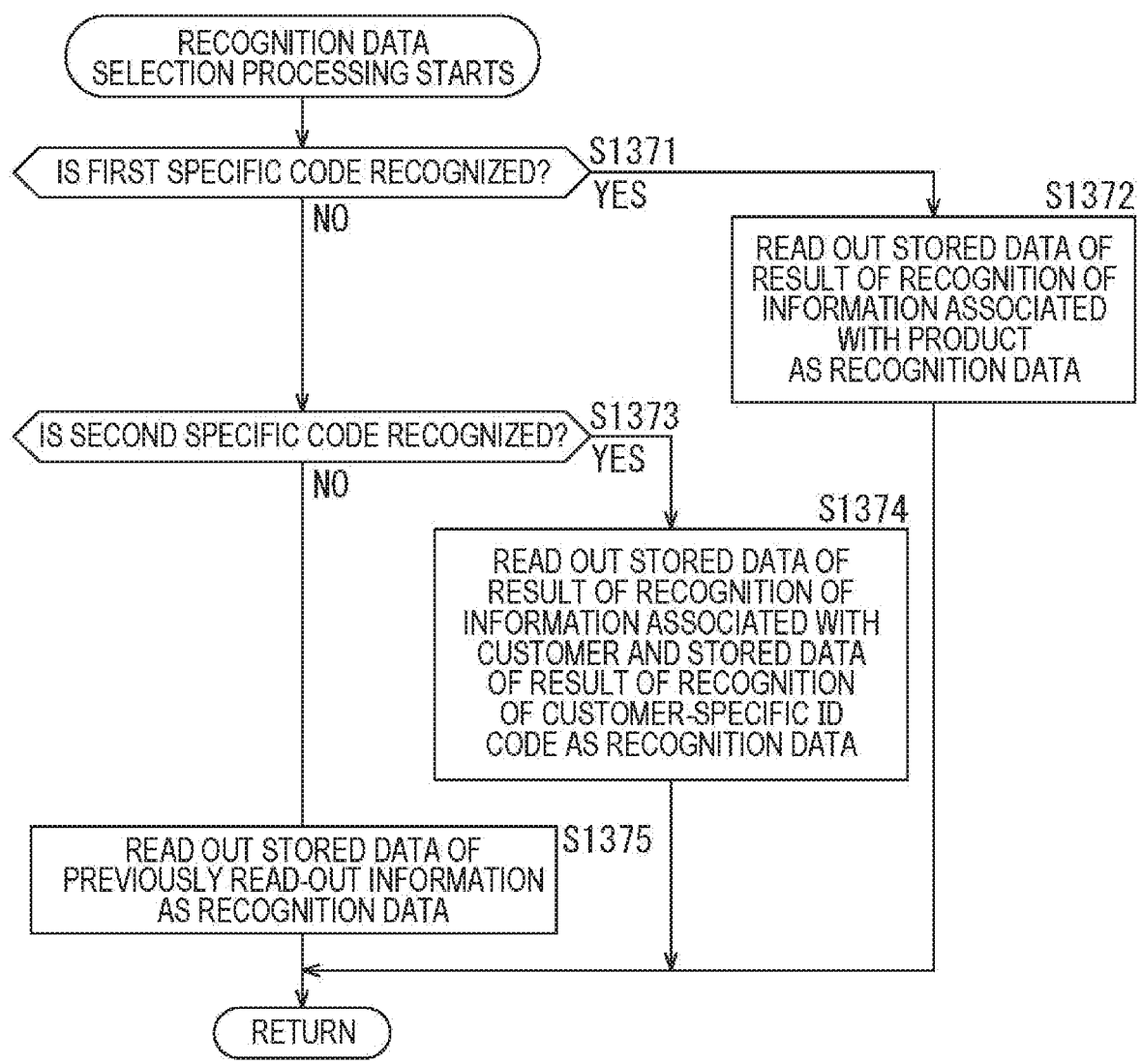
FIG. 54 is a flowchart explaining an example of a process of recognition data selection processing.

Next, an example of a process of the recognition data selection processing executed in step S1105 in FIG. 33 will be described with reference to a flowchart of FIG. 54. In this case, when the recognition data selection processing is started, each piece of processing from step S1371 to step S1373 is executed in a similar manner as each piece of processing from step S1131 to step S1133 in FIG. 36.

If the second specific code is recognized, in step S1374, the processing control unit 1133 sets an operation mode to the information acquisition mode, and reads out stored data of a result of recognition of information associated with a customer and stored data of a result of recognition of a customer-specific ID code as recognition data from the customer recognition unit 1142. The readout result of recognition of information associated with a customer is transmitted as recognition data to the server 1103 in step S1107 in FIG. 33. Furthermore, in this case, in step S1106 in FIG. 33, display of the mode identification LED 1113 is set to display showing the information acquisition mode. When the processing of step S1374 is finished, the recognition data selection processing is finished, and the processing returns to FIG. 33.

Figure 36:
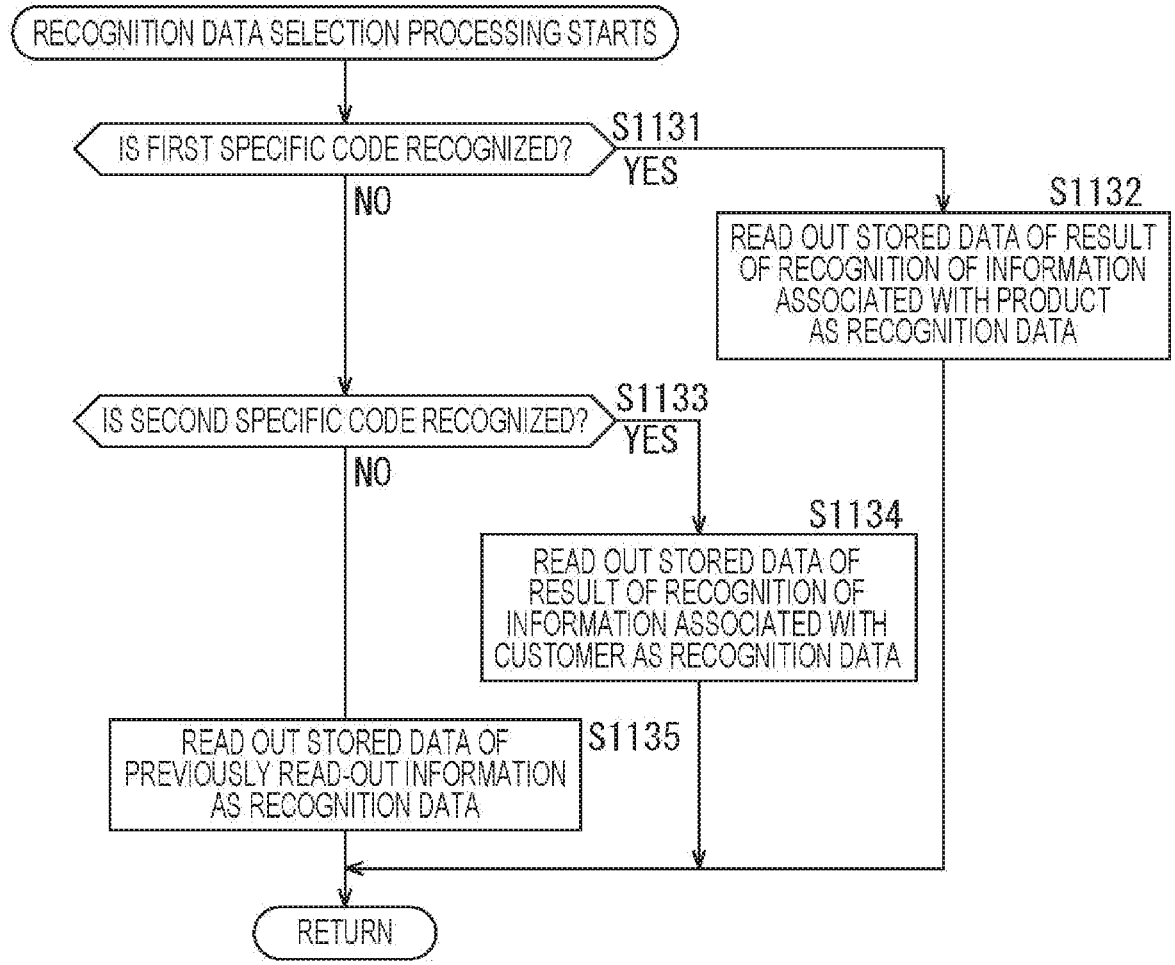
FIG. 36 is a flowchart explaining an example of a process of image data selection processing.

Note that processing of step S1375 is executed in a similar manner as the processing of step S1135 in FIG. 36.

By performing the recognition data selection processing as described above, the electronic shelf label 1101 can supply a result of recognition of a customer-specific ID code as recognition data to the server 1103. Note that the server 1103 can perform processing in a similar manner as in the case of the second embodiment to select data to be displayed corresponding to the recognition data, and supply the data to be displayed to the electronic shelf label 1101. Accordingly, the electronic shelf label 1101 can present more appropriate information to each customer.

Note that, in FIGS. 55A, 55B, 55C, and 55D, the recognition data selection processing is described to be performed by a method similar to that in the case of FIG. 36. However, a process of the recognition data setting processing is not limited to this example. For example, the recognition data setting processing may be performed in a process similar to that in the cases of the flowcharts of FIGS. 37 and 38.

7. Seventh Embodiment

<Mobilization of a Camera>

A shooting direction (angle of view) of the camera 1111 provided on the electronic shelf label 1101 may be fixed, or may be movable. For example, the configuration may be such that the camera 1111 is provided movably on a housing of the electronic shelf label 1101, and a shooting direction (angle of view) of the camera 1111 is changeable.

Figure 55A:
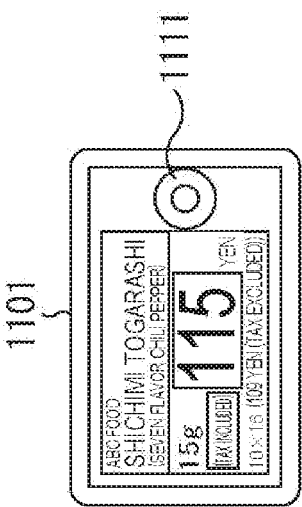
FIGS. 55A, 55B, 55C, and 55D is an are external views showing a main configuration example of the electronic shelf label.
Figure 55B:
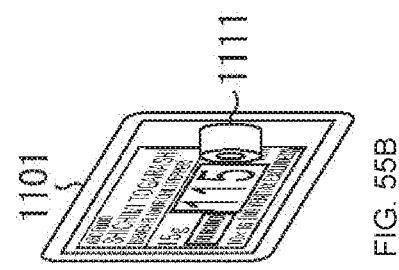
Figure 55C:
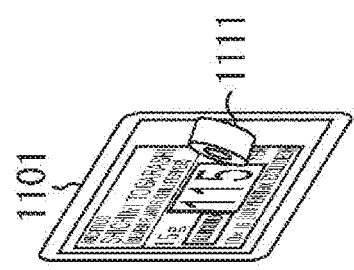
Figure 55D:
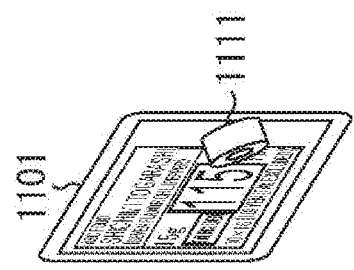

For example, as shown in FIG. 55A, the camera 1111 is installed on a front surface (surface on a customer side) of a housing of the electronic shelf label 1101 to pick up an image of the front surface of the electronic shelf label 1101. The configuration may be such that a direction of the camera 1111 is made movable, and, for example, the camera 1111 can be directed to the front surface of the housing (in a horizontal direction) as in FIG. 55B, directed somewhat upward as in FIG. 55C, or directed somewhat downward as in FIG. 55D.

Figure 56B:
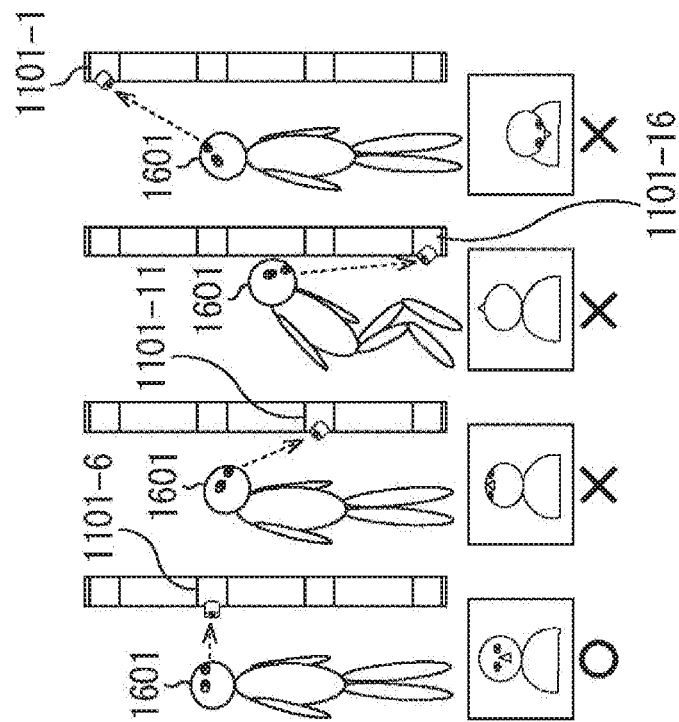
FIGS. 56A and 56B are diagrams explaining an example of a state of picking up an image of a customer.

As has been described with reference to FIG. 29, the electronic shelf label 1101 is installed on the product shelf 1120. In general, a plurality of the shelves 1121 on which a product is arranged are provided on the product shelf 1120. That is, the shelves 1121 are provided in a high location and a low location. The electronic shelf label 1101, which is installed on the shelf 1121 described above, is also installed in a high location and a low location other than around a level of an eyesight of a customer 1601, as shown, for example, in FIG. 56A. Accordingly, when a direction of the camera 1111 is fixed on the electronic shelf label 1101, there is possibility that the cameras 1111 of an electronic shelf label 1101-1 installed at a high position, electronic shelf labels 1101-11 and 1101-16 installed at low positions, and the like cannot pick up an image of a face of the customer 1601 from the front as shown in FIG. 56B. Furthermore, in some cases, there is possibility that, even if the customer 1601 approaches the electronic shelf label 1101, a face of the customer 1601 is not positioned within a shooting range. Therefore, there has been possibility that accuracy of recognizing a face of the customer 1601 is lowered. In view of the above, by making a direction of the camera 1111 movable, an image of a face of the customer 1601 who approaches the electronic shelf label 1101 and looks at the electronic shelf label 1101 can be picked up from the front, regardless of an installation location of the electronic shelf label 1101.

Figure 56A:
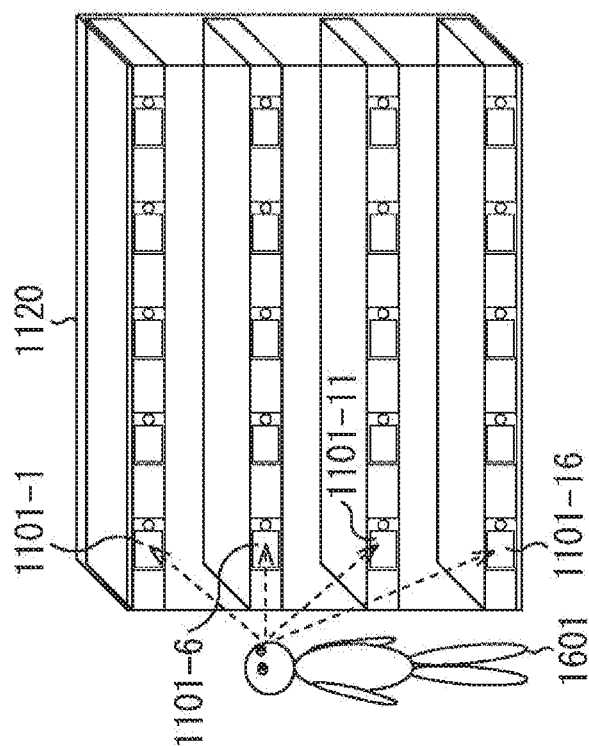

For example, in a case of the example of FIGS. 56A and 56B, the configuration may be such that, when each of the electronic shelf label 1101 is installed, a direction of the camera 1111 is adjusted in accordance with a level of the installation, so that the camera 1111 is directed to a position of a face of the customer 1601 at a general level.

Note that direction control of the camera 1111 may be performed manually, or by providing a control mechanism that controls a direction of the camera 1111 in the electronic shelf label 1101. For example, the configuration may be such that an image of the customer 1601 is picked up by moving a direction of the camera 1111 within an entire movable range so that a face of the customer 1601 is recognized, a range in which the face of the customer 1601 can be recognized is found, and a direction of the camera 1111 is matched with a predetermined direction within the range.

Figures 57A, 57B, 57C, 57D:
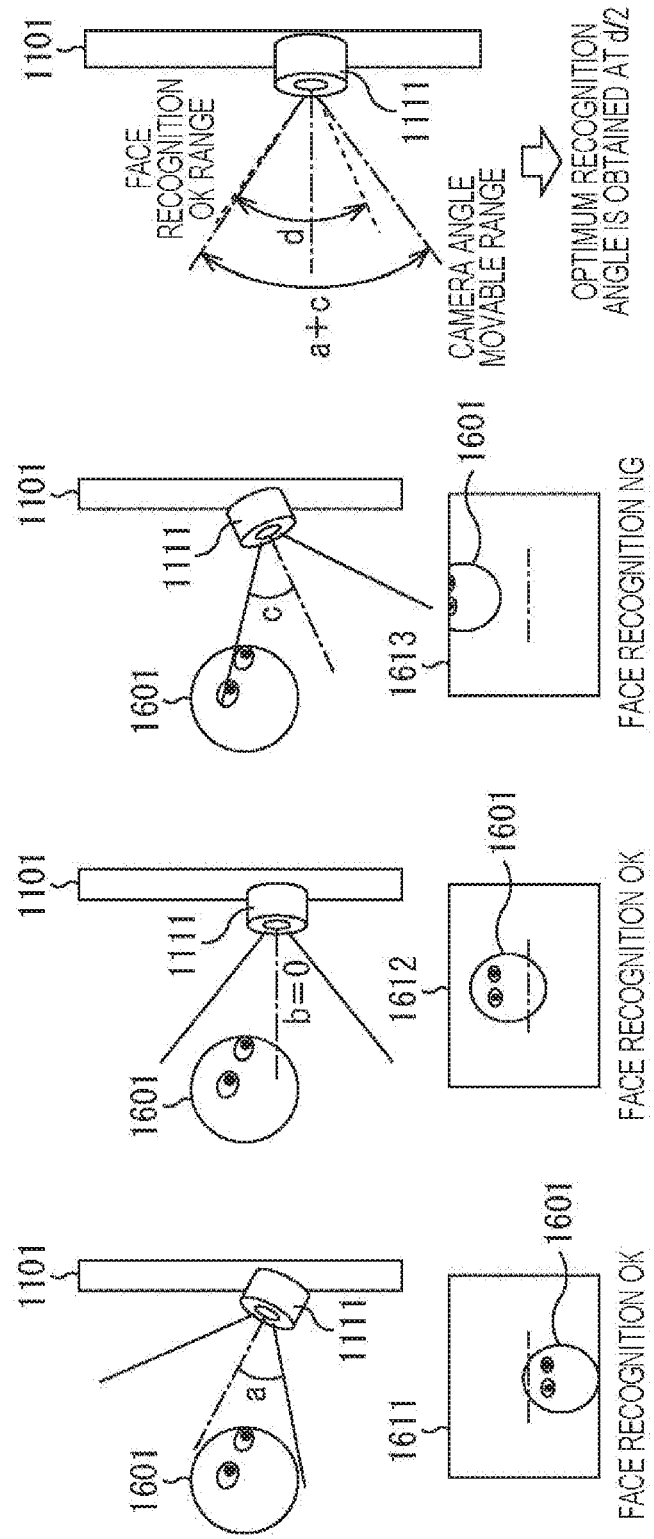
FIGS. 57A, 57B, 57C, and 57D are diagrams explaining an example of face recognition within a movable range of a camera.

For example, as shown in FIG. 57A, the control mechanism first directs the camera 1111 most upwardly. Next, as shown in FIGS. 57B and 57C, the control mechanism moves the direction of the camera 1111 in a downward direction from there, and, as shown in FIG. 57D, a range d in which face recognition with respect to a camera angle movable range (a+c) is successful is found. Then, the control mechanism sets a direction (d/2) of a center of the range d to an angle at which a face of a customer is most easily recognized (optimum recognition angle), and directs the camera 1111 to the direction.

In the above manner, a direction of the camera 1111 can be set to a more appropriate direction more easily, and accuracy of recognition of a customer (face) can be improved.

Note that a movable direction of the camera 1111 is optional. For example, the camera 1111 may be movable only in a vertical direction, or may be movable in left and right directions and an oblique direction.

8. Eighth Embodiment

<Power Supply Control>

For example, in a state in which there is nobody in the vicinity of a product (the electronic shelf label 1101), in other words, in a state where the electronic shelf label 1101 does not recognize a customer, a product, or the like, the electronic shelf label 1101 cannot collect information or set (update) information to be displayed. Accordingly, in such a case, the configuration may be such that part of functions is stopped, and power supply to a processing unit of that part is stopped. In this manner, increase in power consumption can be restricted. For example, in a case where a power supply of the electronic shelf label 1101 is a battery, a driving time period of the electronic shelf label 1101 can be increased by performing power supply control as described above.

<Configuration of the Electronic Shelf Label>

Figure 58:
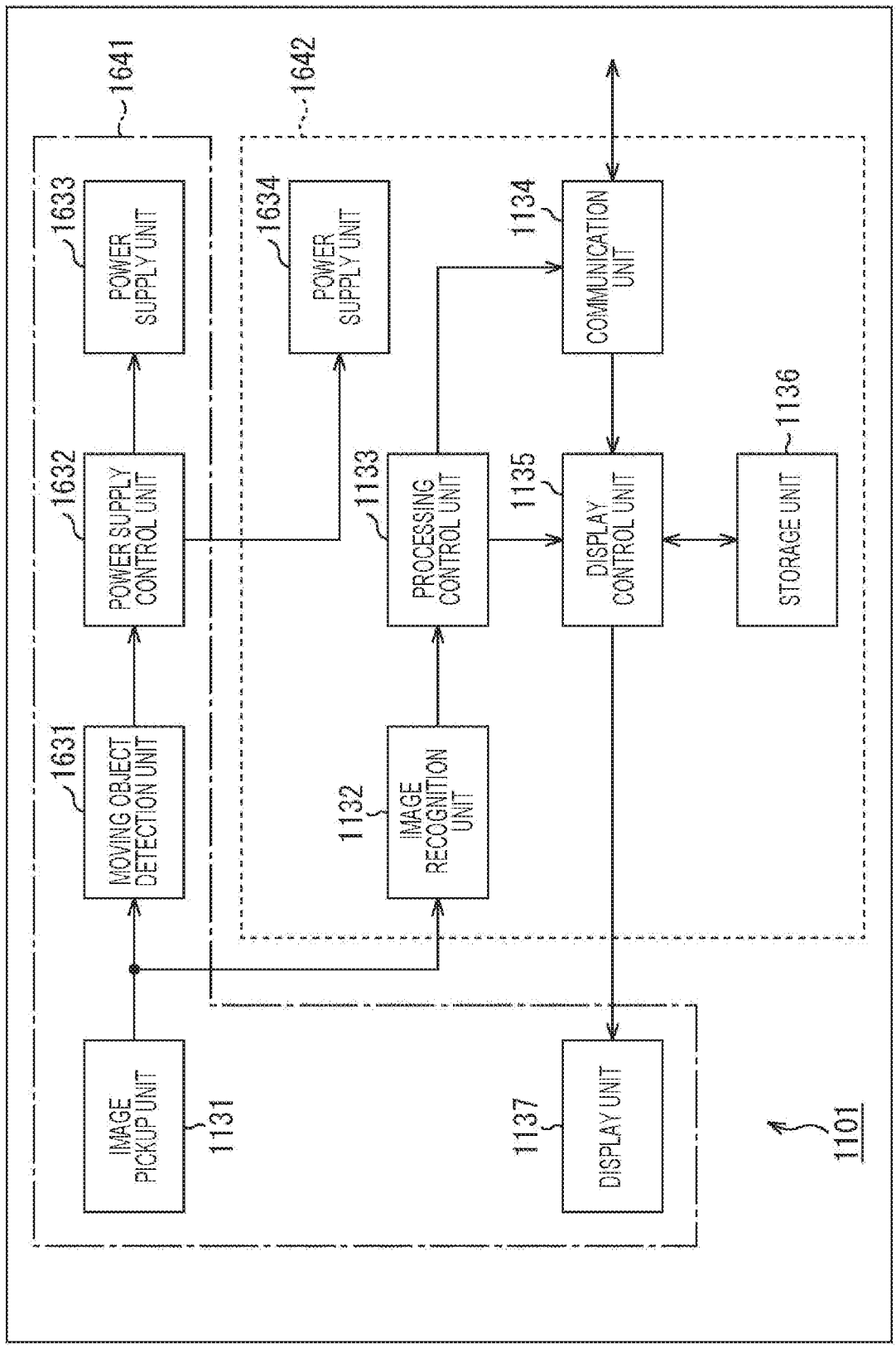
FIG. 58 is a block diagram showing a main configuration example of the electronic shelf label.

A main configuration example of the electronic shelf label 1101 in this case is shown in FIG. 58. As shown in FIG. 58, in this case, the electronic shelf label 1101 has a moving object detection unit 1631, a power supply control unit 1632, a power supply unit 1633, and a power supply unit 1634, in addition to the configuration of FIG. 30.

The moving object detection unit 1631 detects a moving object in a picked-up image obtained by the image pickup unit 1131. A method of the moving object detection is optional, and may be, for example, a method similar to that of the moving object detection unit 1362 in FIG. 49. The moving object detection unit 1631 supplies a result of the detection to the power supply control unit 1632.

The power supply control unit 1632 controls the power supply unit 1633 and the power supply unit 1634 on the basis of a result of the moving object detection performed by the moving object detection unit 1631. The power supply unit 1633 supplies power necessary for driving to each processing unit (for example, the image pickup unit 1131, the moving object detection unit 1631, the power supply control unit 1632, and the display unit 1137) enclosed by an alternate long and short dash line 1641. The power supply unit 1634 supplies power necessary for driving to each processing unit (for example, the image recognition unit 1132, the processing control unit 1133, the communication unit 1134, the display control unit 1135, and the storage unit 1136) enclosed by a dotted line 1642.

For example, in a case where a moving object is not detected by the moving object detection unit 1631 (for example, for a predetermined period), the power supply control unit 1632 stops power supply from the power supply unit 1634. That is, power supply to the image recognition unit 1132 to the storage unit 1136 is stopped, and processing performed by these processing units is stopped. Further-more, for example, in a case where a moving object is detected by the moving object detection unit 1631, the power supply control unit 1632 starts power supply from the power supply unit 1634. That is, power supply to the image recognition unit 1132 to the storage unit 1136 is started, and processing performed by these processing units is started.

That is, in a state where a moving object is not detected, power is supplied only to the image pickup unit 1131, the moving object detection unit 1631, the power supply control unit 1632, and the display unit 1137, and only image pickup of an object, detection of a moving object, display of an image, and power supply control are performed. In this manner, execution of unnecessary processing is restricted, and increase in power consumption can be restricted.

Note that, in a state where a moving object is not detected, a processing unit to which power supply is stopped is optional, and is not limited to the example of FIG. 58. For example, the configuration may be such that only power supply to the image recognition unit 1132 is stopped. Furthermore, the configuration may be such that power supply to the display unit 1137 is stopped, so that image display is stopped.

Furthermore, if power supply to each processing unit is stopped in a case where a moving object is not detected, the configuration may be such that the power supply is stopped completely, or a small amount of power supply is continued (a supply amount is reduced). For example, power supply that is necessary for a processing unit to hold data may be continued. Furthermore, for example, in a case where power supply to the display unit 1137 is stopped, the configuration may be such that display of the monitor 1112 is entirely erased, or only brightness of display of the monitor 1112 is reduced.

<Linkage of Power Control>

Furthermore, the above power supply control may be linked with the other electronic shelf labels 1101. That is, the configuration may be such that, on the basis of a result of moving object detection performed by certain one of the electronic shelf label 1101, power supply to the other electronic shelf labels 1101 is controlled. Note that a method of this linkage is optional.

For example, if a customer 1651 moves from the left in the diagram to the right in front of the product shelf 1120 as shown on an upper side of FIGS. 59A 59B, 59C, and 59D, the electronic shelf label 1101 in a column in the vicinity of the customer 1651 as a moving object (the electronic shelf label 1101 enclosed by a solid line in the diagram) detects a motion of the customer 1651 as shown on a lower side of of FIGS. 59A, 59B, 59C, and 59D. Then, the power supply unit 1634 is turned on not only for the electronic shelf label 1101, but also for the electronic shelf label 1101 (the electronic shelf label 1101 enclosed by a dotted line in the diagram) in a column on the right (one column ahead in a moving direction of the moving object (the customer 1651)). Then, the power supply unit 1634 of the electronic shelf label 1101 in a column by which the customer 1651 passes is turned off.

As shown in FIG. 59D, when the customer 1651 reaches a right end of the product shelf 1120, the electronic shelf label 1101 in a column of the right end (the electronic shelf label 1101 enclosed by a solid line in the diagram) detects a motion of the customer 1651, and the power supply unit 1634 of the electronic shelf label 1101 (the electronic shelf label 1101 enclosed by a dotted line in the diagram) is turned on.

As shown in FIG. 59E, when the customer 1651 changes a moving direction to a left direction from the right direction in the diagram, the electronic shelf label 1101 in a column in the vicinity of the customer 1651 as a moving object (the electronic shelf label 1101 enclosed by a solid line in the diagram) detects a motion of the customer 1651, and the power supply unit 1634 is turned on not only for the electronic shelf label 1101, but also for the electronic shelf label 1101 (the electronic shelf label 1101 enclosed by a dotted line in the diagram) in one column left of the electronic shelf label 1101 (one column ahead in the moving direction of a moving object (the customer 1651)). Then, the power supply unit 1634 of the electronic shelf label 1101 in a column by which the customer 1651 passes is turned off.

By controlling power supply in the above manner, increase in power consumption can be restricted.

<Process of Power Supply Control Processing>

Figure 60:
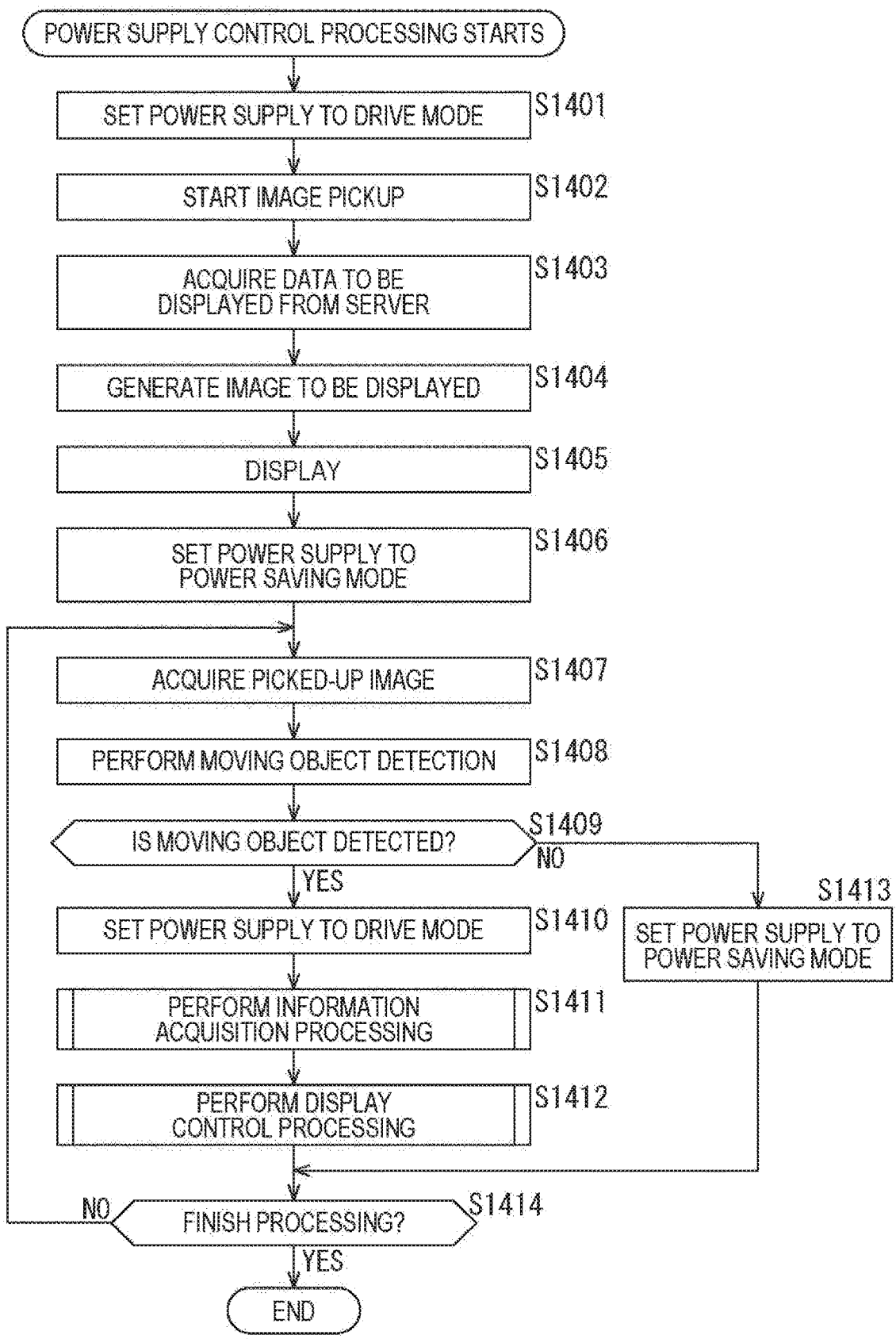
FIG. 60 is a flowchart explaining an example of a process of the power supply control processing.

The electronic shelf label 1101 executes power supply control processing to perform the above power supply control. An example of a process of the power supply control processing will be described with reference to a flowchart of FIG. 60.

If the power supply control processing is started, the power supply control unit 1632 sets a power supply to a drive mode in step S1401, and turns on the power supply unit 1633 and the power supply unit 1634. That is, the power supply unit 1633 and the power supply unit 1634 are caused to supply power to all processing units.

In step S1402, the image pickup unit 1131 starts image pickup. In step S1403, the communication unit 1134 acquires data to be displayed from the server 1103. In step S1404, the display control unit 1135 uses the data to be displayed to generate an image to be displayed. In step S1405, the display unit 1137 causes the monitor 1112 to display the image to be displayed.

In step S1406, the power supply control unit 1632 sets a power supply to a power saving mode, keeps the power supply unit 1633 turned on, and turns off the power supply unit 1634. That is, the power supply control unit 1632 stops power supply (power supply to the image recognition unit 1132 to the storage unit 1136) by the power supply unit 1634.

In step S1407, the image pickup unit 1131 acquires a picked-up image. In step S1408, the moving object detection unit 1631 performs moving object detection by using the obtained picked-up image. In step S1409, the power supply control unit 1632 determines whether or not a moving object is detected by the processing of step S1408. In a case where a moving object is determined to be detected, the processing proceeds to step S1410.

In step S1410, the power supply control unit 1632 sets a power supply to a drive mode, and turns on the power supply unit 1633 and the power supply unit 1634. That is, the power supply unit 1633 and the power supply unit 1634 are caused to supply power to all processing units.

In step S1411, each processing unit of the electronic shelf label 1101 executes information acquisition processing. The information acquisition processing, which is similar to that in the case described in the second embodiment (FIG. 33), will be omitted from description. In step S1412, each processing unit of the electronic shelf label 1101 executes display control processing. The display control processing, which is similar to that in the case described in the second embodiment (FIG. 40), will be omitted from description.

When the display control processing is finished, the processing proceeds to step S1414. Furthermore, in step S1409, in a case where a moving object is determined not to be detected (for a predetermined period), the processing proceeds to step S1413. In step S1413, the power supply control unit 1632 sets a power supply to a power saving mode, keeps the power supply unit 1633 turned on, and turns off the power supply unit 1634. That is, the power supply control unit 1632 stops power supply (power supply to the image recognition unit 1132 to the storage unit 1136) by the power supply unit 1634. When a power supply is set to a power saving mode, the processing proceeds to step S1414.

In step S1414, the electronic shelf label 1101 determines whether or not to finish the power supply control processing. In a case where the processing is determined not to be finished, the processing returns to step S1407, and the processing of step S1407 and subsequent steps is executed. Furthermore, in a case where the power supply control processing is determined to be finished in step S1414, the power supply control processing is finished.

By executing the power supply control processing in the above manner, the electronic shelf label 1101 can restrict increase in power consumption.

9. Ninth Embodiment

<Control of Face Direction Detection Processing>

Note that, in a case where a plurality of customers are included in a picked-up image, a direction of a face needs to be detected for each customer. That is, the larger the number of customers included in a picked-up image, the larger a load of detecting a direction of a face increases. Therefore, the electronic shelf label 1101 may control face direction detection processing in accordance with the number of customers included in a picked-up image in such a manner as reducing a load.

For example, the configuration may be such that, in a case where the number of customers is large, a clock frequency for face direction detection is increased, or a frequency of face direction detection is reduced.

<Process of Information Acquisition Processing>

Figure 61:
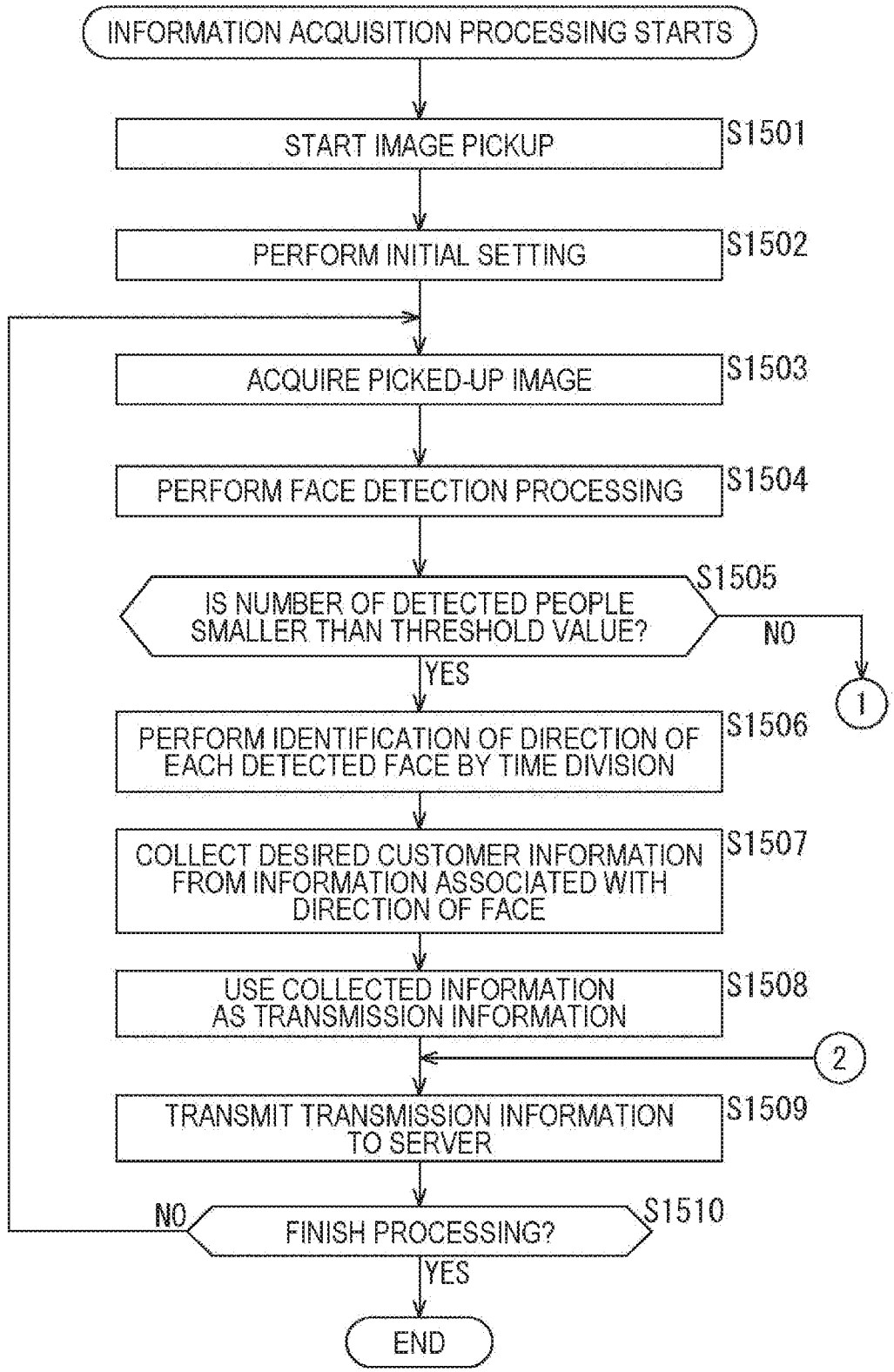
FIG. 61 is a flowchart explaining an example of a process of the information acquisition processing.

An example of a process of the information acquisition processing in this case will be described with reference to flowcharts of FIGS. 61 and 62.

When the information acquisition processing is started, the image pickup unit 1131 starts image pickup in step S1501. In step S1502, each processing unit of the electronic shelf label 1101 performs initial setting. In step S1503, the image pickup unit 1131 picks up an image of an object by using the camera 1111 to obtain a picked-up image.

In step S1504, the customer recognition unit 1142 performs face detection processing. In step S1505, the customer recognition unit 1142 determines whether or not the number of detected people is smaller than a predetermined threshold value set in advance. In a case where the number is determined to be smaller than the threshold value, the processing proceeds to step S1506.

In step S1506, the customer recognition unit 1142 detects a direction of each detected face by time division. Furthermore, the customer recognition unit 1142 similarly performs identification of a detected direction of each face (which product a customer faces, in other words, which product a customer looks at) by time division.

In step S1507, the customer recognition unit 1142 uses obtained information associated with a direction of a face and the like to collect desired customer information. In step S1508, the processing control unit 1133 uses the obtained collection information as transmission information.

In step S1509, the communication unit 1134 transmits the transmission information to the server 1103.

In step S1510, the electronic shelf label 1101 determines whether or not to finish the information acquisition processing. In a case where the processing is determined not to be finished, the processing returns to step S1503, and the processing of step S1503 and subsequent steps is executed. Furthermore, when the electronic shelf label 1101 determines to finish the information acquisition processing in step S1510, the information acquisition processing is finished.

Figure 62:
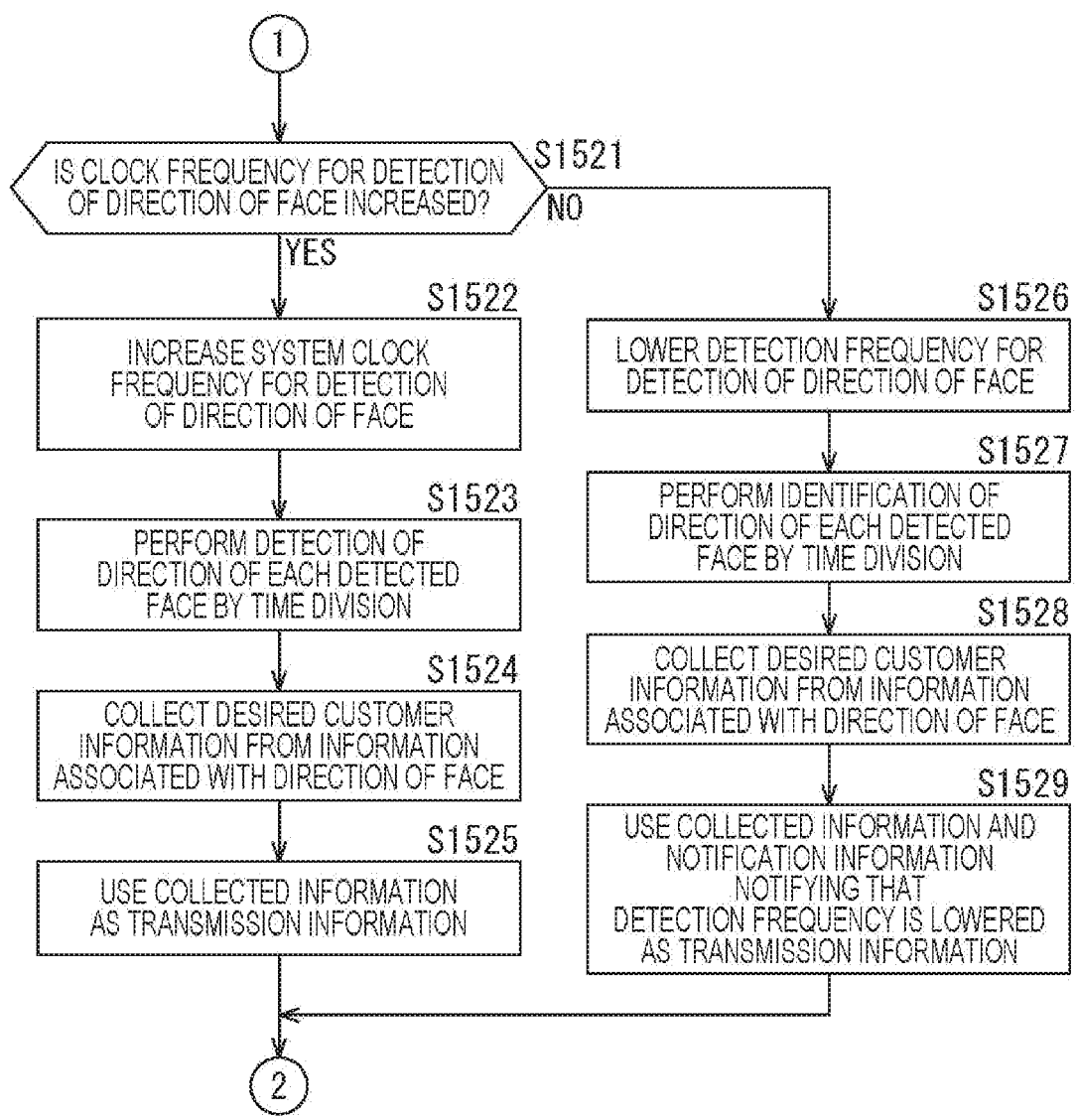
FIG. 62 is a flowchart continuing FIGS. 48A and 48B explaining an example of a process of the information acquisition processing.

Note that, in step S1505, in a case where the number of detected people is determined to be larger than or equal to the threshold value, the processing proceeds to step S1521 in FIG. 62.

In step S1521, the customer recognition unit 1142 determines whether or not to increase a clock frequency for detection of a direction of a face. In a case where a clock frequency is determined to be increased, the processing proceeds to step S1522.

In step S1522, the customer recognition unit 1142 increases a system clock frequency for face direction detection, so as to allow detection of a direction of a face to be performed at higher speed. That is, directions of faces of more customers can be detected.

In step S1523, the customer recognition unit 1142 uses a system clock at an increased frequency to detect a direction of each face by time division. Furthermore, the customer recognition unit 1142 similarly identifies a direction of each face by time division.

In step S1524, the customer recognition unit 1142 uses obtained information associated with a direction of a face and the like to collect desired customer information. In step S1525, the processing control unit 1133 uses the obtained collection information as transmission information. When the processing of step S1525 is finished, the processing returns to step S1509 in FIG. 61.

Furthermore, in step S1521 in FIG. 62, in a case where a clock frequency for detection of a direction of a face is determined not to be increased, the processing proceeds to step S1526. In step S1526, the customer recognition unit 1142 lowers a detection frequency for detection of a direction of a face. For example, operation is changed from (1) operation of picking up an image of a customer every 1/30 seconds, identifying directions of all faces whose images have been picked up within 1/30 seconds, and outputting all of the identified directions of the faces every 1/30 seconds, to (2) operation of picking up an image of a customer every 2 seconds, identifying directions of all faces whose images have been picked up within 2 seconds, and outputting all of the identified directions of the faces every 2 seconds. In this manner, a time period that can be applied to processing of identifying a direction of a face after picking up an image of a customer becomes longer. Accordingly, directions of faces of more customers can be detected.

In step S1527, the customer recognition unit 1142 detects a direction of each face by time division. Furthermore, the customer recognition unit 1142 similarly identifies a direction of each face by time division.

In step S1528, the customer recognition unit 1142 uses obtained information associated with a direction of a face and the like to collect desired customer information. In step S1529, the processing control unit 1133 uses the obtained collection information and notification information notifying that a detection frequency has been lowered as transmission information. When the processing of step S1529 is finished, the processing returns to step S1509 in FIG. 61.

By performing the information acquisition processing as described above, detection of a direction of a face can be controlled in accordance with the detected number of customers, and a failure of detection of a direction of a face can be restricted.

Note that the configuration may be such that the electronic shelf label 1101 has a plurality of the customer recognition units 1142, so that detection of directions of a plurality of faces and identification of directions of the faces can be executed in parallel. Even in such a case, if the number of detected customers is increased, there is possibility that detection of a direction of a face fails. In view of the above, in this case as well, a failure of detection of a direction of a face can be restricted by performing the information acquisition processing as shown in FIGS. 61 and 62.

10. Tenth Embodiment

<Product>

In the above description, the electronic shelf label 1101 is described to display information associated with a product. This "product" may be any product. For example, this "product" may be tangible, may be intangible like electronic information, or may be a service. Furthermore, a provision form of this "product" is optional, and may be selling, transferring, lending, exhibiting, or copying. Furthermore, these acts may be for a fee or free of charge. In a case where these acts are for a fee, charging processing may be performed. Furthermore, a consideration may be paid not only by cash, but also by using a credit card, and the like. Furthermore, dedicated or generally-used points may also be used. Moreover, points may be provided by using the present electronic shelf label system.

<Other Systems>

The present technology is not limited to the electronic shelf label system described above, and can be applied, for example, to systems used for an optional purpose in an optional field, such as traffic, medical treatment, crime prevention, agriculture, livestock industry, mining industry, beauty, factories, home appliances, weather, natural surveillance, and the like, as long as the system controls display of information on the basis of a picked-up image.

<Computer>

A series of pieces of processing described above can be executed by hardware, or by software. In a case where a series of pieces of processing is executed by software, a configuration as a computer that allows the software to be executed is preferably included. This computer includes, for example, a computer incorporated into dedicated hardware, a general-purpose computer that can execute an optional function by being installed with a variety of programs, and the like.

Figure 63:
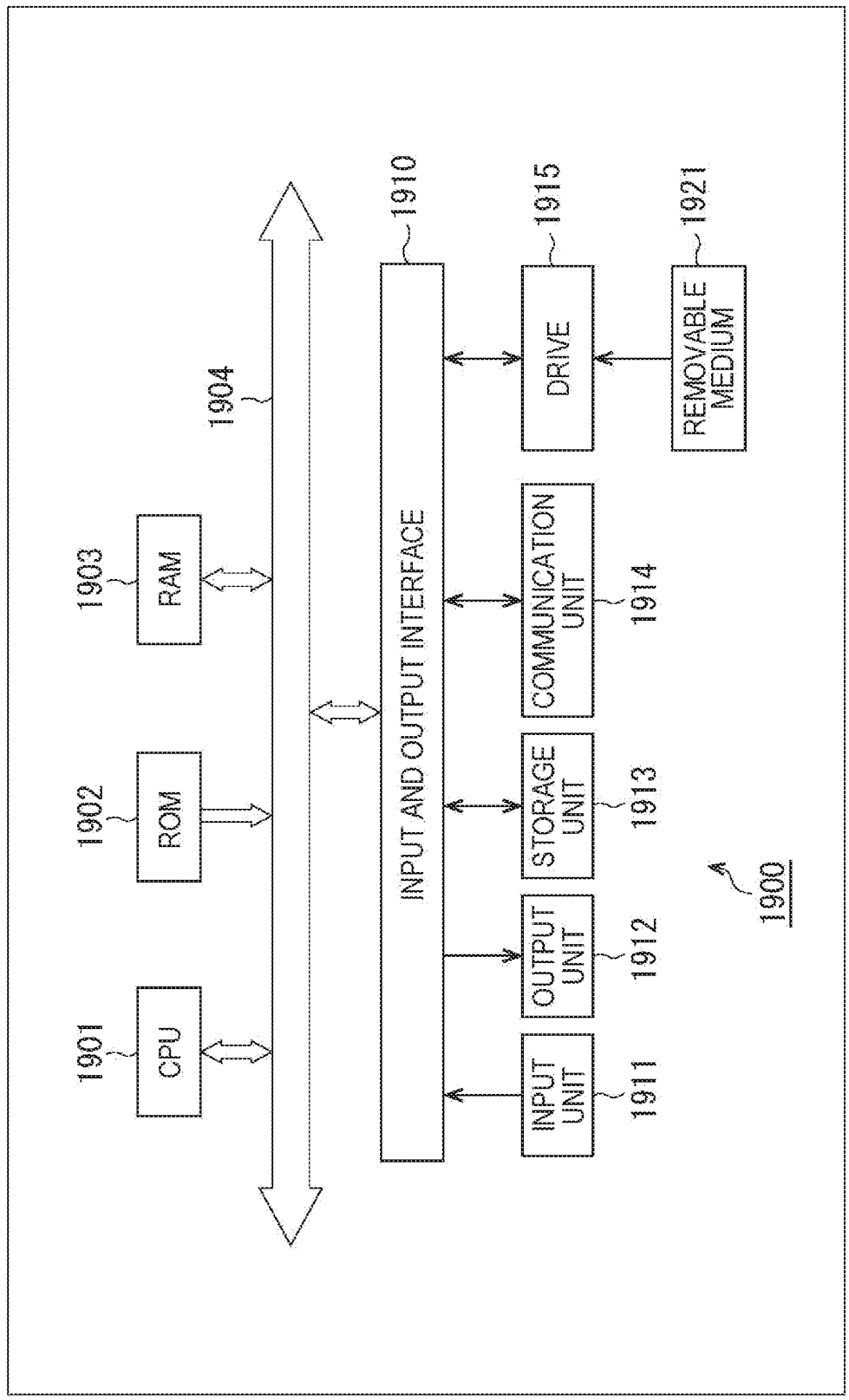
FIG. 63 is a block diagram showing a main configuration example of a computer.

FIG. 63 is a block diagram showing a main configuration example of a computer. As shown in FIG. 63, a computer 1900 has a central processing unit (CPU) 1901, a read only memory (ROM) 1902, and a random access memory (RAM) 1903 which are mutually connected via a bus 1904.

Furthermore, an input and output interface 1910 is also connected to the bus 1904. An input unit 1911, an output unit 1912, a storage unit 1913, a communication unit 1914, and a drive 1915 are connected to the input and output interface 1910.

The input unit 1911 has an optional input device such as, for example, a keyboard, a mouse, a touch panel, an image sensor, a microphone, a switch, an input terminal, and the like. The output unit 1912 has an optional output device such as, for example, a display, a speaker, an output terminal, and the like. The storage unit 1913 has an optional storage medium, for example, a non-volatile memory and the like, such as a hard disk, a RAM disk, a solid state drive (SSD), a universal serial bus (USB) memory, and the like. The communication unit 1914 has a communication interface of an optional communication standard for wired or radio communication, or both, such as, for example, Ethernet, Bluetooth, USB, high-definition multimedia interface (HDMI), IrDA, and the like. The drive 1915 drives a removable medium 1921 having an optional storage medium, such as a magnetic disk, an optical disk, a magneto-optical disk, a semiconductor memory, or the like, that is mounted on itself.

In the computer 1900 configured as described above, for example, the CPU 1901 loads a program stored in the storage unit 1913 into the RAM 1903 via the input and output interface 1910 and the bus 1904 and executes the program so as to be able to perform a function equivalent to part or whole of the configuration of hardware described above in each embodiment. That is, at least part of a series of pieces of processing described above is performed. Furthermore, data and the like necessary for the CPU 1901 to execute a variety of types of processing are stored as appropriate in the RAM 1903.

A program executed by the CPU 1901 can be recorded, for example, in the removable medium 1921 used as a package medium and the like, and applied. In such a case, the program can be installed in the storage unit 1913 via the input and output interface 1910 by mounting the removable medium 1921 on the drive 1915. Furthermore, the program can also be provided via a wired or radio transmission medium, such as a local area network, the Internet, or digital satellite broadcasting. In such a case, the program can be received by the communication unit 1914 and installed in the storage unit 1913. Other than the above, the program can also be installed in the ROM 1902 or the storage unit 1913 in advance.

Note that part of a series of pieces of processing described above can be executed by hardware, and the remaining part can be executed by software.

<Others>

An embodiment of the present technology is not limited to the embodiment described above, and a variety of modifications can be made within a range not deviating from the gist of the present technology.

Furthermore, for example, the present technology can be performed as any configuration constituting a device or a system, for example, a processor as a system large scale integration (LSI) and the like, a module using a plurality of processors and the like, a unit using a plurality of modules and the like, a set and the like obtained by adding other functions to a unit (in other words, a configuration of part of a device).

Note that, in the present description, a system means an assembly of a plurality of constituents (devices, modules (components), and the like), regardless of whether or not all constituents are in the same housing. Accordingly, both of a plurality of devices that are contained in separate housings and connected via a network, and one device in which a plurality of modules are contained in one housing, are systems.

Furthermore, for example, the configuration described as one device (or processing unit) may be divided, and configured as a plurality of devices (or processing units). In contrast, the configuration described above as a plurality of devices (or processing units) may be collectively configured as one device (or processing unit). Furthermore, as a matter of course, a configuration other than those described above may be added to a configuration of each device (or each processing unit). Moreover, as long as a configuration and operation as an entire system are substantially the same, part of a configuration of a certain device (or processing unit) may be included in a configuration of another device (or another processing unit).

Furthermore, for example, the present technology can employ a configuration of cloud computing in which one function is shared and processed jointly by a plurality of devices via a network.

Furthermore, for example, the program described above can be executed by an optional device. In such a case, the configuration may be such that the device has a necessary function (a functional block, and the like) so as to be able to obtain necessary information.

Furthermore, for example, each step described in the above flowcharts can be executed by one device, or shared and executed by a plurality of devices. Moreover, in a case where a plurality of pieces of processing are included in one step, a plurality of pieces of the processing included in one step can be executed by one device, or shared and executed by a plurality of devices.

Note that, in a program executed by a computer, processing of steps that describe the program may be executed in a time series along the order described in the present embodiment, or may be executed in parallel, or individually at a necessary timing, such as when the processing is called, and the like. That is, as long as no inconsistency is generated, processing of each step may be executed in the order different from the order described above. Moreover, processing of a step that describes the program may be executed in parallel with processing of other programs, or may be executed in combination with processing of other programs.

Note that a plurality of the present technologies described in the present description can be performed independently of each other and alone as long as no inconsistency is generated. As a matter of course, a plurality of optional ones of the present technologies can also be performed in combination. For example, the present technology described in any of embodiments can be performed in combination with the present technology described in the other embodiments. Furthermore, the optional present technology described above can be performed in combination with other technologies not described above.

Note that the present technology can employ configurations as described below.

(1) An information collection system including an information collection device that collects information associated with a customer or a product for each product type.

(2) The information collection system according to (1), in which the number of the information collection devices installed in locations in which a product is placed is larger than or the same as the number of product types for which the information is collected.

(3) The information collection system according to (1) or (2), in which the number of the information collection devices installed in locations in which a product is placed is larger than or the same as the number of product types in the information for each product transferred from the information collection device to a data accumulation device that accumulates the information.

(4) The information collection system according to any of (1) to (3), in which the number of the information collection devices installed in locations in which a product is placed is larger than or the same as the number of product types for which the information is output.

(5) The information collection system according to any of (1) to (4), in which the information collection device is a network camera that includes an image pickup function and a communication function.

(6) The information collection system according to any of (1) to (5), in which the information collection device is an electronic shelf label that includes an image pickup function and a communication function.

(7) The information collection system according to any of (1) to (6), in which the information collection device is an electronic point of purchase (POP) advertising that has an image pickup function and a communication function.

(8) The information collection system according to any of (1) to (7), in which the information collection device is a character information display device that includes an image pickup function and a communication function.

(9) The information collection system according to any of (1) to (8), in which the information collection device acquires and displays information supplied from other devices.

(10) The information collection system according to (9), in which the other devices supply information associated with a product supplied from the information collection device corresponding to identification information of the product to the information collection device, and the information collection device displays the supplied information associated with the product.

(11) An electronic shelf label including an information collection unit that collects information associated with a customer or a product.

(12) The electronic shelf label according to (11), in which the information collection unit is an image sensor.

(13) An electronic point of purchase (POP) advertising including an information collection unit that collects information associated with a customer or a product.

(14) The electronic POP advertising according to (13), in which the information collection unit is an image sensor.

(15) A character information display device including an information collection unit that collects information associated with a customer or a product.

(16) The character information display device according to (15), in which the information collection unit is an image sensor.

(21) An information processing device, including:

an image pickup unit that picks up an image of an object;

a recognition unit that recognizes information associated with a product included in a picked-up image obtained by the image pickup unit; and a display unit that displays an image associated with the product corresponding to the information associated with a product recognized by the recognition unit.

(22) The information processing device according to (21), in which the information associated with a product is identification information of the product.

(23) The information processing device according to (21) or (22), in which the image associated with a product includes at least any one of a product name, a price, and identification information of the product.

(24) The information processing device according to any of (21) to (23), further including:

a communication unit that performs communication with other information processing devices, supplies the information associated with a product recognized by the recognition unit to the other information processing devices, and acquires data to be displayed corresponding to the information associated with a product; and a display control unit that uses the data to be displayed acquired by the communication unit to generate an image associated with the product that is to be displayed on the display unit, in which the display unit is configured to display the image associated with a product generated by the display control unit.

(25) The information processing device according to any of (21) to (24), in which the image pickup unit picks up an image of a customer as an object, the recognition unit recognizes the information associated with a customer on the basis of a picked-up image obtained by the image pickup unit, and the communication unit supplies the information associated with a customer recognized by the recognition unit to the other information processing devices.

(26) The information processing device according to any of (21) to (25), in which the information associated with a customer includes at least any one of a position of a face of the customer, a time at which the face of the customer is detected, a time period in which the face of the customer is detected.

(27) The information processing device according to any of (21) to (26), in which the information associated with a customer further includes attributes of the customer.

(28) The information processing device according to any of (21) to (27), in which the information associated with a customer further includes identification information of the customer.

(29) The information processing device according to any of (21) to (28), further including:

a motion image pickup unit that picks up an image of a motion of an object; and a detection unit that detects the motion of the customer on the basis of a picked-up image obtained by the motion image pickup unit, in which the communication unit is configured to further supply the motion of the customer detected by the motion detection unit as information associated with the customer to the other information processing devices.

(30) The information processing device according to any of (21) to (29), in which the recognition unit identifies a position of the customer included in the picked-up image, and recognizes the information associated with the customer only for the customer positioned within a predetermined range.

(31) The information processing device according to any of (21) to (30), in which the communication unit acquires data to be displayed corresponding to the information associated with a customer supplied to the other information processing devices, and the display control unit uses the data to be displayed acquired by the communication unit to generate the image associated with a product to be displayed on the display unit.

(32) The information processing device according to any of (21) to (31), in which
the communication unit further includes a control unit that controls whether to supply the information associated with a product or to supply the information associated with a customer.

(33) The information processing device according to any of (21) to (32), further including a specific code recognition unit that recognizes a specific code included in a picked-up image obtained by the image-pickup unit, the information processing device in which
the control unit is configured to control the communication unit to supply the information associated with a product or the information associated with a customer in accordance with a result of recognition of the specific code performed by the specific code recognition unit.

(34) The information processing device according to any of (21) to (33), in which
the control unit causes the communication unit to supply the information associated with a product in a case where a first specific code is identified by the specific code recognition unit, and causes the communication unit to supply the information associated with a customer in a case where a second specific code different from the first code is identified by the specific code recognition unit.

(35) The information processing device according to any of (21) to (34), in which
in a case where a specific code is recognized by the specific code recognition unit, the control unit causes the communication unit to switch information to be supplied.

(36) The information processing device according to any of (21) to (35), in which
the control unit causes the communication unit to supply any one of the information associated with a product and the information associated with a customer in a case where a specific code is not recognized by the specific code recognition unit, causes information to be supplied by the communication unit to the other one in a case where a specific code is recognized by the specific code recognition unit, and returns information to be supplied by the communication unit to the first one in a case where a predetermined period of time elapses since the specific code is recognized by the specific code recognition unit.

(37) The information processing device according to any of (21) to (36), further including:
a moving object detection unit that detects a moving object on the basis of a picked-up image obtained by the image pickup unit; and
a power supply control unit that turns on a power supply of at least the recognition unit in a case where a moving object is not detected by the moving object detection unit for a predetermined period or longer, and turns on a power supply of all processing units in a case where a moving object is detected by the moving object detection unit.

(38) The information processing device according to any of (21) to (37), further including a customer recognition unit that detects a face of a customer included in a picked-up image obtained by the image pickup unit and identifies a direction of the detected face, in which
the communication unit is configured to supply information showing the direction of the face identified by the customer recognition unit, and causes an image for the customer to be displayed on an electronic shelf label arranged at a position corresponding to the direction of the face.

(39) An information processing method, including:
picking up an image of an object;
recognizing information associated with a product included in an obtained picked-up image; and
displaying an image associated with the product corresponding to the recognized information associated with a product.

(40) An electronic shelf label that displays an image associated with a product, the electronic shelf label including:
an image pickup unit that picks up an image of an object;
a recognition unit that recognizes information included in a picked-up image obtained by the image pickup unit; and
a display unit that displays an image associated with the product corresponding to the information recognized by the recognition unit.

REFERENCE SIGNS LIST

100 Information collection system
101 Shelf device
102 Relay device
103 Information management server
121 Product display shelf
122 Information collection device
123 Local server
131 Product
140 Network camera
141 Image sensor
142 Ranging sensor
150 Electronic shelf label
151 Image sensor
152 Ranging sensor
153 Monitor
160 Electronic POP advertising
161 Image sensor
162 Ranging sensor
163 Monitor
164 Speaker
411 Information provision server
1100 Electronic shelf label system
1101 Electronic shelf label
1102 Network
1103 Server
1111 Camera
1112 Monitor
1113 Mode identification LED
1131 Image pickup unit
1132 Image recognition unit
1133 Processing control unit
1134 Communication unit
1135 Display control unit
1136 Storage unit
1137 Display unit
1141 Specific code recognition unit
1142 Customer recognition unit
1143 Product recognition unit
1341 Camera
1361 Image pickup unit
1362 Moving object detection unit
1363 Processing control unit
1471 Customer unique ID code recognition unit
1631 Moving object detection unit
1632 Power supply control unit
1633 Power supply unit
1634 Power supply unit

The invention claimed is:

1. An information collection system, comprising:
an information collection device that includes a plurality of image pickup units configured to capture a plurality of images of a person, wherein each image pickup unit of the plurality of image pickup units is associated with one product type of a plurality of product types; and
an image analysis device configured to:
compare at least two images of the plurality of images of the person captured by the plurality of image pickup units;
determine an image of the plurality of images in which a face of the person faces a front the most among the plurality of images based on a result of the comparison;
identify an image pickup unit of the plurality of image pickup units that corresponds to the determined image; and
identify information associated with the person based on the identified image pickup unit.

2. The information collection system according to claim 1, wherein
the information associated with the person includes information associated with a product type of the plurality of product types at which the person looks at.

3. The information collection system according to claim 2, wherein the information associated with the product type at which the person looks at includes a result of identification of the person who looks at the product type.

4. The information collection system according to claim 3, wherein the information associated with the product type at which the person looks at further indicates a number of people who look at the product type within a certain period of time.

5. The information collection system according to claim 3, wherein the result of identification of the person who looks at the product type includes a time length in which the person looks at the product type.

6. The information collection system according to claim 3, wherein the information collection device is one of a network camera that has an image pickup function and a communication function, an electronic shelf label that has the image pickup function and the communication function, or an electronic point of purchase (POP) advertising device that has the image pickup function and the communication function.

7. The information collection system according to claim 6, wherein the comparison of the at least two images of the person includes a comparison of directions of the face of the person in the plurality of images.

8. The information collection system according to claim 7, wherein the image analysis device is further configured to identify the product type corresponding to the identified image pickup unit.

9. The information collection system according to claim 8, wherein
the information collection device further includes a ranging sensor,
the ranging sensor is configured to measure a distance between the person and a product of the product type, and
the information collection device is configured to supply a result of the measured distance obtained from the ranging sensor to the image analysis device.

10. The information collection system according to claim 9, wherein the image analysis device is further configured to identify a same person based on the result of the measured distance.

11. The information collection system according to claim 8, wherein the image analysis device is further configured to:
compare the at least two images of the person;
detect information associated with a motion of the person based on the result of the comparison;
identify a same person based on the detected information associated with the motion of the person.

12. The information collection system according to claim 11, wherein the information associated with the motion of the person includes at least one of a movement start time, a movement stop time, a time at which the person moves into a frame, or a moving direction of the person.

13. The information collection system according to claim 7, wherein the comparison of the directions of the face of the person in the plurality of the images includes a comparison of size of two sections in the face of the person included in the plurality of images.

14. The information collection system according to claim 13, wherein the comparison of the size of the two sections between the plurality of images includes a comparison of ratios of a width of a face region to a distance between a center of the face region and a center of the face.

15. The information collection system according to claim 13, wherein the comparison of the size of the two sections between the plurality of images includes one of a ratio or an absolute value of a difference between a distance between a left end of a face region and a center of the face and a distance between a right end of the face region and the center of the face.

16. The information collection system according to claim 13, wherein the comparison of the size of the two sections between the plurality of images includes one of a ratio or an absolute value of a difference between a distance between a center of the face and a center of a right eye and a distance between the center of the face and a center of a left eye.

17. The information collection system according to claim 6, further comprising a communication device configured to transmit information acquired from the information collection device and a result of an image analysis process performed by the image analysis device.

18. An electronic shelf label, comprising:
a sensor that includes at least one image pickup unit of a plurality of image pickup units configured to capture a plurality of images of a person, wherein each image pickup unit of the plurality of image pickup units is associated with a product type of a plurality of product types; and
an image analysis device configured to:
compare at least two images of the plurality of images of the person captured by the plurality of image pickup units;
determine an image of the plurality of images in which a face of the person faces a front the most among the plurality of images based on a result of the comparison;
identify an image pickup unit of the plurality of image pickup units that corresponds to the determined image; and
identify information associated with the person based on the identified image pickup unit.

19. An electronic point of purchase (POP) advertising, comprising:
- a sensor that includes at least one image pickup unit of a plurality of image pickup units configured to capture a plurality of images of a person, wherein each image pickup unit of the plurality of image pickup units is associated with a product type of a plurality of product types; and
- an image analysis device configured to:
  - compare at least two images of the plurality of images of the person captured by the plurality of image pickup units;
  - determine an image of the plurality of images in which a face of the person faces a front the most among the plurality of images based on a result of the comparison;
  - identify an image pickup unit of the plurality of image pickup units that corresponds to the determined image; and
  - identify information associated with the person based on the identified image pickup unit.

20. A character information display device, comprising:
- a sensor that includes at least one image pickup unit a plurality of image pickup units configured to capture a plurality of images of a person, wherein each image pickup unit of the plurality of image pickup units is associated with a product type of a plurality of product types; and
- an image analysis device configured to:
  - compare at least two images of the plurality of images of the person captured by the plurality of image pickup units;
  - determine an image of the plurality of images in which a face of the person faces a front the most among the plurality of images based on a result of the comparison;
  - identify an image pickup unit of the plurality of image pickup units that corresponds to the determined image; and
  - identify information associated with the person based on the identified image pickup unit.

\* \* \* \* \*